(12) United States Patent
Zeile et al.

(10) Patent No.: US 6,199,951 B1
(45) Date of Patent: Mar. 13, 2001

(54) COLLAPSIBLE SEAT

(75) Inventors: Kim Zeile, Clarkston; Thomas M. Sharples, Washington; Dean Poppeck, Goodrich; Paul F. Anderson, Clarkston; Brian C. Doll, Rochester, all of MI (US)

(73) Assignee: Prefix Corporation, Rochester Hills, MI (US)

( * ) Notice: Subject to any disclaimer, the term of this patent is extended or adjusted under 35 U.S.C. 154(b) by 0 days.

(21) Appl. No.: 09/135,242

(22) Filed: Aug. 17, 1998

Related U.S. Application Data

(60) Provisional application No. 60/056,341, filed on Aug. 18, 1997, provisional application No. 60/058,333, filed on Sep. 10, 1997, provisional application No. 60/068,116, filed on Dec. 19, 1997, and provisional application No. 60/071,920, filed on Jan. 20, 1998.

(51) Int. Cl.[7] ............................................. B60N 2/30
(52) U.S. Cl. ................... 297/341; 297/15; 297/378.12
(58) Field of Search ..................... 297/15, 340, 341, 297/378.12, 378.13, 378.14, 284.2, 284.4; 296/65.08, 65.09, 65.05, 65.01

(56) References Cited

U.S. PATENT DOCUMENTS

| | | |
|---|---|---|
| 3,121,585 | 2/1964 | Krueger et al. . |
| 3,202,453 | 8/1965 | Richards . |
| 3,241,879 | 3/1966 | Castello et al. . |
| 3,246,924 | 4/1966 | Krueger et al. . |
| 3,273,877 | 9/1966 | Geller et al. . |
| 3,363,941 | 1/1968 | Weirwille . |
| 3,550,953 | 12/1970 | Neale . |
| 3,695,688 | 10/1972 | Wize . |
| 3,927,911 | 12/1975 | Rosquist . |
| 3,983,640 | 10/1976 | Cardullo et al. . |
| 4,105,245 | 8/1978 | Simons et al. . |
| 4,155,592 | 5/1979 | Tsuda et al. . |
| 4,190,286 | 2/1980 | Bentley . |
| 4,354,709 | 10/1982 | Schuster . |
| 4,428,611 | 1/1984 | Widmer . |
| 4,519,646 | 5/1985 | Leitermann et al. . |
| 4,616,874 | 10/1986 | Pietsch et al. . |
| 4,619,481 | 10/1986 | Grudzinskas . |
| 4,630,865 | 12/1986 | Ahs . |
| 4,634,083 | 1/1987 | McKinnon . |
| 4,655,505 | 4/1987 | Kashiwamura et al. . |
| 4,699,418 | 10/1987 | Plavetich . |
| 4,707,027 | 11/1987 | Horvath et al. . |
| 4,711,490 | 12/1987 | Brand . |
| 4,768,830 | 9/1988 | Musselwhite . |
| 4,826,249 | 5/1989 | Bradbury . |
| 4,833,614 | 5/1989 | Saitoh et al. . |
| 4,880,271 | 11/1989 | Graves . |
| 4,976,104 | 12/1990 | Morris et al. . |
| 5,026,116 | 6/1991 | Dal Monte . |
| 5,050,930 | 9/1991 | Schuster et al. . |
| 5,082,326 | 1/1992 | Sekido et al. . |
| 5,092,654 | 3/1992 | Inaba et al. . |
| 5,120,111 | 6/1992 | Cook . |
| 5,195,795 | 3/1993 | Cannera et al. . |
| 5,197,780 | 3/1993 | Coughlin . |

(List continued on next page.)

Primary Examiner—Peter R. Brown
(74) Attorney, Agent, or Firm—Young & Basile, PC

(57) ABSTRACT

A collapsible includes a seat back pivotal relative to a seat bottom. Linkages pivot the seat bottom between lowered and elevated, seating positions. Shape changing members are mounted in at least one of the seat bottom and the seat back for changing the shape and/or the overall height of the seat bottom or seat back while the seat bottom or seat back is moved to the lowered position to exhibit the minimum stack height for the collapsed seat. The seat back and linkages are also coupled to provide pivotal movement of the seat bottom concurrently with pivotal movement of the seat back. Releasable latches are provided for latching the seat back in the elevated and/or lowered position.

67 Claims, 32 Drawing Sheets

U.S. PATENT DOCUMENTS

| | | |
|---|---|---|
| 5,269,581 | 12/1993 | Odagaki et al. . |
| 5,292,175 | 3/1994 | Artz . |
| 5,292,176 | 3/1994 | Artz . |
| 5,316,371 | 5/1994 | Bishai . |
| 5,368,355 | 11/1994 | Hayden et al. . |
| 5,385,389 | 1/1995 | Bishai . |
| 5,449,219 | 9/1995 | Hay et al. . |
| 5,482,346 | 1/1996 | Lesourd . |
| 5,529,377 | 6/1996 | Miller . |
| 5,570,931 | 11/1996 | Kargilis et al. . |
| 5,588,707 | 12/1996 | Bolsworth et al. . |
| 5,651,583 | 7/1997 | Klingler et al. . |
| 5,660,438 | 8/1997 | Tedesco . |
| 5,941,602 * | 8/1999 | Sturt et al. ............... 297/340 |

* cited by examiner

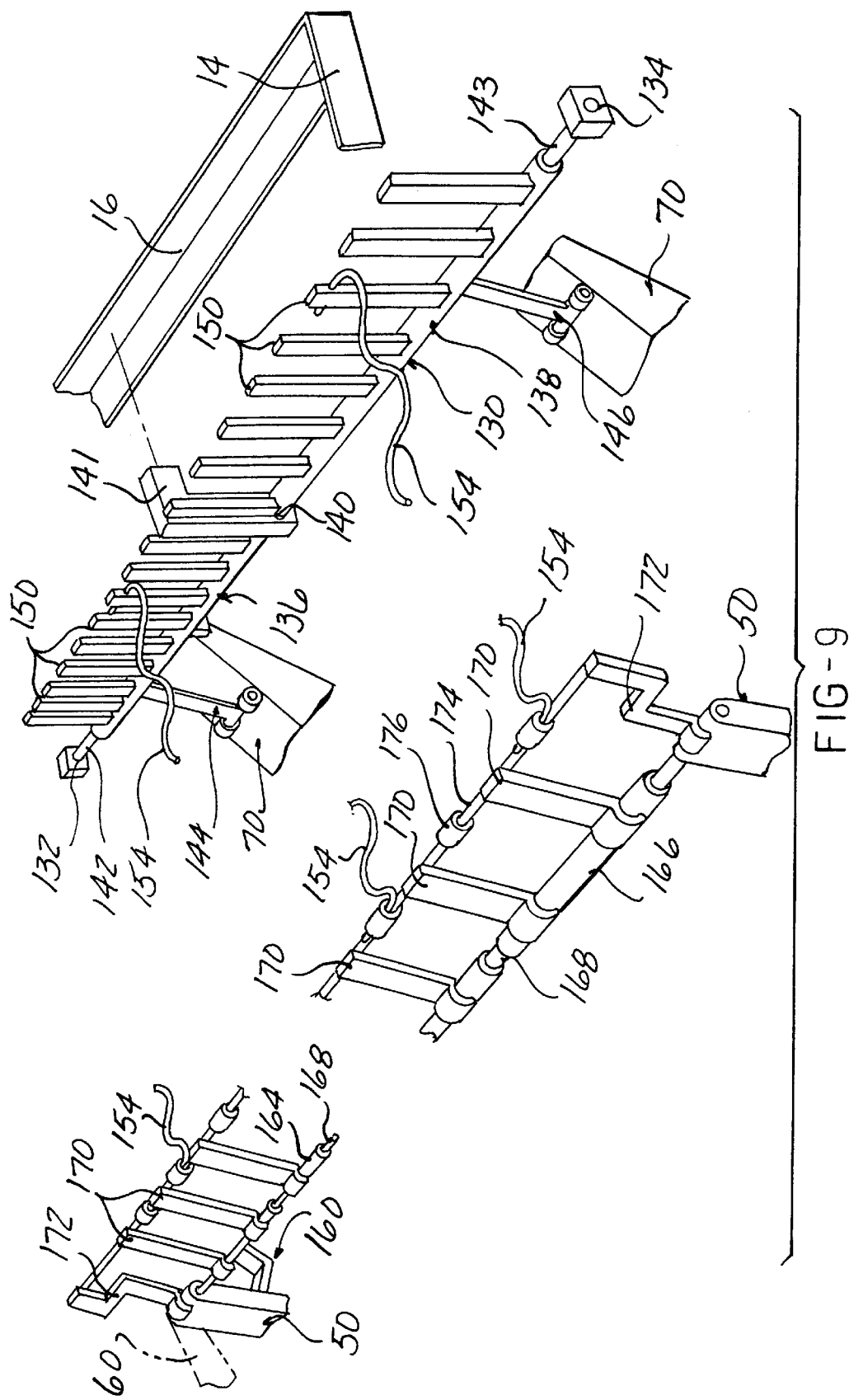

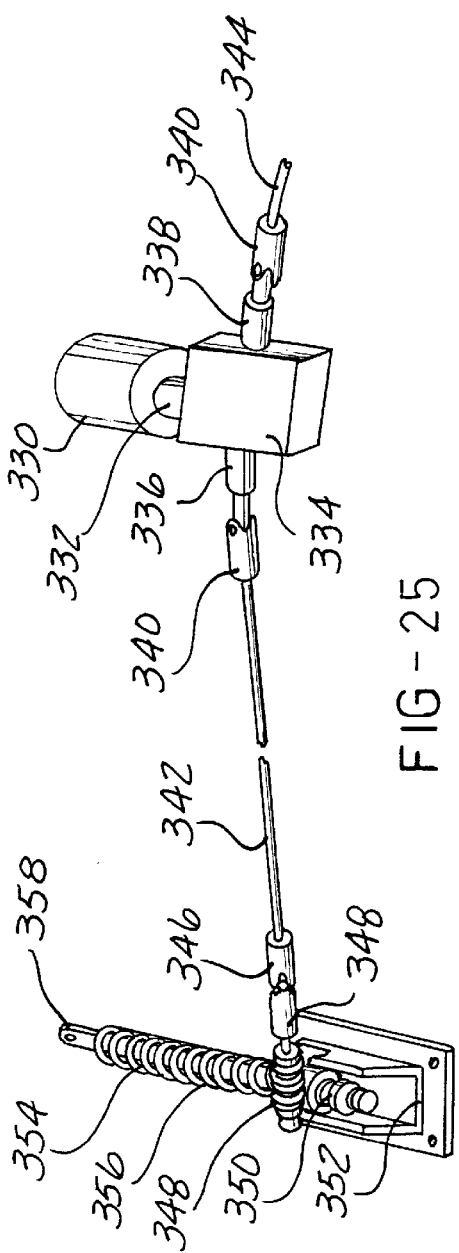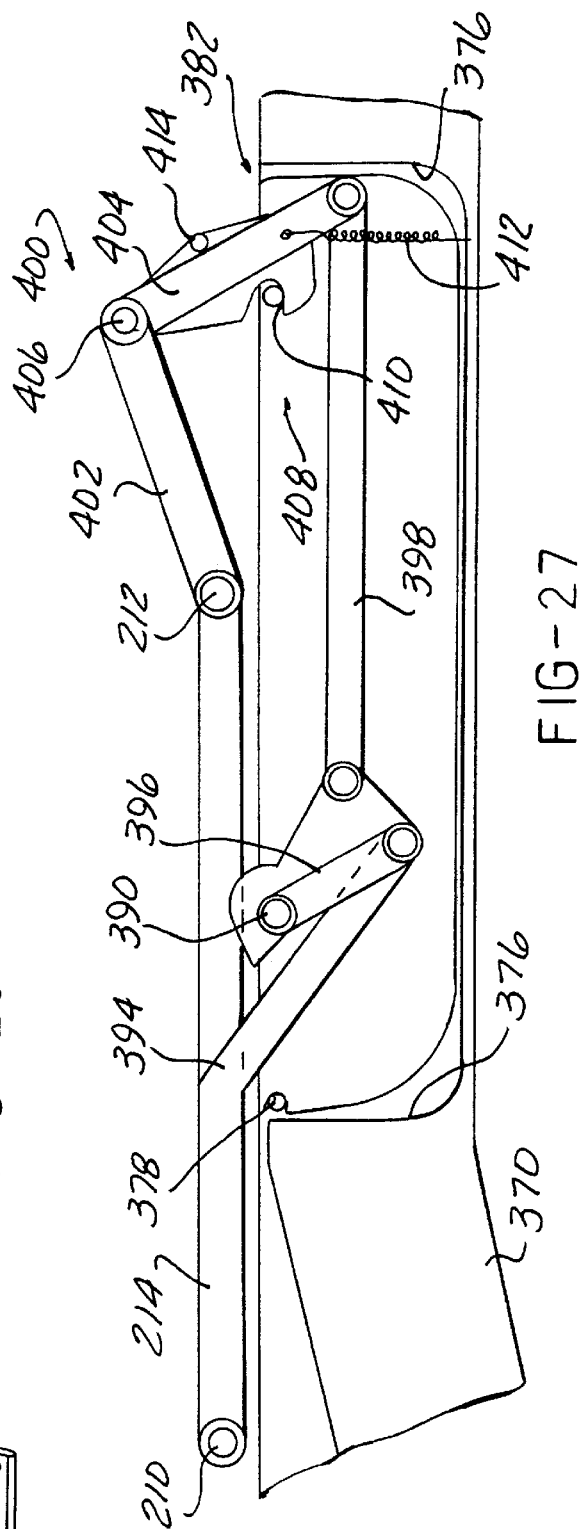

COLLAPSIBLE SEAT

CROSS REFERENCE TO RELATED APPLICATIONS

This application claims the benefit of the following U.S. provisional application: Ser. No. 60/056,341 filed Aug. 18, 1997, in the names of Kim Zeile, Thomas M Sharples and Dean Poppeck, entitled COLLAPSIBLE SEAT; Ser. No. 60/058,333, filed Sep. 10, 1997 in the names of Kim Zeile, Thomas M. Sharples, Dean Poppeck and Paul F. Anderson, entitled COLLAPSIBLE SEAT; Ser. No. 60/068,116, filed Dec. 19, 1997 in the names of Kim Zeile and Thomas M. Sharples, entitled COLLAPSIBLE SEAT; and Ser. No. 60/071,920, filed Jan. 20, 1998 in the names of Brian C. Doll and Thomas M. Sharples, entitled COLLAPSIBLE SEAT.

BACKGROUND OF THE INVENTION

1. Field of the Invention

The present invention relates, in general, to seats and, more particular, to vehicle seats.

2. Description of the Art

Seats found in vehicles, such as automobiles, trucks, etc., are frequently provided with a seat back which is pivotal from a raised position to a lowered position with respect to the accompanying seat bottom.

Vehicle seats, particularly those found in minivans, are frequently releasibly mountable in the vehicle so as to enable their removal when it is desired to use the floor of the vehicle as a cargo space.

It is also known to provide vehicle seats in which the seat back and/or the entire seat back and seat bottom are pivotally movable from a normal seating position in which the seat back extends angularly upward from the seat bottom to a collapsed, lowered position wherein the seat back folds over the bottom and the seat bottom itself may pivot from the seating position to a lowered position, either forward or rearward of the seating, so as to lower the overall height of the collapsed seat and to enable the back surface of the seat back to be used for supporting cargo within the vehicle.

While the removable seats operate effectively in so far as enabling the seat to be folded and removed from the vehicle, storage of the removed seat can be a problem, particularly in urban areas where a vehicle owner may not have a garage readily available for storing the removed seat. The weight of the seat, which is relatively light in terms of enabling the seat to be easily removed and reinstalled in the vehicle, nevertheless, can become problematic when it is necessary to carry the seat a considerable distance to a storage area away from the vehicle or up flights of stairs to owners apartment.

Further, the collapsible seats, while being able to be lowered to a position wherein the seat back does not extend appreciably above the underlying seat support surface or vehicle floor, do not provide for any change in the height of the seat back or seat bottom so as to reduce the overall stack height of the folded seat back and seat bottom itself.

Seats are frequently provided with adjustable bladders or other shape changing supports for varying the contour of the seat bottom and/or seat back to provide occupant comfort. However, the amount of movement provided by such shape changing devices or "lumbar supports" is minimal. Further, such shape changing devices merely change the contour of the surface of the seat and do not appreciably change the overall height of the outer surface of the seat bottom and/or seat back with respect to its opposed back surface.

Thus, it would be desirable to provide a collapsible seat for particular use in vehicles which can be folded to a minimum stack height when in a collapsed or lowered position. It would also be desirable to provide a collapsible seat in which a seat back can be folded over a seat bottom with a minimum stack height and the entire seat bottom and seat back pivotally lowered to a collapsed position enabling the back surface of the seat back to act as a cargo carrying surface generally in line with the vehicle floor. It would also be desirable to provide a collapsible seat wherein the stack height of the seat back and/or seat bottom is automatically changed as the seat back is pivoted with respect to the seat bottom. It would also be desirable to provide a seat in which the seat bottom is automatically pivoted between the lowered and elevated positions concurrent with pivotal movement of the seat back relative to the seat bottom. It would also be desirable to provide a collapsible seat which can be collapsed to a lowered position which has a minimal stack height so as to fit within a receptacle formed in a vehicle floor.

SUMMARY OF THE INVENTION

The present invention is a collapsible seat which is movable between a deployed, elevated, seating position to a collapsed, storage position wherein the seat has a minimal stack height within collapsed, storage position.

For all embodiments, the collapsible seat of the present invention includes a seat back pivotally disposed with respect to a seat bottom. Linkages are mounted on opposite sides of a seat bottom frame supporting a seat bottom cushion and control pivotal movement of the seat bottom between a first, collapsed, lowered position, and a second, elevated, seating position.

According to one unique feature of the present invention, means are provided for converting pivotal movement of the seat back with respect to the seat bottom into operation of the linkages on the seat bottom to pivot the seat bottom between lowered and elevated positions concurrently with pivotal movement of the seat back between lowered and elevated positions.

According to another unique feature, shape changing means are carried in at least one of the seat bottom and the seat back and are operable for changing the shape of the seat bottom or seat back between a first, low height configuration when the seat bottom or seat back is in the collapsed, lowered position and a second, elevated seating position. Preferably, the shape changing means is coupled to the means for converting pivotal movement of the seat back into concurrent pivotal movement of the seat bottom such that the shape and/or overall height of seat back or seat bottom is lowered to a minimal height at the same time the seat back is pivoted to an overlaying, collapsed position over the seat bottom and the seat bottom is pivoted to the collapsed, lowered position. Conversely, the shape or height of the seat back or seat bottom is changed to the normal seating configuration when the seat back is pivoted to the elevated position angularly disposed with respect to the seat bottom and the seat bottom itself is pivoted from a lowered to the seating position.

Since the overall height of the seat back and seat bottom of the collapsible seat of the present invention can be minimized when the seat back and seat bottom are in the collapsed, lowered position, the collapsible seat of the present invention readily presents itself for compact storage in a receptacle mounted within a vehicle floor. This enables the back surface of the seat back to act as a cargo support surface generally in-line with the vehicle floor without requiring the entire seat to be removed from the interior of a vehicle.

In an alternate embodiment, the linkages carried on the seat bottom collapse into channel-like carriers so as to reduce the overall height of the collapsed seat back and seat bottom when the collapsible seat is in the lowered position. The carriers, in this embodiment, are removably mountable in cavities formed in a vehicle, such as cavities formed in the spaced vehicle frame rails. The carriers may be latched into the cavities thereby enabling the entire collapsible seat of the present invention to be easily installed and removed from a vehicle. In one embodiment, a rear rotatable shaft is pivotally mounted below a rear edge of a seat bottom frame. At least one cam follower is mounted on each of the rear pivot means and fixed to the rear rotatable shaft for rotating the rear rotatable shaft in opposite directions upon opposed pivoting movement of the rear pivot means. A plurality of seat cushion support means or fingers are fixed on and extend from the rear rotatable shaft and support one end of seat cushion springs carrying the seat cushion itself.

A front rotatable shaft is also mounted between the front pivot means and connected to brackets fixedly mounted in each of the front pivot means for rotation upon pivotal movement of the front pivot means between elevated and storage positions. A plurality of fingers are also fixedly mounted on and extend from the front rotatable shaft. An upper shaft is fixed to each of the fingers and receives the other end of the seat support springs.

Upon pivotal movement of the front and rear pivot means between an elevated position and the collapsed, storage position, the front and rear rotatable shafts are simultaneously rotated in a direction causing the fingers on each of the front and rear shafts to pivot about the respective shafts and lower the fingers to lower the seat cushion within the seat frame to present a low profile for the overall seat thereby reducing the overall height of the entire collapsible seat. Upon upward pivotal movement of the front and rear pivot means to the elevated position, the fingers on the front and rear shafts pivot in an opposite direction to raise the seat cushion with respect to the seat frame into a normal seating position.

The pivotal fingers described above along with a unique inflatable seat bottom and/or seat back cushion form a means for automatically changing the overall height of one of the seat bottom and/or seat back cushions during deployment of the collapsible seat of the present invention between elevated and storage positions.

In another embodiment of the collapsible seat of the present invention, the seat bottom has a constant shape during collapsing and elevation movements. A unique moving means is mounted in the seat back between a rigid back plate and a deformable cushion so as, upon collapsing and raising movements of the seat back relative to the seat bottom, the seat back is selectively moved between a normal, contoured shape when the seat back is in the elevated position for normal use of the seat and a more planar shape collapsed within a surrounding seat back frame to define a small height relative to the seat back frame when the seat back is in the collapsed position overlaying the seat bottom. In this manner, the collapsible seat presents a smaller, overall height when in the collapsed position thereby making it more readily useable in a vehicle. The moving means automatically changes the shape and/or height of the seat back cushion relative to the back plate of the seat back during elevating and collapsing movements.

In another embodiment, a motor may be mounted on the vehicle and connected to the linkages attached to the seat bottom to power the linkages in opposing pivotal directions to automatically elevate or collapse the seat.

In yet another embodiment, the linkages on opposite sides of the seat bottom are mounted in a carrier which is removably insertable into an open top receptacle mounted in the longitudinal side rails of a vehicle. Each linkage is releasably latchable in the receptacle.

A latch may be coupled to at least one and preferably both linkages to latch the linkages in either the elevated or lowered position. A release lever is mounted on the seat back and is operably coupled to a latch pawl by means of a cable and pivotal connector to effect latching and unlatching of the latch means.

In yet another embodiment, a seat back plate carries a top support having a cushion on an exterior surface. A cushion is conformably mounted with respect to the back plate on a plurality of laterally disposed, vertically extending serpentine, flat springs. The upper ends of the springs are connected to a lower edge of a movable top plate disposed adjacent to the top support. The lower ends of the springs are mounted on a rotatable, laterally extending shaft. Anchor wires extend from the top plate to a connection at a lower edge of the back plate.

The seat back shape changing means includes a pair of gear racks carried on outermost drive rods. Each gear rack engages a fixed sector gear and, upon pivotal movement of the seat back relative to the seat bottom extend or retract the outermost drive rods and slave drive rods with respect to the bottom of the seat back plate depending upon the direction of rotation of the seat back relative to the seat bottom. Upon elevating movements of the seat back, the drive rods are extended thereby urging springs extending between the upper ends of the drive rods and the top plate outward from the back plate to move the top plate outward from the back plate and to pivot the upper end of the anchor wires. The larger spacing of the anchor wires from the springs causes the springs to bend into an arcuate shape curving the seat back cushion outward from the seat back plate.

Upon lowering, collapsing movements, the drive rods are driven in an opposite direction to pivot the upper plate and the upper end of the springs inward within the seat back frame and to flatten the springs and the seat back cushion supported by the springs into a generally planar form contained within the confines of the seat back frame to reduce the overall height of the seat back and thereby the entire collapsible seat when the seat is in the collapsed position.

A linkage latch is provided for releasibly engaging the front and rear pivot arms of the linkage when the collapsible seat is in the elevated position to lock the collapsible seat in the elevated position. A single release lever activates latch handles on both latches to enable the collapsible seat to be lowered to the collapsed position.

The collapsible seat of the present invention provides many advantages over previously devised collapsible seats. First, the collapsible seat of the present invention changes the shape and/or the height of at least one of the seat back or seat bottom of the seat to a minimal stack height when the seat is in the collapsed, lowered position. This enables the collapsible seat to be easily stored within a vehicle floor or, at most, to extend upward from the vehicle floor only a short distance while still enabling the back of the seat back to act as a cargo storage surface. Further, the shape changing feature of the present collapsible seat operates automatically during bidirectional pivotal movement of the seat back with respect to the seat bottom. Further, the shape changing feature of the present seat also operates concurrently with pivotal movement of the seat bottom between the lowered and seating position. In this manner, a simple upward or downward pivoting movement of the seat back automatically results in a change in the shape and/or height of the seat back or seat bottom as well as movement of the entire seat between lowered and elevated positions depending upon the direction of pivotal movement of the seat back.

BRIEF DESCRIPTION OF THE DRAWINGS

The various features, advantages and other uses of the present invention will become more apparent by referring to the following detailed description and drawing in which:

FIG. 9 is an exploded, perspective view of the elevatable seat bottom;

FIG. 25 is a partial, perspective view showing a power drive means for the collapsible seat shown in FIG. 14;

FIG. 27 is a side elevational view of the linkage of FIG. 26 depicted in the collapsed position;

DESCRIPTION OF THE PREFERRED EMBODIMENTS

Figure 1:
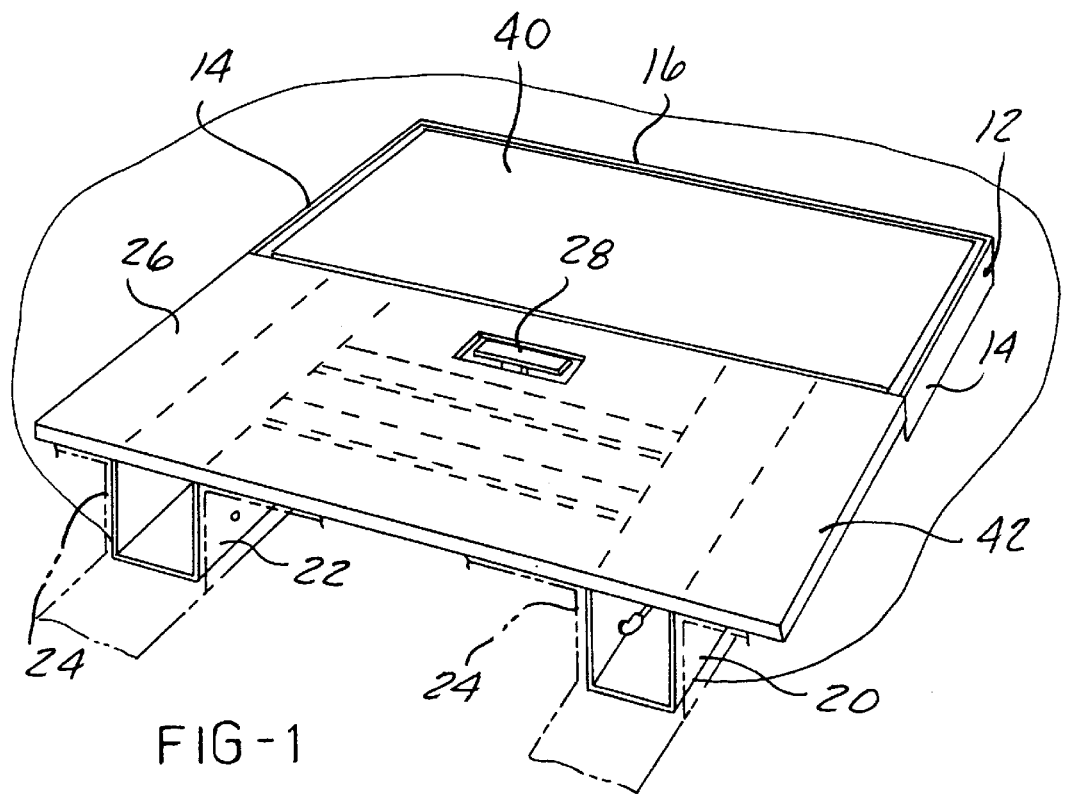
FIG. 1 is a perspective view of a collapsible seat according to the present invention depicted in a first, lowered position.

Referring now to the drawing, and to FIGS. 1–7 in particular, there is depicted a collapsible seat 10 suited for use in a vehicle, such as an automobile, van, bus, etc. The collapsible seat 10 is movable between a first, lowered, storage position shown in FIG. 1 and a second, elevated, seating position shown in FIGS. 3 and 4.

The collapsible seat 10, as shown in FIGS. 1–4, includes a generally polygonal or rectangular frame 12 formed of opposed side members 14 interconnected by opposed end members 16. A pair of side plates 17 and a central plate 18 are interconnected between the pairs of frame members 14 and 16. The side plates 17 are spaced from the central plate 18 and form elongated U-shaped channel members, each denoted by reference numeral 19. The pairs of frame members 14 and 16 define an internal cavity or space sized to receive the collapsed seat bottom and seat frame as described hereafter.

A pair of U-shaped channel extensions 20 and 22 project forwardly of the frame 12 in line with the channels 19. The channel extensions 20 and 22 are sized to fit within corresponding rails 24 which form part of a unibody frame structure in a vehicle. In this manner, the entire frame 12, including the channel members 20 and 22, can be located in a depressed or recessed area of the floor pan of a vehicle such that the upper surfaces of the frame 12 as described hereinafter, are substantially flush with surrounding portions of the vehicle floor pan and form a part of the vehicle floor. Fasteners or welds can be employed to fix the frame 12 in position.

A front panel 26 is mounted over the channel extensions 20 and 22 and projects forwardly of the frame 12, generally in line with an upper surface of the frame 12. The panel 26 forms a part of the vehicle floor when the collapsible seat 10 is mounted in a vehicle as well as providing a mounting location for a release handle 28 described in greater detail herein. Support rails 29 are welded between the inner opposing surfaces of the channel extensions 20 and 22 to support the panel 26.

Figure 3:
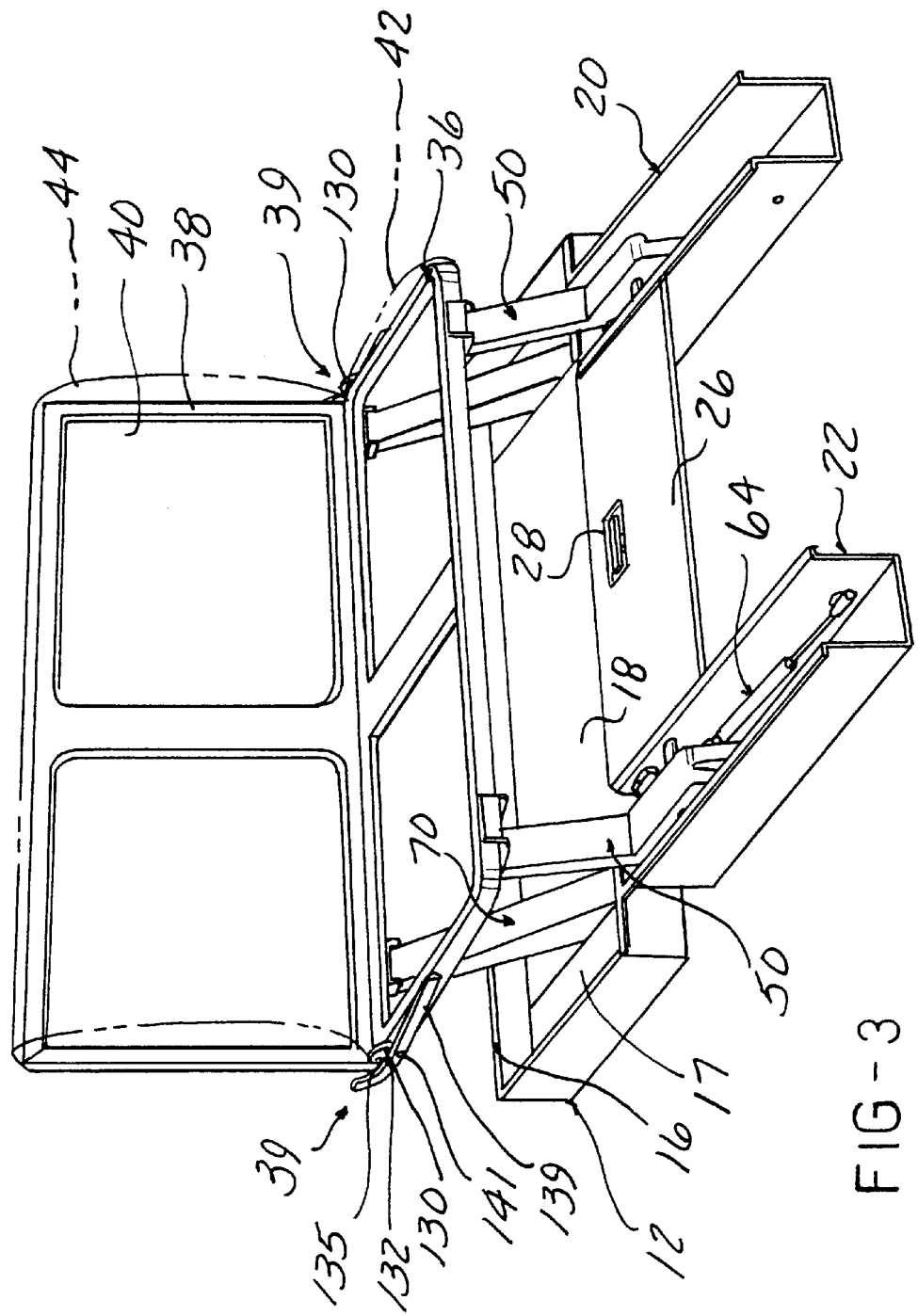
FIG. 3 is a front perspective view of the collapsible seat depicted in the second, elevated position.

A seat frame structure 34, shown in FIG. 3, includes a generally tubular seat bottom frame 36 formed of welded tubular members and a seat back or frame 38, also formed of interconnected or welded tubular members. A panel 40 is mounted on one side of the seat back frame 38 to form a portion of the vehicle floor when the collapsible seat 10 is in the first, lowered position shown in FIG. 1.

Figure 4:
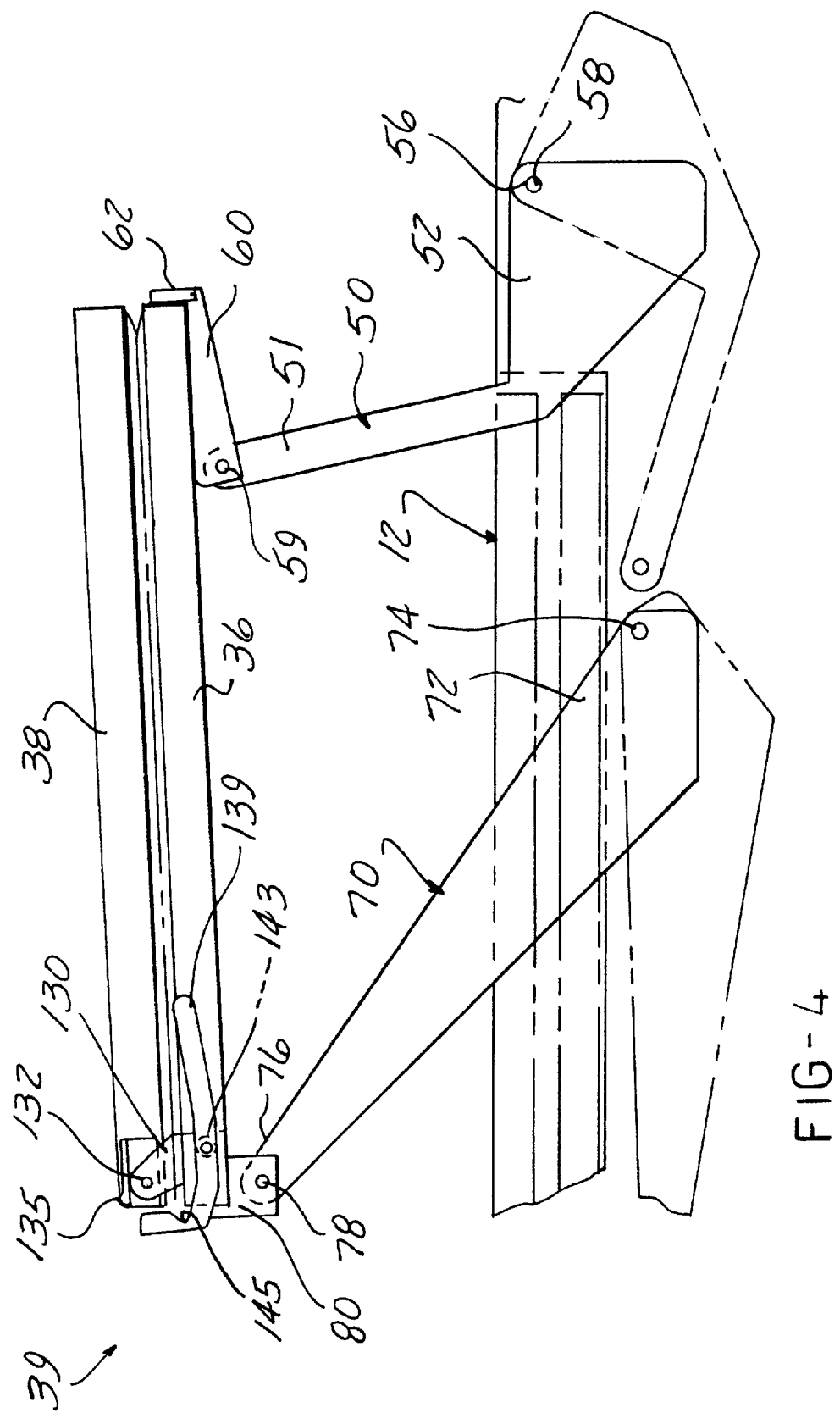
FIG. 4 is a side elevational view of the collapsible seat shown in FIG. 3 in the second, elevated position.
Figure 5:
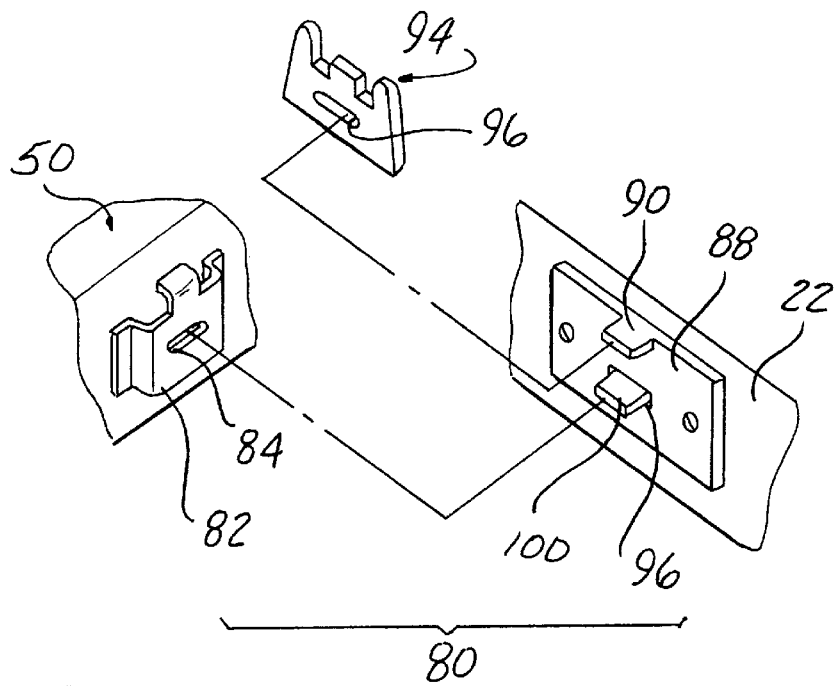
FIG. 5 is an exploded, perspective view of the latch means shown in FIG. 2.
Figure 7:
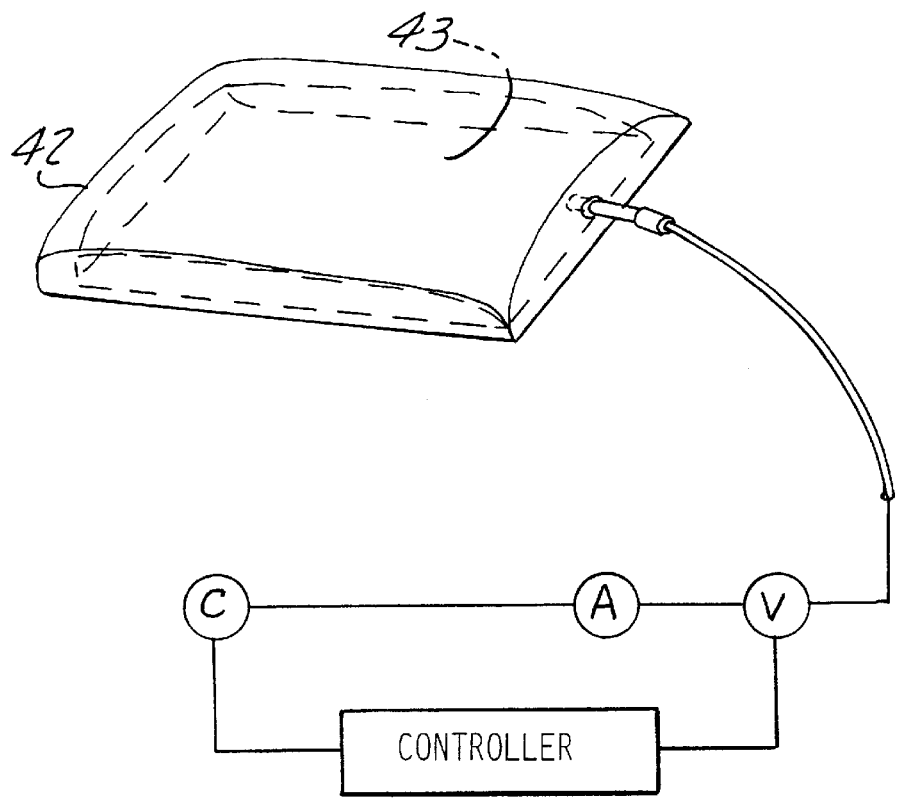
FIG. 7 is a side elevational view of the seat back latch shown in FIG. 3.

As shown in FIG. 4, a pair of hinges 39 are connected between the seat bottom frame 36 and the seat back frame 38. This enables the seat back frame 38 to be deployed between a first position overlaying and in substantial registry with the seat bottom frame 36 and a second, deployed, generally upright position, shown in FIG. 3, to enable occupant use of the seat 10.

Figure 8:
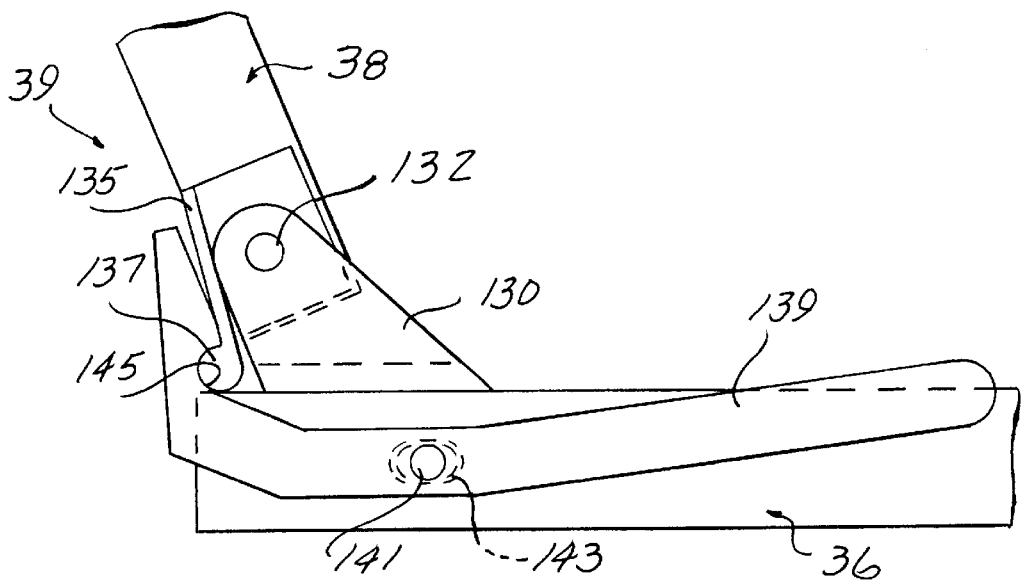
FIG. 8 is a pictorial representation of an optional inflatable seat bottom useable in the collapsible seat of the present invention.

As shown in FIG. 8, each hinge 39 includes a generally L-shaped bracket 130 which is welded to the upper surface of the rear corner on each side of the seat bottom frame 36. One leg of the bracket 130 carries a pivot pin 132 which extends into the lower edge of the seat back frame 38 to pivotally connect the seat back frame 38 to the seat bottom frame 36.

As also shown in FIG. 8, one of the hinges 39 also includes a seat back latch in the form of a cam member 132 mounted on a bottom side edge of the seat back frame 38. The cam member 135 terminates in an enlarged lobe 137 at a lower end. A pivotal latch handle 139 is mounted about a pivot pin 141 extending outward from one side of the seat bottom frame 36. A biasing spring 143 is disposed about the pivot pin 141 and is connected at opposite ends to the latch handle 139 and the seat bottom frame 36 to normally bias the latch handle 139 to a first, latching position shown in FIG. 8. In this position, a recess 145 in one end of the latch handle 139 engages the lobe 137 on the cam 135 to latch the seat back frame 38 in the second upright position with respect to the seat bottom frame 36. In order to collapse or lower the seat back frame 38 onto the seat bottom frame 36, the latch handle 139 is pivoted in a counterclockwise direction about the pivot pin 141 thereby separating the recess 145 from the lobe 137 to enable clockwise or downward pivotal movement of the seat back frame 38.

As shown in phantom in FIG. 1, a seat bottom cushion 42 and a seat back cushion 44 amounted to the respective seat bottom frame 36 and seat back frame 38 by means of conventional fasteners, etc. The seat bottom and seat back cushions 42 and 44 may be conventionally formed of foam inner cushions and outer trim layers, vinyl, leather, etc.

Figure 2:
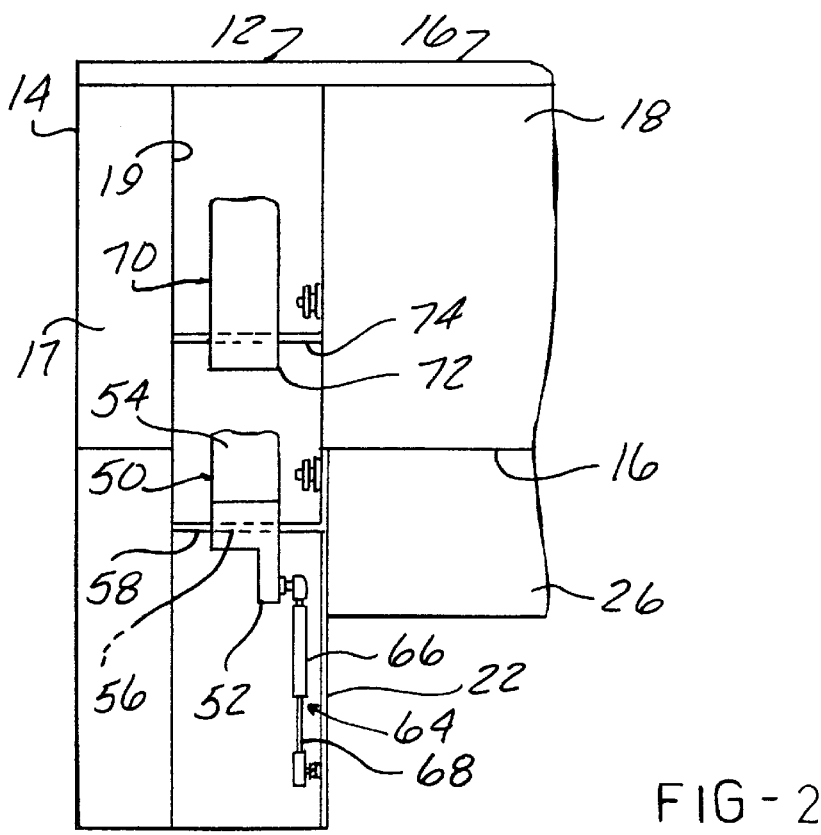
FIG. 2 is a plan view of a portion of the seat frame shown in FIG. 1.

Referring now to FIGS. 2–4, there is depicted a front pivot means and a rear pivot means which are operative to control the movement of the collapsible seat 10 between the first and second positions.

The front pivot means comprises a pair of front pivot arms 50 which have the generally angular configuration shown in FIG. 4 with opposed first and second legs 52 and 54 extending from an enlarged central body. A bore 56 is formed in the enlarged central body and receives a pivot pin 58 which extends between pivot mounts at opposite ends in the channel extensions 22 or 20. A hinge 60 is pivotally mounted by hinge pin 59 to one end of the second portion 58 of the front pivot arm 50 and is secured at an opposite end, such as by welding, to a plate 62 fixed on one edge of the seat bottom frame 36.

A biasing means 64 is also mounted in each channel extension 20 and 22 for assisting in the pivotal movement of the front pivot arms 50 toward the second, elevated position. The biasing means 64, in one exemplary embodiment, comprises a pressurized, gas filled, cylinder 66 having an extensible piston rod 68 extending from one end thereof. The cylinder 66 and the piston rod 68 are pivotally connected at opposite ends to the first leg 52 of the front pivot arm 50 and to and to one side wall of the channel extensions 20 or 22.

The biasing means 64 provides a lift assist on the front pivot arms 50 to assist movement along with user force of the front pivot arms 50 from a first, lowered position shown in phantom in FIG. 4 to a raised, elevated position, shown in solid in FIG. 4, which corresponds to the second, elevated position of the seat 10. In this position, the front pivot arms 50 pivotally raise the front end portions of the seat bottom frame 36 from the first, lowered position within the seat frame 12 to the second, elevated position.

Rear pivot means are also provided with controlling movement of the rear end of the seat bottom frame 36. The rear pivot means includes a pair of rear pivot arms 70, one mounted in each of the channels 19. Each rear pivot arm 70 has an elongated shape extending between a first end 72 rotatably receiving a pivot pin 74 which is mounted in opposed wall portions of the channel 19.

The second end 76 of each rear pivot arm 70 also receives a pivot pin 78 which pivotally interconnects the second end 76 of the rear pivot arm 72 to a rear hinge 80. The rear hinge 80 is welded at an opposite end to one side edge of the seat bottom frame 36. In this manner, elevating or lowering movement of the seat bottom frame 36 via the biasing means 64 and user force causes a like and simultaneous pivotal movement of each of the rear pivot arms 70 about the respective pivot pin 74 between the first, lower position shown in phantom in FIG. 4, and a second, elevated position shown in solid wherein the rear end of the seat bottom frame 36 is deployed at the second, elevated, seating position.

The collapsible seat 10 also includes a latch means for latching the collapsible seat 10 in the second elevated position. The latch means is releasible to enable the collapsible seat bottom frame 36 and the seat back frame 38 to be lowered to the first position.

The latch means comprises individual latches 80 mounted to each of the front pivot arms 50 and the rear pivot arms 70. All of the latch means 80 are identical such that the description of the latch means 80, shown in FIG. 5, for the front pivot arm 50 will be understood to apply equally to each of the latch means 80 used with the rear pivot arms 70.

The latch means 80 includes a bracket or striker 82 having a central slot 84. The bracket 82 is mounted by means of fasteners or welding to a side edge of the front pivot arm 50. A tab 86 projects interiorly within a central portion of the bracket 82 along an upper edge of the bracket 82. A plate 88 is mounted on an inner surface of the channel extension 22 and has an outwardly projecting finger 90.

A resilient bumper or cushion member 94 is mounted over the finger 90 on the plate 88. The cushion member 94 includes a solid body formed of a resilient material, such as rubber, and a slot 96 sized to receive the finger 90 to mount the resilient cushion 94 over the finger 90. The cushion 94 engages the tab 86 on the bracket 82 when the front pivot arm 50 is in the second, elevated position to prevent metal to metal contact and to take up any looseness or play in the front pivot arm 50 to prevent undesired movement or vibration of the front pivot arm 50 during operation of the vehicle.

Figure 6:
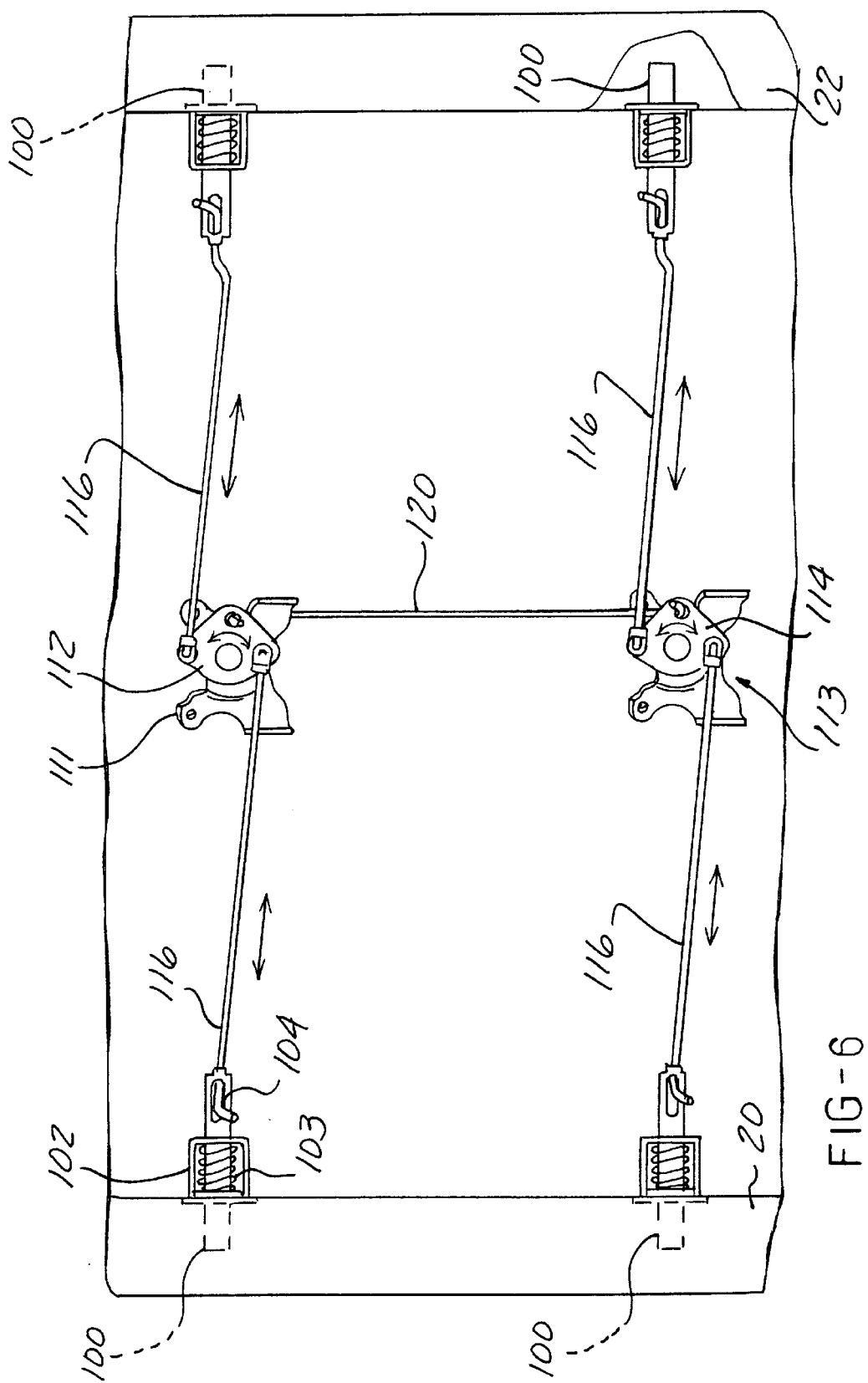
FIG. 6 is a bottom plan view of the latch means of the present invention.

As shown in FIG. 6, each latch means 80 includes a slidingly reciprocally moveable latch finger 100. Four latch fingers 100 are provided, one for each of the front and rear pivot arms 50 and 70. Each latch finger 100 is biased to an outward position relative to channels 19 or channel extensions 20 and 22 by means of a biasing spring 102 mounted within a bracket affixed to an inner surface of the channel extensions 20 and 22 in case of the front pivot arms 50 and to a wall in the channel 19 for the rear pivot arms 70. A connector 104 is mounted in the bracket 103 to control sliding movement of the latch finger 100 between an extended position shown in FIG. 6 to a retracted position within the bracket 102. In the extended position shown in FIG. 6, each latch finger 100 slides through the slot 92 in the plate 88 and into the aligned slot 84 in the bracket 82 on the front pivot arm 50 when the front pivot arm 50 is in the second, elevated position. It will be understood that all the latch fingers 100 engage the corresponding latch means 80 in the front and rear pivot arms 50 and 70 at the same time.

An actuating mechanism, shown in FIG. 6, is provided for moving the latch fingers 100 between the extended and retracted position. The actuating mechanism 110 comprises a first pivotal plate 112 mounted on a second plate 111 affixed to the center panel 18 of the seat frame 12. A slave plate 114 is also rotatably mounted on the panel 18 and is spaced longitudinally from the plate 112. Two rods 116 extend from pivotal connections on the plate 112 to the connectors 104 attached to two latch fingers 100.

As shown in FIG. 6, the individual rods 116 extending from the plate 112 to the latch means 80 associated with each of the front pivot arms 50 are connected on opposite sides of the pivotal plate 112 such that movement of the plate 112 in one direction, such as clockwise, causes simultaneous movement of the rods 116 to extend the latch fingers 100 into the brackets 82. Counterclockwise rotation of the plate 112 results in movement of the rods 116 in an opposite direction to retract the latch fingers 100 from the brackets 82 to unlatch the front pivot arms 50 and enable the front pivot arms 50 be lowered to the first position.

A connector rod 120 interconnects the plate 112 on the actuator 110 with the plate 114 on the slave actuator 113. This couples rotation of the plate 112 to simultaneous and like rotation of the plate 114 and simultaneous movement of the rods 116 and the latch fingers 100 associated with the latch means 80 on the rear pivot arms 70.

The connector rod 120 is connected to the released handle 28 mounted in the panel 26 such that pivotal, upward movement of the handle 28 results in sliding movement of the connector rod 120 to rotate the plates 112 and 114 in a counterclockwise direction to disengage the latch fingers 100 from their respective brackets 82. Release of the handle 28, through an internal biasing spring, not shown, urges the connecting rod 120 in an opposite direction to rotate the plates 112 and 114 in an opposite, clockwise direction to extend the latch fingers 100.

As described above, the channel extensions 20 and 22 which house the front pivot arms 50 and the biasing means 64 are sized to fit within the conventional frame rails of a vehicle. The rear portion of the floor pan of the vehicle need only be recessed a small amount, to enable the entire seat frame 12 to be contained within the recess such that the outer surface of the seat back panel 40, shown in FIG. 1, is flush with the surrounding vehicle floor pan and forms a portion of the floor surface of the vehicle when the collapsible seat 10 is in the first, lowered position. This enables the collapsible seat to be mounted entirely within a vehicle floor without consuming any interior space. This is particularly advantageous in a van when the collapsible seat 10 is employed as the third or rear most seat of the vehicle. As this area is used either for storage or passengers, the collapsible seat 10 of the present invention enables this area to be easily switched between storage and occupant carrying uses merely by lowering or raising the collapsible seat 10.

Depending upon the vehicle construction, the collapsible seat 10 may be mounted by means of suitable fasteners or welding directly on top of an existing vehicle floor, such as in an after market installation on an existing vehicle. Due to the relatively small height, i.e., approximately 65 millimeters, of the frame 12 when the collapsible seat 10 is in the first, lowered or storage position, the collapsible seat 10 consumes only a small amount of interior space above the vehicle floor. This minimal disadvantage is easily outweighed by the significant advantages of versatile use of the interior space within the vehicle storage and occupant seating uses.

The collapsible seat of the present invention also includes a unique seat bottom and/or seat back cushion which includes means for changing the overall profile or height of the cushion so as to enable the collapsible seat of the present invention to present a low profile when in the collapsed, storage position.

As shown in FIG. 8, one or both of the seat bottom and seat back cushions 42 and 44 may be formed with an inflatable member or bladder 43. In such an inflatable construction, the sealed, expansible bladder 43 is mounted within the seat bottom cushion 42 and may be surrounded by exterior foam layers. The bladder 43 is connected to a source of pressurized air. A solenoid valve, an accumulator or pressurized air storage tank, and a compressor are operated by a controller to supply and pressurized air to the interior bladder 43 and to vent or discharge air from the bladder 43 when the collapsible seat 10 is to be moved to the first, storage position. The valve may be opened to enable discharge of the pressurized air from the bladder 43. This inflatable feature enables a low profile seat bottom and/or seat back cushion 42 and 44 to be devised which consumes a minimal volume when the seat 10 is in the first, lowered position. At the same time, the inflatable bladder(s) 43 are expandable to enable the seat bottom and/or the seat back cushions 42 and 44 to assume a normal seat back and seat bottom shape for occupant comfort and safety.

Referring now to FIGS. 9–13, there is depicted another embodiment of means for changing the profile and, in particular, the height of one of the collapsible seat cushions, such as, by example, the seat bottom cushion 42. In this embodiment, a rear shaft 130 is rotatably mounted to opposed brackets 132 and 134 fixed, such as by welding, to a lower portion of the frame element 14 of the seat bottom frame generally in front of the rear end element 16. In a specific implementation, the rear shaft 130 is in the form of spaced first and second shafts 136 and 138 which are fixedly joined by a center stub shaft 140. A rib 141 fixed to the end frame element 16 rotatably carries the stub shaft 140. outwardly extending end shafts 142, 143 extend from opposite ends of the first and second shafts 136 and 138, respectively, into pivotal connection with the brackets 132 and 134.

Figure 10:
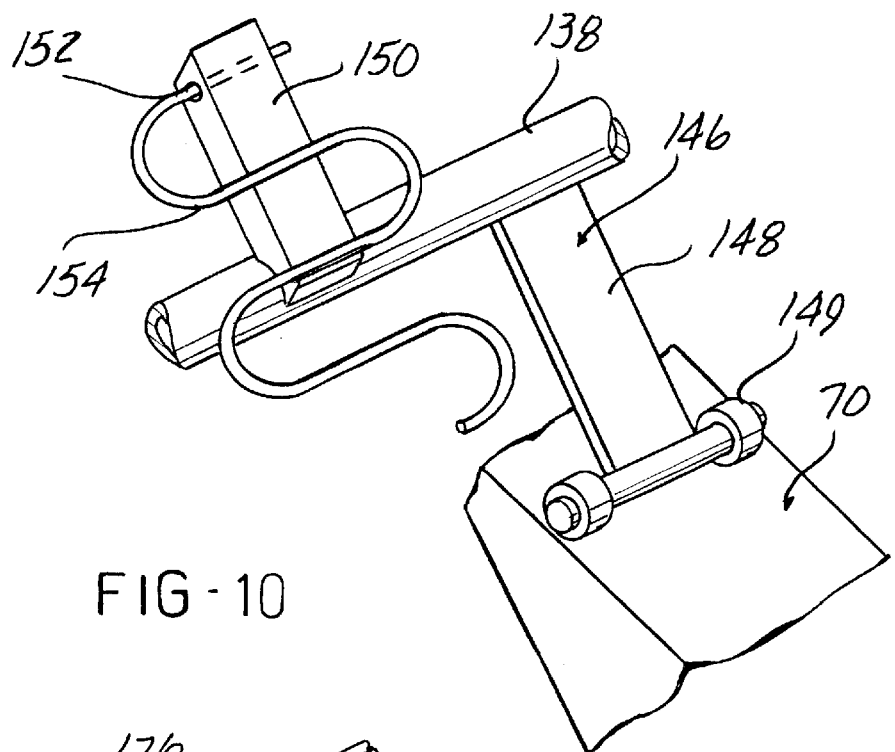
FIG. 10 is an enlarged, perspective view of a portion of the rear shaft finger mechanism shown in FIG. 9.

Means are provided for rotating the rear shaft 130. In a preferred embodiment, the rotating means includes identical, first and second cam followers 144 and 146 which are positioned to ride along one surface of the rear pivot arms 70 as shown in FIGS. 9 and 10. Each cam follower 144 and 146 includes a central, generally planar arm 148 which terminates in a tubular member 149 which engages the rear pivot arm 70. The opposite end of the planar arm 148 is welded to one of the shafts 136 and 138. In this manner, pivotal movement of the rear pivot arm 70, as described above, between collapsed and elevated positions causes the cam followers 144 and 146 to move along the respective rear pivot arm 70 rotating the first and second shafts 136 and 138 in the same direction, i.e. clockwise or counter clockwise, in which the rear pivot arm 70 moves.

A plurality of spaced, seat cushion support means or fingers 150 are fixedly mounted, such as by welding, to the shafts 136 and 138 and project outwardly from each shaft 136 and 138 as shown in FIGS. 9 and 10. Each finger 150 has a generally planar configuration with a first end welded to the shaft 136 and 138 and an opposed end having a laterally extending bore 152 for receiving one end of a seat cushion support spring 154. The conventional seat support spring 154 have a generally serpentine configuration between opposed ends.

Figure 11:
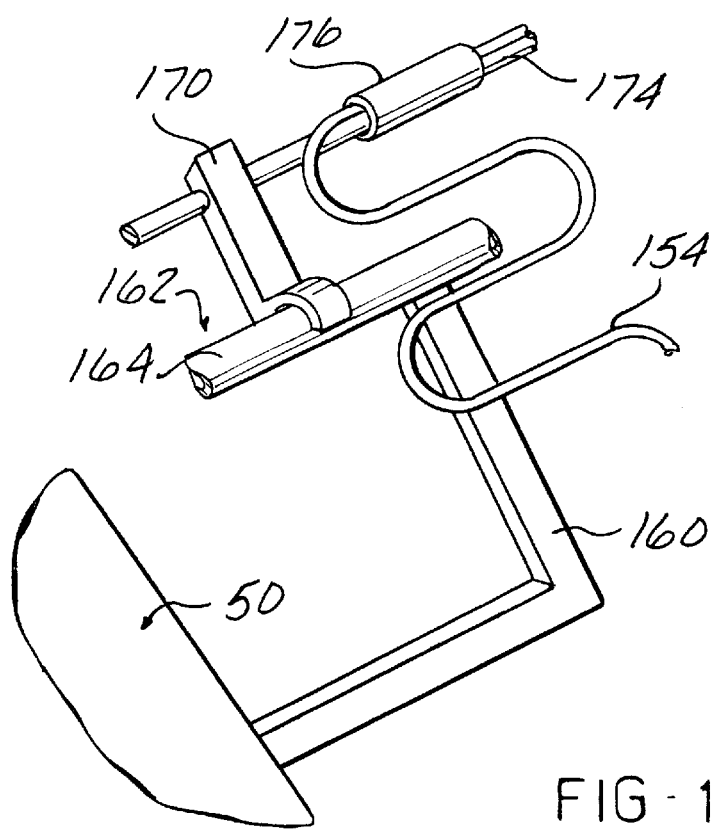
FIG. 11 is an enlarged, partial, perspective view of a portion of the front elevatable finger mechanism shown in FIG. 9.

As shown in FIGS. 9 and 11, a pair of L-shaped brackets 160 are each fixedly mounted in an upper end of each of the front pivot arms 50. For example, one end of each bracket 160 fits within a side recess 162 formed in each front pivot arm 50 as shown in FIG. 9. The other end of each bracket 160 is fixedly attached to, such as by welding, to a front shaft denoted generally by reference number 162. As with the rear shaft 130, the front shaft 162 is formed of first and second shafts 164 and 166 joined by a center stub shaft 168. A rib 169 rotatably supports the stub shaft 168 on the end frame 16. The outer ends of the shafts 164 and 166 are pivotally connected to the upper ends of each the front pivot arms 50 by the shoulder bolt 170 used to attach the hinges 160 to the front pivot arms 50.

A plurality of seat cushion support members or fingers 170 are spaced along the length of the shaft 164 and 166. Each finger 170 has a generally planar end extending from the respective shaft 164 and 166 and an opposed arcuate end which is fixedly welded to the respective shaft 164 and 166. Outer end fingers 172 are provided with an offset shape to support outer ends of an upper pin 174. The outer end fingers 172 are attached to a pad 175 welded to the hanger 160 on the front pivot arm 50.

The pin 174 receives a plurality of spaced collars 176 which slidably receive one end of each spring 154 as shown in FIGS. 9 and 11. In this manner, the springs 154 are supported between the fingers 150 in the rear shaft 130 and the fingers 170 in the front shaft 162.

Figure 12:
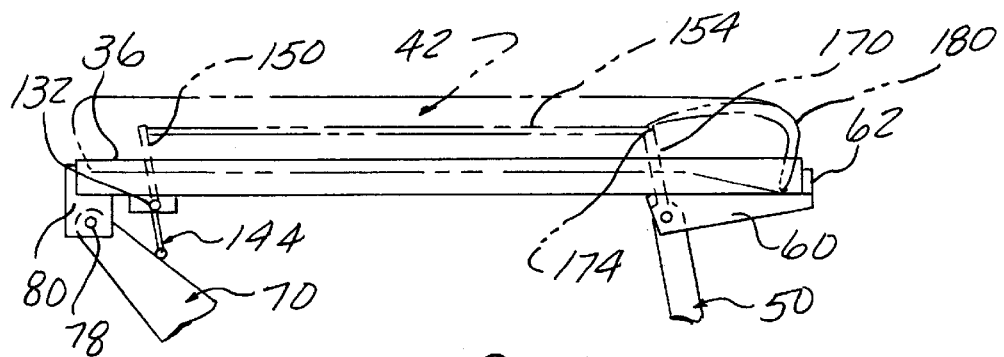
FIG. 12 is a side elevational view of the collapsible seat with the front and rear fingers depicted in their elevated positions.

As shown in FIG. 12, an optional front edge support 180 is fastened to the pin 174 at one end and to the bottom portion of the seat bottom frame at an opposite end. The support 180, which is formed of a flexible, but stiff polypropylene, deploys into a smooth arcuate scape, shown in FIG. 12 when the collapsible seat 10 is in the elevated position to support the front edge of the seat bottom cushion 42.

In operation, with the collapsible seat 10 in the elevated position, the front and rear pivot arms 50 and 70 move to an extended position as shown in FIG. 12. During such upward pivotal movement, the L-shaped brackets 160 coupled to the front pivot arms 50 rotate the front shaft 162 in a direction pivoting the front fingers 172 to a generally upright, vertical position shown in FIG. 12 to elevate the front edge of the seat cushion 42. At the same time, the cam followers 144 move upward along the rear pivot arms 70 under a pulling force exerted by the front fingers 170 and the springs 154 on the rear fingers 150 to rotate the rear shaft 130 pivoting the rear fingers 150 to the elevated, substantially vertical position shown in FIG. 12. This position represents the fully deployed, elevated position of the seat bottom cushion 42.

Figure 13:
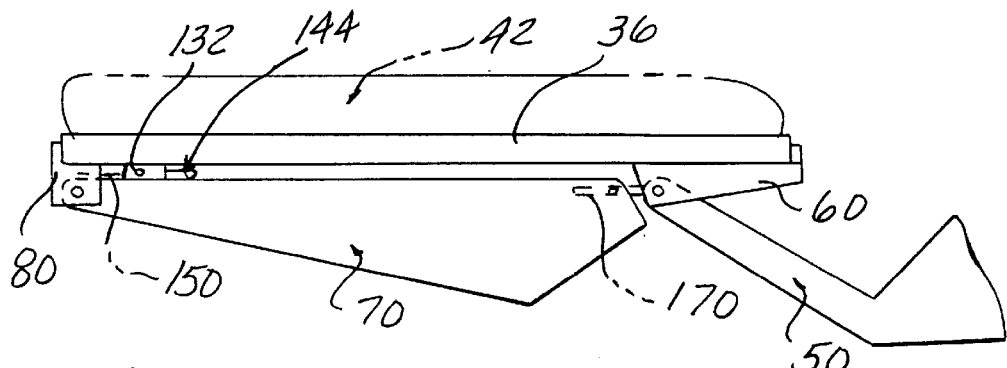
FIG. 13 is a partial, side elevational view showing the fingers in their lowered position.

During a collapsing or lowering movement of the seat 10, the front shaft 162 rotates in an opposite direction causing the front fingers 170 to pivot and lower the front end of the springs 154. This causes the front edge of the seat bottom cushion 142 to be lowered and moved slightly rearward relative to the underlying seat bottom frame. At the same time, the cam followers 144 ride downward along the rear pivot arms 70 as shown in FIG. 13, causing the rear shaft 130 to rotate in a direction to lower the rear fingers 150 thereby lowering the rear end of the springs 154 and the rear end of the seat bottom cushion 42.

In this manner, the overall profile or height of the top surface of the seat bottom 42 relative to the seat bottom frame is decreased. In a specific embodiment, the rear fingers 150 move through an approximate 630 arc from the elevated position shown in FIG. 12 to the lowered position shown in FIG. 13. This causes a drop in vertical height of the upper surface of the rear end of the seat bottom cushion 32 of approximately 39 millimeters. During such lowering movement, the front fingers 170 move through an arc greater that 630 to effect a lowering of the front edge of the seat bottom cushion 42 of approximately 50 millimeters.

Referring now to FIGS. 14–24, there is depicted another embodiment of a collapsible seat 200 according to the present invention. The collapsible seat 200, as in the previous embodiment, includes a seat back 202 pivotally mounted on a seat bottom 204 for movement between a first lowered, collapsed position in close overlaying relationship with the seat bottom 204 to a second, elevated position shown in FIG. 14, generally disposed at a perpendicular or obtuse angle with respect to the seat bottom 204.

Figure 14:
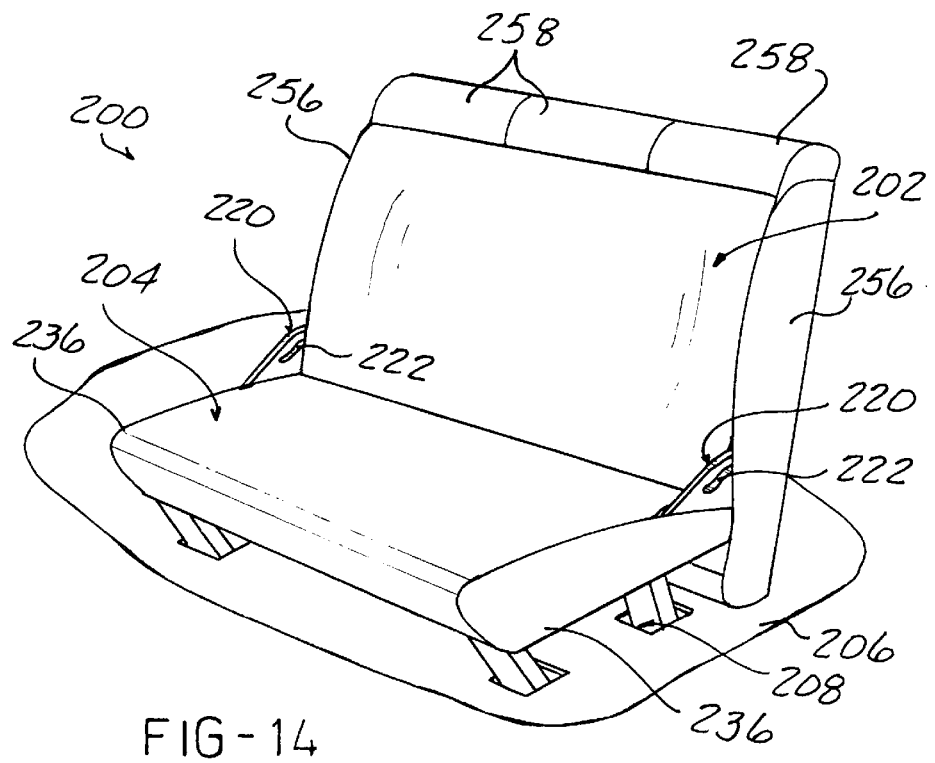
FIG. 14 is a front perspective view of another embodiment of a collapsible seat according to the present invention shown in the elevated position.
Figure 15:
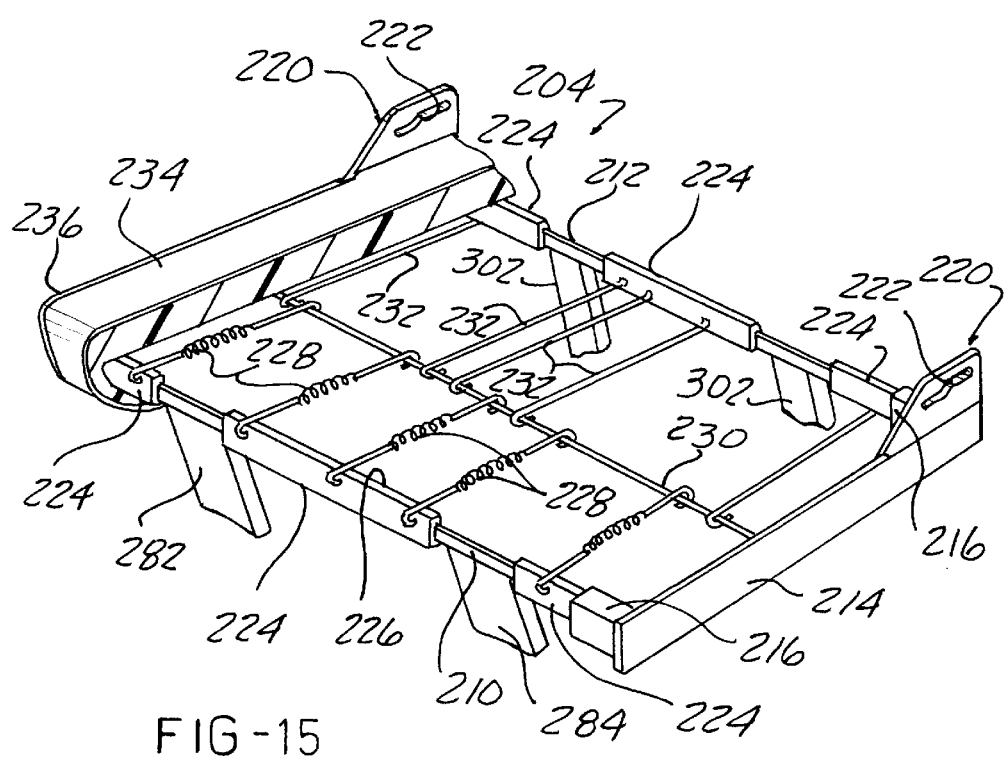
FIG. 15 is a partially broken away, perspective view of the seat bottom of the collapsible seat shown in FIG. 14.

The seat bottom 204 is likewise pivotally mounted with respect to a underlaying support surface 206, such as a vehicle floor, by means of a pivot linkage shown generally by reference number 208. The seat bottom 204 includes a pair of rotatable tubular members 210 and 212, shown in FIG. 15, which are spaced in parallel and extend laterally across the seat bottom 204. End members 214, only one of which is shown in FIG. 15, are mounted over opposed ends of the tubular members 210 and 212 by means of cylindrical hubs 216 projecting from each end member 214 and rotatably receiving one end of the tubular members 210 and 212. Each of the end members 214 has an enlarged flange 220 at a rear end thereof which projects upwardly above the top exterior surface of the seat bottom 204 as shown in FIG. 14. A guide slot 222 is formed in each flange 220 for receiving one end of a rod, as described hereafter.

One or more tubular support members 224 are mounted about each of the tubular members 210 and 212. The support members 224 have a radially extending flange 226 extending therefrom. A plurality of spaced apertures are formed along the length of the flange 226 and receives one end of a plurality of laterally spaced tension springs 228. The other ends of each of the springs 228 are hooked about a transversely extending tension wire 230 connected at opposite ends to the opposed end members 214.

The support members 224 may be rotatably mounted about each tubular member 210 or 212, or fixed thereto by means of fasteners, welds, etc., for rotation with each of the tubular members 210 and 212.

The transverse tension wire 230 also receives one end of a plurality of tension wires 232 which are connected at opposite ends to apertures in the support members 224 mounted about the rear tubular member 212. The tension wires 230 and 232 and the springs 228 support a cushion or resilient pad, such as a foam pad 234. The cushion or pad 234 may be trimmed with an exterior piece of suitable seat material, such as vinyl, leather, etc. As shown in FIG. 14, the front edge of the cushion and the exterior material curve arcuately along the front edge of the cushion 234. As also shown in FIG. 14, a pair of side trim members 236 are mounted on each of the end members 214 to provide an exterior surface consistent with the exterior surface of the surface 234.

Figure 21:
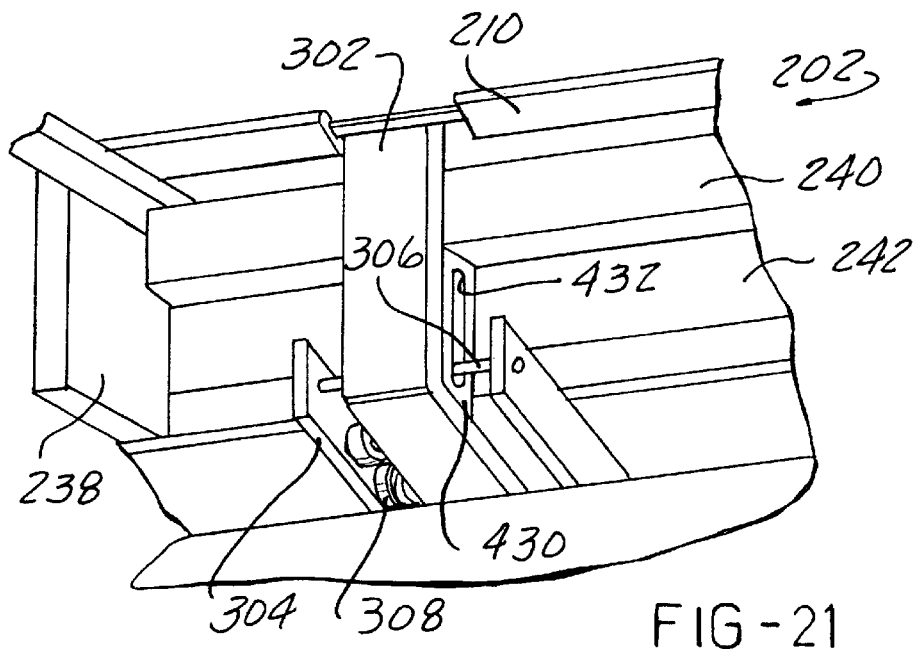
FIG. 21 is a perspective view of the assembled rear link shown in FIG. 20.
Figure 22:
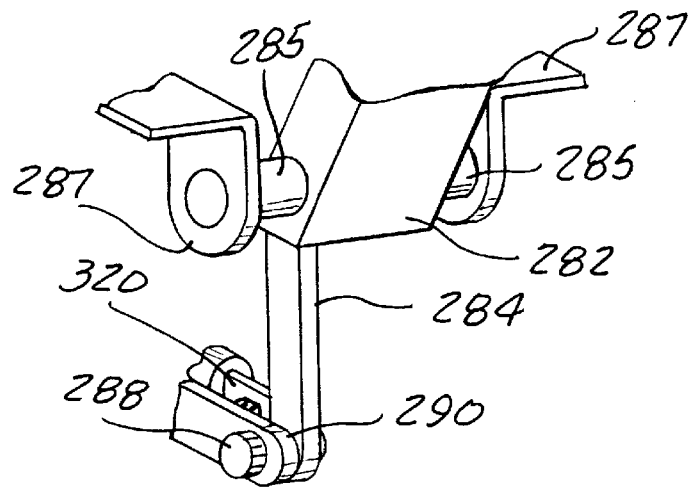
FIG. 22 is a front, perspective view of the front link shown in FIG. 20.

The construction of the seat back 202 is depicted in detail in FIGS. 16A, 16B, 17, 18, 19 and 21. Referring briefly to FIG. 21, the seat back 202 includes a pair of side channel members 238, only one of which is shown in FIG. 21. Each side channel member 238 extends vertically when the seat back 202 is in the elevated or raised position shown in FIG. 14. A bottom channel member 240 extends between and is joined to the lower portion of the two side channel members 238. A back plate 242 is mounted by means of fasteners or welds to the side channel members 238 and the bottom channel member 240 and extends substantially across the entire width of the seat 200 between the side channel members 238 and from the bottom channel member 240 to the opposite end of the side channel members 238.

Figure 16B:
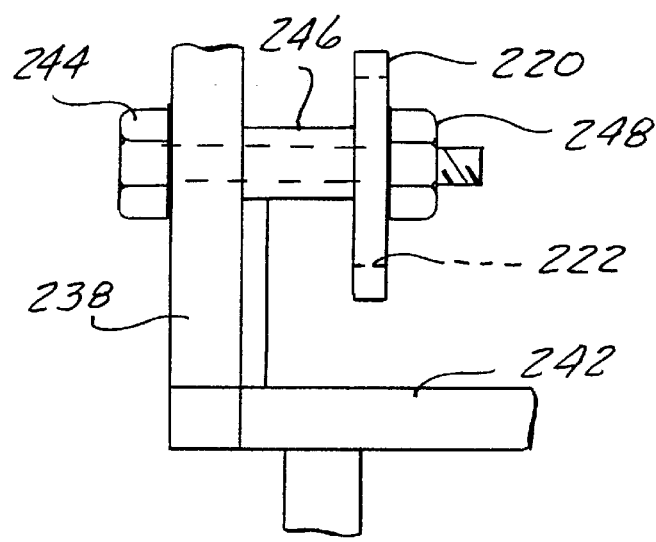
FIG. 16B is a partial, front elevational view of the seat back to seat bottom pivot.
Figure 16A:
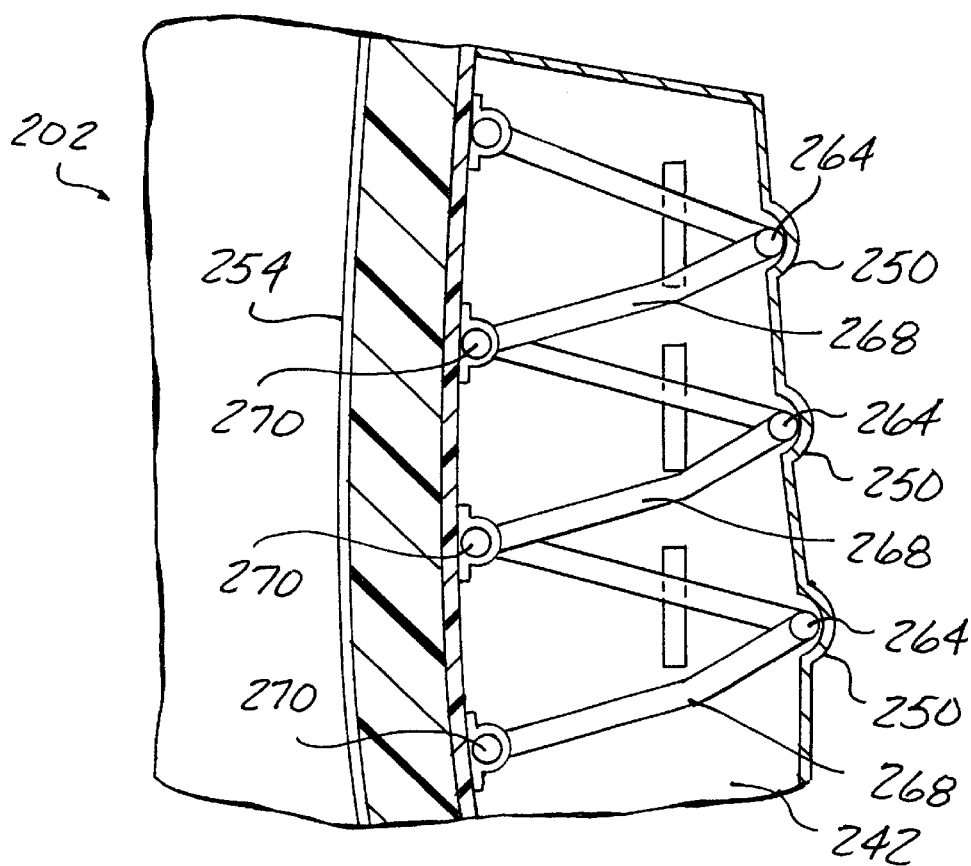
FIG. 16A is a partially broken away, perspective view of the seat back of the collapsible seat shown in FIG. 14.

The seat back 202 is pivotally connected to the seat bottom 204 by means of a pivot connection, shown in detail in FIG. 16B, extending through the side channel members 238 on the seat back 202 and the enlarged flange 220 on the seat bottom 204. A shoulder bolt 244 extends through an aperture in each side channel member 238, a sleeve 246, and an aperture in the enlarged flange 220 to a threaded weld nut 248 welded to an inner side of the flange 220. The shoulder bolt 244 defines the pivot point for pivotal movement of the seat back 202 with respect to the rear edge of the seat bottom 204.

The seat back 202 also includes a cushion 252 formed of a resilient material, such as foam, etc. An exterior surface or layer 244 is applied to the cushion 252 or integrally formed therewith. Trim pieces 256 are mounted about the exterior surfaces of the side channel members 238, as shown in FIG. 14, to present an aesthetic exterior for the seat back 202.

Figures 17, 18:
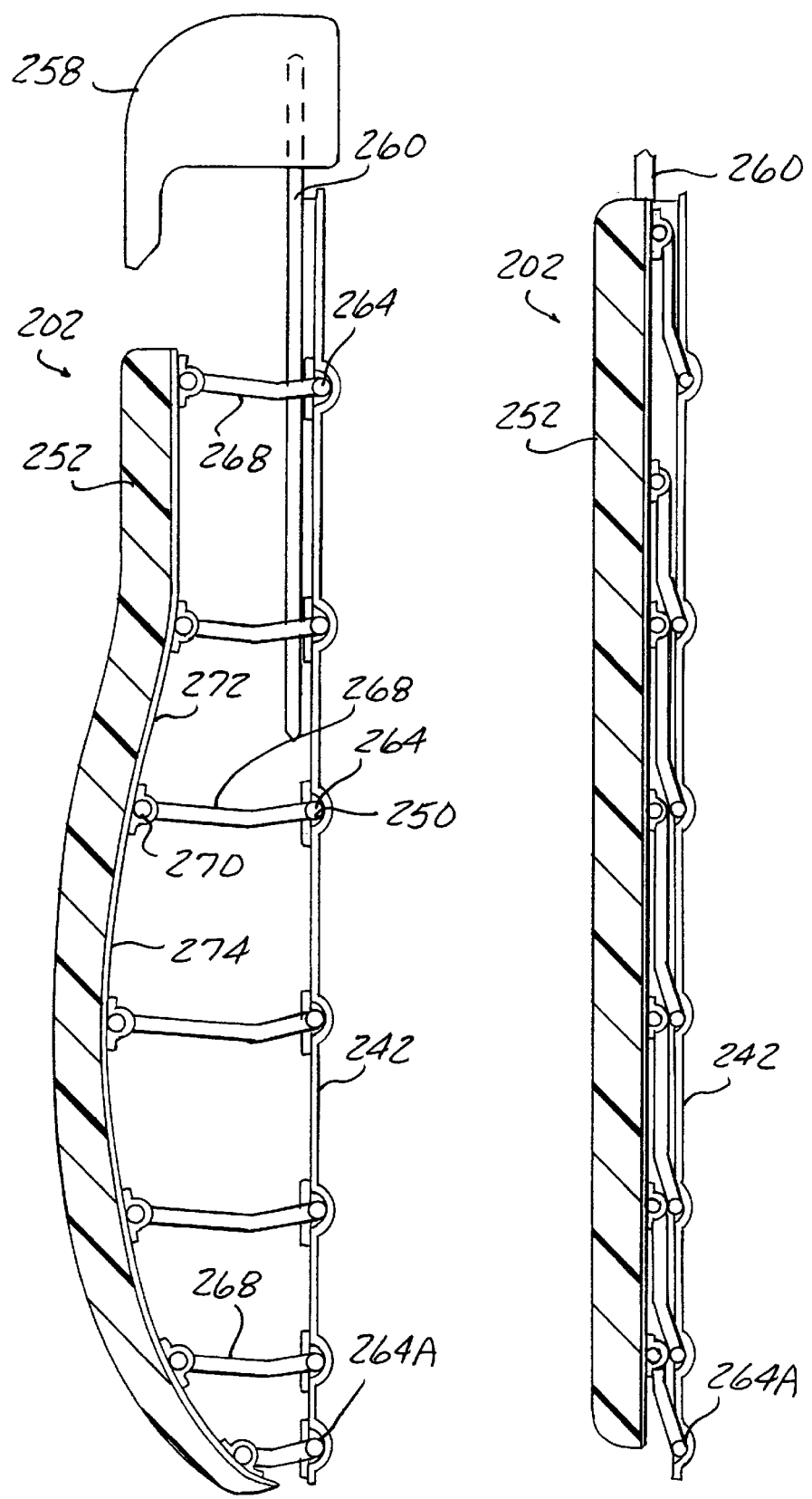
FIG. 17 is a side, cross-sectional view of the seat back shown in FIG. 16 depicted in the elevated position.
FIG. 18 is a side, cross-sectional view of the seat back in the collapsed position.

At least one and, preferably, a plurality of extendable and retractable head rests 258 are mounted in the seat back 202 generally along an upper edge of the seat back 202 as shown in FIGS. 14, and 17. Each head rest 258 includes a cushion member mounted on a post 260 which is slidably mounted in a sleeve affixed to the back plate 242.

A moveable means is interposed between the back plate 242 and the cushion 252 of the seat back 202 for changing the contour and height of the exterior surface for the entire cushion 252 with respect to the back plate 242 as the seat back 202 is moved between the elevated position and the collapsed position. In the elevated position shown in FIGS. 14 and 17, the moving means deploys the cushion 252 at its normal seat back supporting position with an enlarged arcuate lower portion generally in the lumbar region of a seat user. However, the moving means is capable, as the seat back 202 is moved to the collapsed position, of retracting the cushion 252 into the surrounding frame formed of the side channel members 238 and the bottom channel member 240 into a generally planar arrangement which presents a reduced height as compared to the extended position shown in FIG. 17.

The moving means, as shown in FIGS. 16A–18, includes a plurality of laterally extending rods 264 each of which is rotatably mounted in one of a plurality of recesses 250 in the back plate 242. A plurality of tabs 266 are spaced along and overlay each rod 264. The tabs 266 are welded or secured by suitable fasteners to the back plate 242 thereby rotatably holding each rod 264 in the respective recess 250.

A plurality of support rods 268 are secured, such as by welding, at laterally spaced positions along the length of each rod 264 and project generally perpendicularly therefrom. By way of example only, each support rod 268 has an arcuate end portion joined to the rod 264 which smoothly extends into a generally planar or straight opposed end. The opposite ends of each of the support rods 268 are fixed, such as by welding, to a movable rod 270. The movable rods 270 likewise extend laterally across the seat back 202 and are spaced from each other in a generally parallel arrangement. A plurality of U-shaped clamps 272 are laterally spaced along the length of each moveable rod 270 and are secured by adhesive, clips, etc., to a flexible, stiff sheet 274 formed of ABS by example only. The sheet 274 is fixed to one side of the cushion 252. In this manner, the moveable rods 270 are rotatably attached to the sheet 274 and the cushion 252; but pivot about the tubular rods 264 through the support rods 268.

The lowermost lateral rod 264A projects outwardly from opposed sides of the seat back 202 and slidably engages the guide slots 222 in the enlarged flanges 220 in the seat bottom 204. The outer ends of the lowermost guide rod 264 guide the pivotal movement of the seat back 202 with respect to the seat bottom 204 as the seat back 202 is moved by manual force between the elevated position shown in FIG. 14 and the collapsed position shown in FIG. 19.

While the lateral rods 264 and the movable rods 270 may be formed of a relatively rigid, strong material, such as steel, aluminum, etc., the support rods 268 are preferably formed by material or have a construction which provides a degree of resiliency or springiness to the cushion 252. This can be achieved by forming the support rods 268 of a thin steel member, a suitable plastic, etc. In addition, coil springs may also be employed as the support rods 270.

Figure 19:
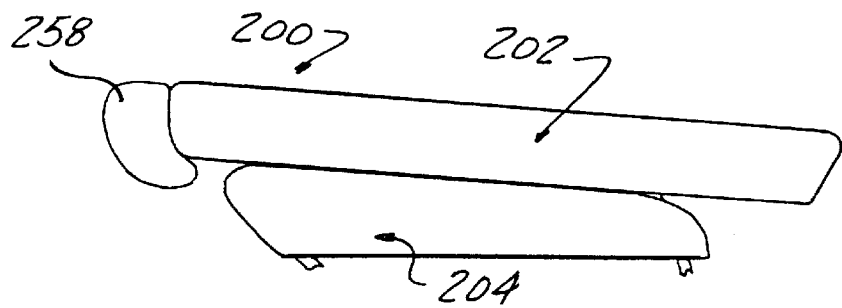
FIG. 19 is a side elevational view of the complete collapsible seat shown in FIG. 14 depicted in the collapsed position.
Figure 20:
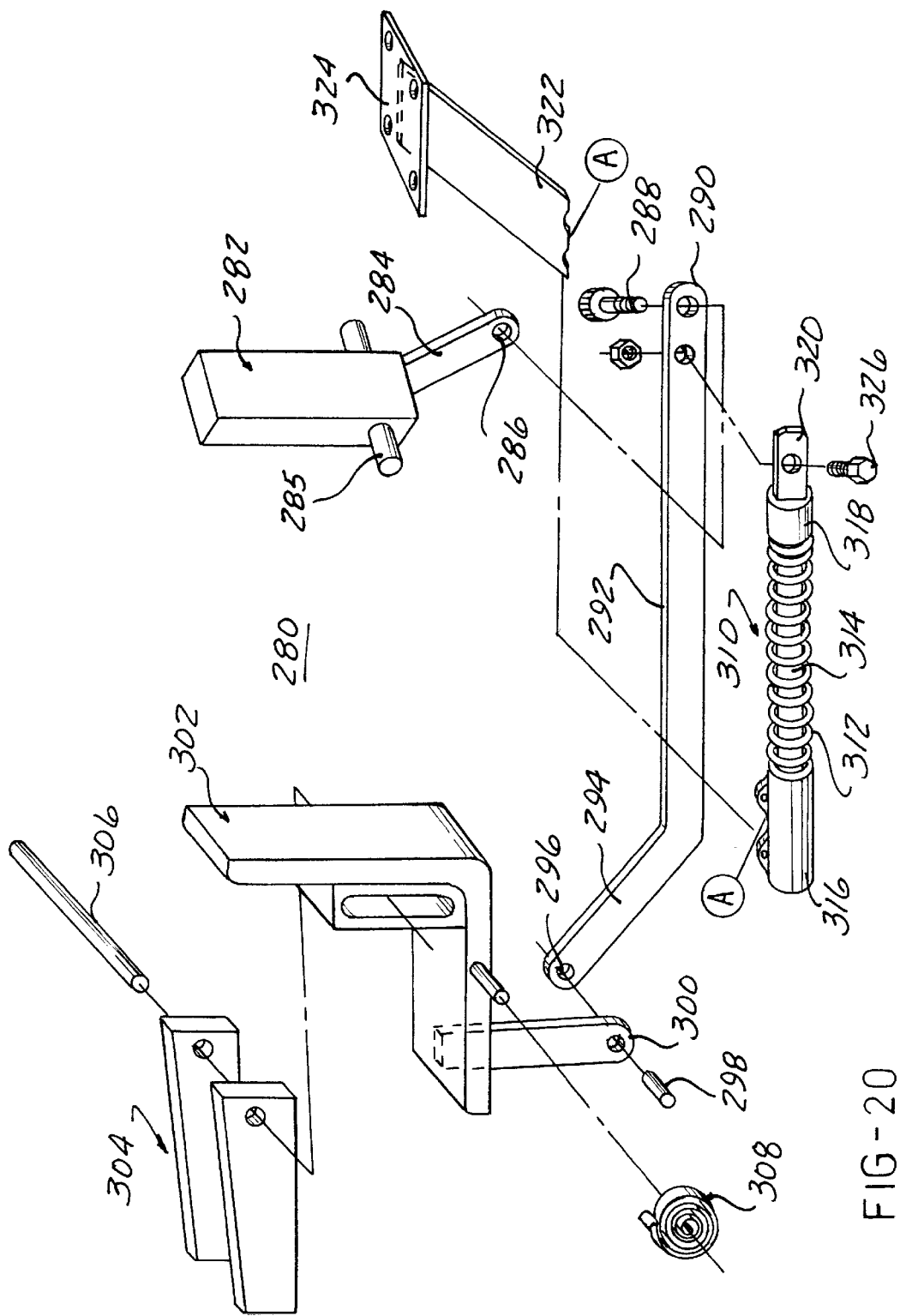
FIG. 20 is an exploded, perspective view of the pivot linkage of the collapsible seat shown in FIG. 14.

A pivot linkage 280 shown in FIG. 20, controls the pivotal movement of the seat bottom 202 between a first, collapsed or lowered position shown in FIG. 19 and a second, elevated or deployed position shown in FIG. 14. The pivot linkage 280 is formed of two link assemblies, each mounted on opposite lateral sides of the seat bottom 204. As the link assemblies 280 are identical, the following description of one link assembly 280 will be understood to apply equally to the opposite link assembly 280.

As shown in FIGS. 15 and 20, each link assembly 280 includes a front pivot leg 282, the upper end of which is fixably secured, such as by welding, to the front most rotatable tubular member 210 in the seat bottom 204. Each front pivotal leg 282 is formed of a suitable high strength material, such as steel, or, preferably, aluminum. An arm 284 is welded to a lower end of each front pivot leg 282 and projects outwardly therefrom. An aperture 286 in the tab 284 receives a pivot pin 288 to pivotally connect the lower end of the front pivot leg 282 to a first end 290 of a control link 292. The control link 292 is in the form of an elongated strap having an angled opposed end 294 carrying an aperture 296.

The aperture 296 in the second end 294 of the control link 292 is pivotally connected by a pivot pin 298 to an aperture in an arm 300 projecting outward from one end of a rear pivot leg 302. The rear pivot leg 302 has an angled shape formed of two generally planar end portions joined at a center and disposed at an obtuse interior angle, by example only. The upper end of the rear pivot leg 302 is fixed, preferably by welding, to the rearmost tubular member 212. Further, the rear pivot leg 302 is pivotally mounted to a support surface, such as the vehicle floor 206, by a pair of spaced flanges, not shown, which receive a pivot pin 305 therethrough. The pivot pin 305 extends through a bore located toward the bottom of the rear pivot leg 302. A biasing means 308, such as a wound spring, is wound around a post extending outward from one leg of the mounting bracket 304 and terminates in an end coupled to a pin on the rear pivot leg 302 to exert a biasing force urging the rear pivot leg 302 toward the second, elevated position.

Counterbalance means 310 are operably coupled to the link assembly 280 to counterbalance the weight of the collapsible seat 200 and aid in raising the seat from the collapsed position to the elevated position. The counterbalance means 310 includes a coil spring 312 mounted about an elongated rod 314. The spring 312 is seated between two collars 316 and 318 with an outer end of the rod 314 terminating in a mounting flange 320 extending from the collar 318. One end of the rod at 314 is movably supported in the collar 316 by the spring 312.

An attachment leg 322 is fixed to the collar 316 at one end and to a mounting plate 324 secured by means of suitable fasteners to the floor 206 to support the counterbalance means 310 in a fixed position below the floor 206. The mounting flange 320 is pivotally connected to a mounting pin 326 projecting from one side of the control link 292 to pivotally attach the counterbalance means 310 to the control link 292. In this manner, the spring 312 of the counterbalance means 310 exerts a biasing force on the controlling 292, normally urging the control link 292 and the front and rear pivot legs 282 and 302 connected thereto toward the second, elevated position.

A pivot pin 285 is mounted in a lower end of the front pivot leg 282 and projects outwardly from opposite sides of the front pivot leg 282 as shown in FIG. 20. The outer ends of the pivot pin 285 are pivotally mounted in mounting brackets 287, shown in FIG. 22, which are fixedly attached to the floor 206.

A rigid bar 430, shown in FIGS. 20, 21, 23, and 24, is fixably mounted to the back plate 242, generally behind each rear pivot leg 302. The rigid bar 430 extends from the bottom of the tubular member 240 toward the bottom of the back plate 242. A slot 432 is formed in the bar 430 and receives a pivot pin 306 extending between opposed side walls of the mounting bracket 304.

The bar 430 and pivot pin 306 cause pivotal movement of the seat back 202 relative to the seat bottom 204 during elevating and lowering of the seat 200. As the seat back 202 is pivotally connected to the seat bottom 204 by the shoulder bolt 244 shown in FIG. 16b, the lower portion of the seat back 202 pivots about the rear portion of the seat bottom 204 about a pivot point formed by the shoulder bolt 244. However, the pivot pin 306 slides in the rigid bar 430 attached to the bottom of the back plate 242 of the seat back 202 to forcibly urge the seat back 202 to pivot between elevated and lowered positions relative to the seat bottom 204 during pivotal movement of the seat bottom 204 itself. The converse operation, i.e., pivoting of the seat bottom under pivotal movement of the seat back is also possible.

Figure 23:
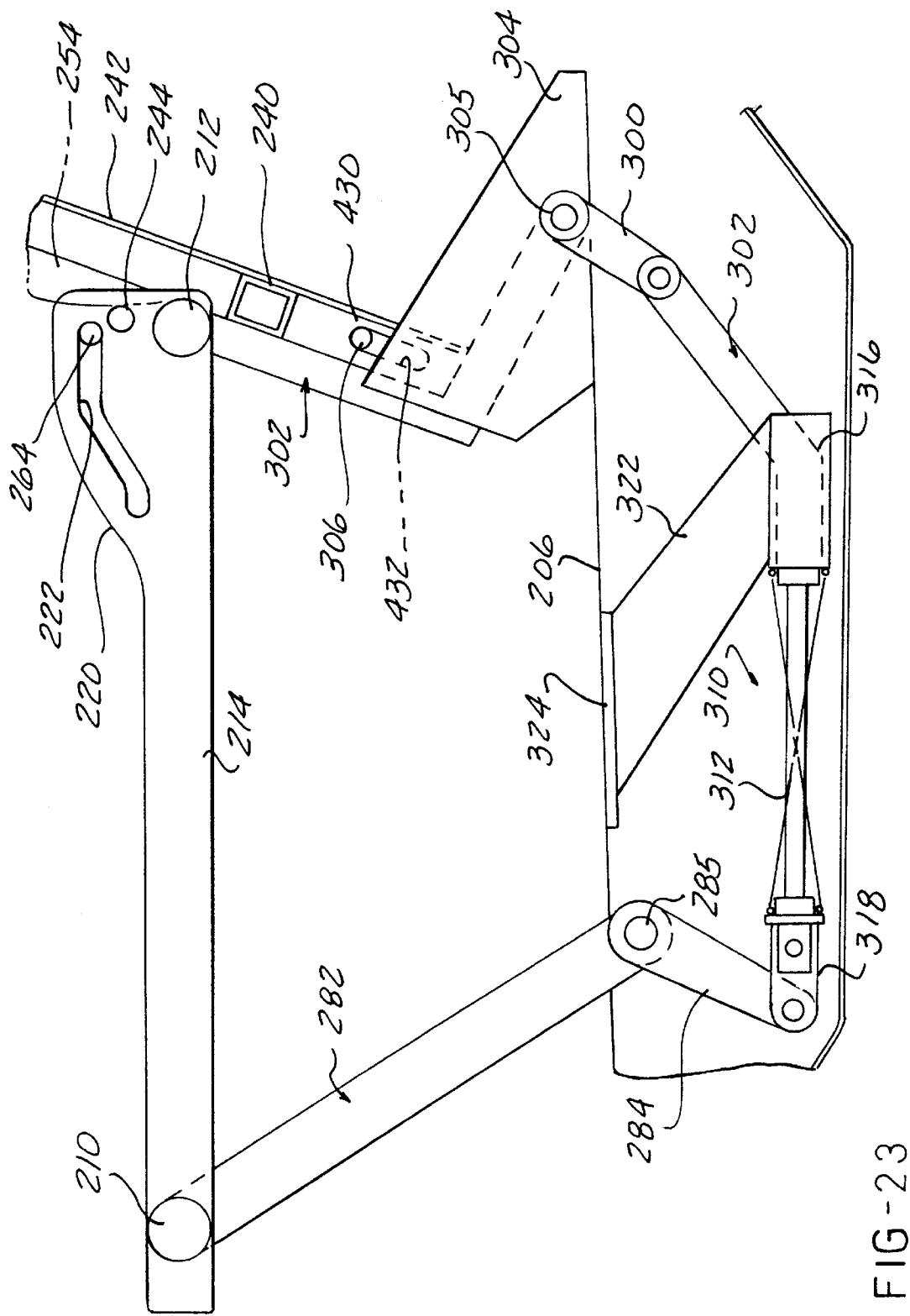
FIG. 23 is a side elevational view of the linkage shown in FIG. 20, depicted in the elevated position.

Referring now to FIG. 23, there is depicted the position of the various elements of the link assembly 280 when the collapsible seat 200 is in the second, elevated position shown in FIG. 14. In this position, the counterbalance spring 312 is in an extended state exerting a biasing force to maintain the front pivot leg 282 and the rear pivot leg 302 in the elevated position. It should be noted that a suitable latch may be employed with the counterbalance means and/or link assembly 280 to releasably latch the collapsible seat 200 in the elevated position.

When it is desired to lower the seat 200 to the collapsed position shown in FIG. 19, manual force is exerted on the seat back 202 to pivot the seat back 202 about the pivot axis or bolt 244. During such pivotal movement, the lowermost lateral rod 264 in the seat back 202 slides along the guide slots 222 in the flanges 220 on the frame of the seat bottom 204 to control the expansion and retraction of the seat back cushion 252 with respect to the surrounding seat back frame as shown in FIGS. 16 and 17.

Figure 24:
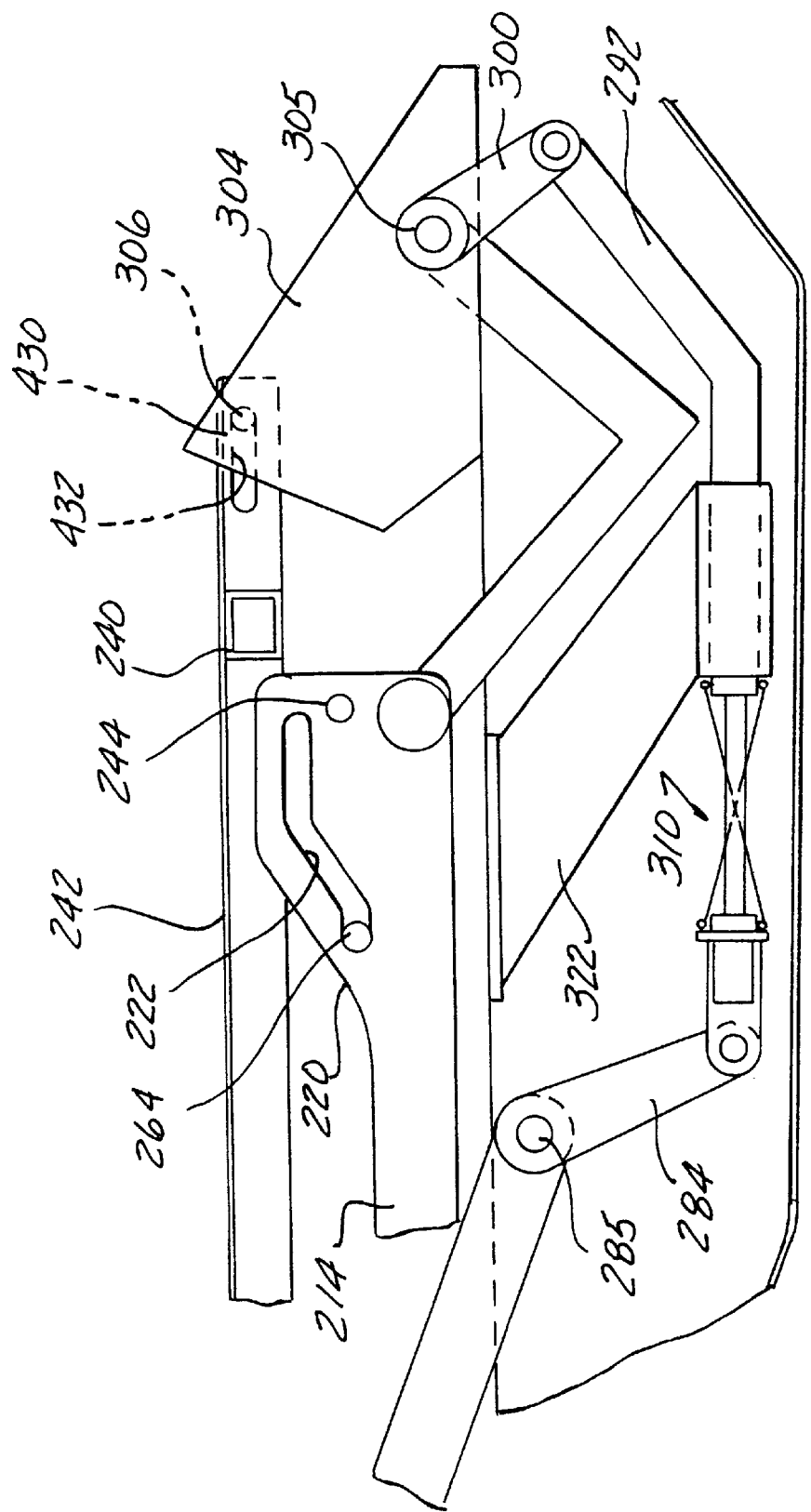
FIG. 24 is a side elevational view of the linkage of FIG. 20 depicted in the collapsed position.

As shown in FIG. 24, the rear pivot leg 302 pivots about the pivot pin 305 lowering the upper end of the rear pivot leg 302. This pushes the control link 292 forward which in turn causes the arm 284 on the front pivot leg 282 to pivot forwardly about the pivot pin 285. This forward movement of the arm 284 pivots the front pivot leg 282 about the pivot pin 285 in a counterclockwise direction in the orientation shown in FIG. 24 to bring the opposite end of the front pivot leg 282 and the tubular member 210 mounted thereon downward toward the floor 206. As the tubular members 210 and 212 are respectively attached to the front pivot leg 282 and the rear pivot leg 302 and rotatably mounted in the end members 214, the seat bottom 204 remains generally horizontal during the collapsing movement as it moves downward toward the floor 206.

During such a forward, lowering movement of the seat bottom 204, the flanges 220 pull the lowermost guide rod 264 in the seat back 202 forward resulting in pivotal movement of the rods 264 to collapse the seat back cushion 252 into the surrounding seat back frame as the seat back 202 pivots about the shoulder bolt 244 relative to the seat bottom 204.

As the shoulder bolt 244 moves forward and downward during the collapsing movement of the seat bottom 204, the entire seat back 202 likewise moves forward and pivots about the pivot pin 306 and the rigid bar 430 toward the seat bottom 204 as the seat bottom 204 itself moves forward and downward.

The seat back 202 moves downward toward the seat bottom 204 until the seat back 202 reaches the fully lowered, collapsed position shown in FIG. 19. In this position, the back surface of the seat back 202, which is formed by the back plate 242, has a generally horizontal orientation, thereby enabling the back plate 242 of the seat back 202 to act as a floor surface within the surrounding vehicle floor 206. Further, as also shown in FIG. 19, during such collapsing movement, the moving means in the seat back 202 pivot about the lateral rods 264 bringing the seat back cushion 202 from the deployed, fully expanded, contoured position shown in FIG. 19 to the generally planar, collapsed position, shown in FIG. 18 wherein the seat back cushion 252 is generally contained within the surrounding tubular frame of the seat back 202, thereby reducing the overall height of the seat back 202 as well as the overall height of the entire collapsible seat 200 when the collapsible seat 200 is in the collapsed position shown in FIG. 19.

As further shown in FIG. 19, the headrest 254 is oriented on the upper end of the seat back 202 so as to overlie the forward end of the seat bottom 204 when the seat back 202 is in the collapsed position to again provide a small, compact, shape to the entire collapsible seat 200.

This process is simply reversed to move the seat back 202 to the elevated position shown in FIG. 14.

The operation of the collapsible seat 200 described above is under manual force exerted by a user. It is also possible, within the scope of the present invention, to provide a power drive means for powering the collapsible seat 200 between the collapsed and elevated positions. An example of such a power drive means is shown in FIG. 25 and includes a motor 330 having an output shaft 332 connected to a gearbox or transmission 334. A pair of oppositely extending shafts 336 and 338 project oppositely from the gearbox 334 and are connected to universal joints 340 to individual drive shafts 342 and 344 each of which terminate in a second universal joint 346. A worm 348 projects from the second universal joint 346 and engages a corresponding worm gear in a transmission 350 fixedly mounted in a bracket 352 supported typically below the vehicle floor or support surface 206. A threaded drive nut is contained within the transmission 350 and engages a threaded rod 354. Rotation of the worm gear and the drive nut causes bi-directional translation of the rod 354.

A mounting flange 358 extends outwardly from one end of the rod 354. The mounting flange 358 can be pivotally connected to the pin 326 on the control link 292 shown in FIG. 20 to provide a bi-directional drive force to push or pull the control link 292 in opposite directions to thereby raise and lower the link assembly 280 and move the collapsible seat 200 between the elevated and collapsed positions in the same manner as described above.

Referring now to FIGS. 26–29, there is depicted yet another embodiment of a linkage for a collapsible seat according to the present invention. In this embodiment, the linkage 366 is adapted to be removably insertable into a receptacle or cup 368 formed in a vehicle 4 side rail 370. The receptacle is defined by opposed side walls 372, a bottom wall 374, closed end walls 376 and an open top, all of which cooperate to define an interior cavity shown in FIGS. 26–29. The outer receptacle 368 is securely fixed or mounted in the vehicle rail 370 by suitable fasteners or by welds on outwardly extending flanges formed at the upper ends of the side walls 372. Alternately, the side rail 370 itself could form the receptacle by providing an opening in the floor pan to expose and allow access to a portion of the interior of the hollow side rail 370.

As shown in FIGS. 26–29, a first latch pin 378 is mounted on an upper portion of one sidewall 372 adjacent one end wall 376 and extends into the interior cavity in the receptacle 368. A second latch pin 380 also extends laterally inward from an upper portion of the sidewall 372 adjacent to a rear end wall 376.

A carrier 382 is formed with a shape generally complementary to the interior cavity in the receptacle 368 so as to be releasably mountable in the receptacle 368. The carrier 382 has an open top, receptacle-like configuration formed of opposed side walls 384, an integral bottom wall 386 and opposed end walls 388. The linkage 366 is pivotally mounted within the carrier 382 by a first pivot pin 390 which is mounted in at least one or preferably extends between both side walls 384 of the receptacle 368.

In this embodiment, the linkage 366 includes a front pivot leg 394, which is fixedly connected to the front tubular member 210 at one end and to a pivot link 396 at an opposite end. The pivot link 396 is pivotally mounted on the pivot pin 390 and is also pivotally connected to a control link 398. The control link 398 is pivotally connected at an opposite end by the pivot pin 392 to a rear pivot leg 400 which is formed of first and second legs 402 and 404 which are pivotally connected by pin 406.

Figure 26:
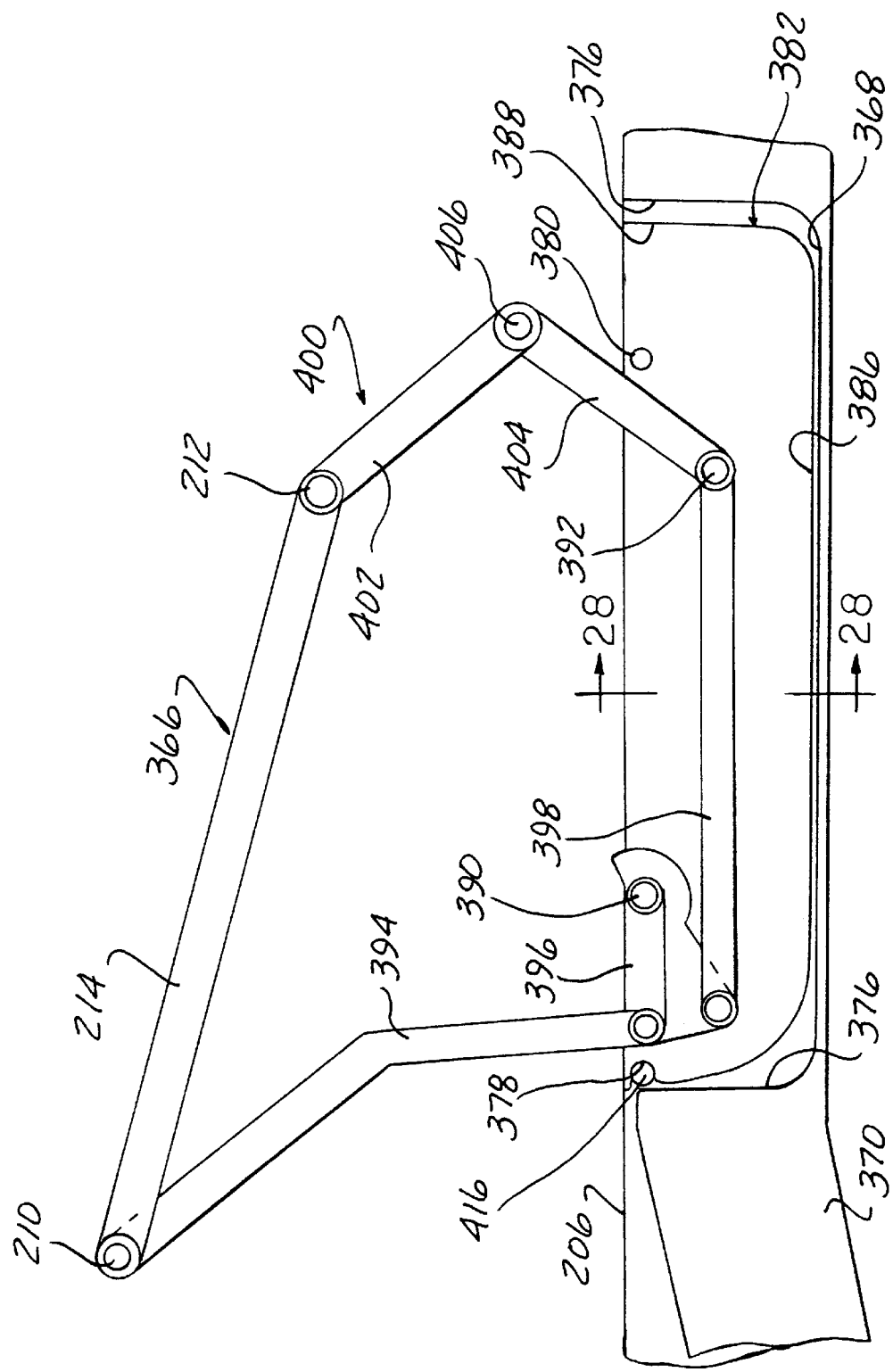
FIG. 26 is a side elevational view of another embodiment of a pivot linkage employable with the seat of FIG. 14, depicted in the elevated position.

The linkage 366 is extendable to the elevated position shown in FIG. 26 upon rearward pivoting of the seat back 202 relative to the seat bottom 204 as described above. Conversely, the linkage 366 is collapsible to a lower position shown in FIG. 27 upon downward pivoting of the seat back 202 relative to the seat bottom 204.

A latch 408 shown in FIG. 27 is and is pivotally mounted on one of the sidewalls 384 of the carrier 382 and has an open ended notch 410 which is releasably engageable with the second latch pin 380. A biasing means, such as a coil spring 412, connected to the carrier 382 at one end and to the latch 408 at another end, biases the latch 408 to the latching position shown in FIG. 27. A pivot arm 414 is mounted on the latch 408 for manually pivoting the latch 408 counterclockwise in the orientation in FIG. 27 to disengage the notch 410 in the latch 408 from the second latch pin 380 to enable the entire carrier 382, the linkage 366, and the attached seat bottom 204 and seat back 208 to be entirely removed from the vehicle rail 370.

Figure 29:
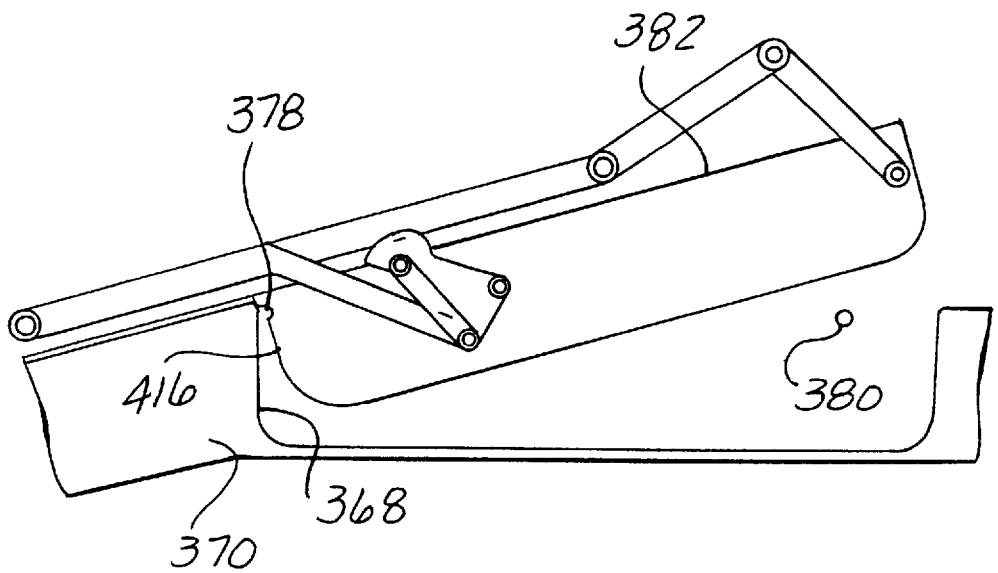
FIG. 29 is a side elevational view showing the linkage and carrier of FIG. 26 in a partially inserted position.
Figure 28:
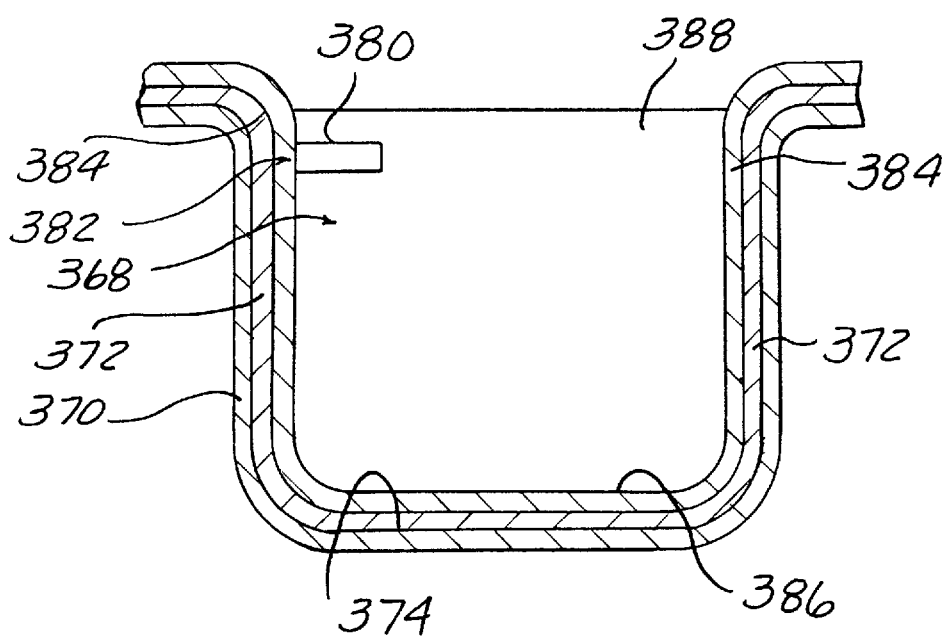
FIG. 28 is a cross-section generally taken along line 28—28 in FIG. 26.

FIG. 29 depicts the insertion of the carrier 382 and the attached collapsible seat 200 into the receptacle 368 in the vehicle rail 370. As the carrier 382, one of which is mounted on each lateral side of the seat 200, is slid into the receptacle 368, a notch 416 on the front end wall of the carrier 382 engages the first latch pin 378. The carrier 382 is lowered into the outer receptacle 368 until the latch 408 engages the second latch pin 380. The linkage 366 is then an operable position for extension or collapsing of the seat 200 as described above.

Figure 30:
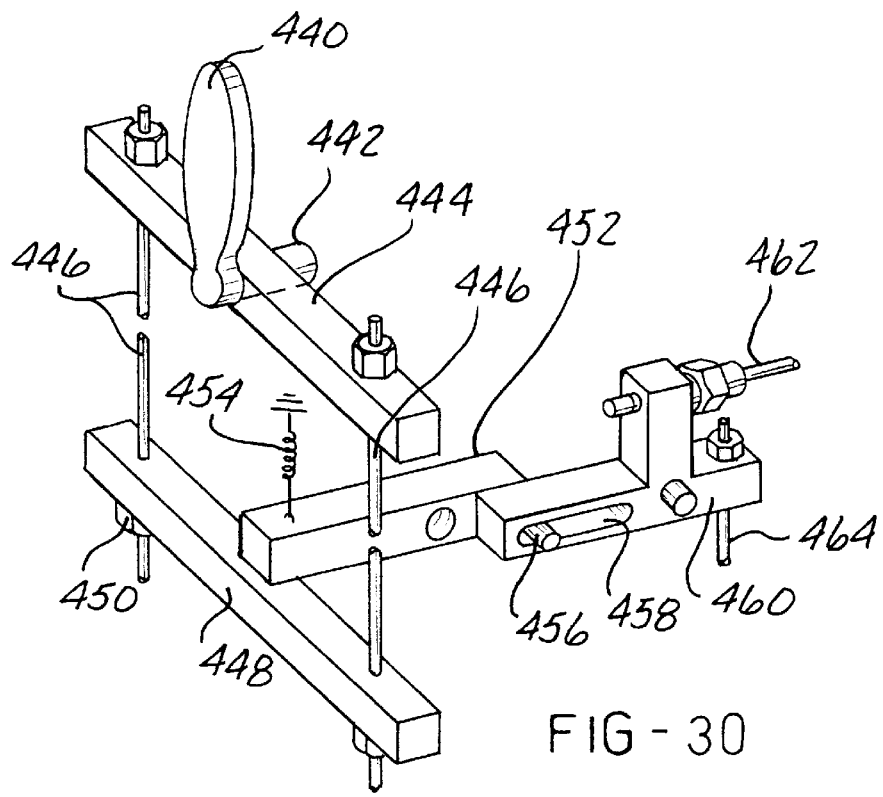
FIG. 30 is a perspective view of one part of the latch means showing the release lever, linkage and cables; and, FIG. 31 is a side elevational view of the latch pawl and latch cam of the latch means which is coupled by the cables to the linkage shown in FIG. 30.
Figure 31:
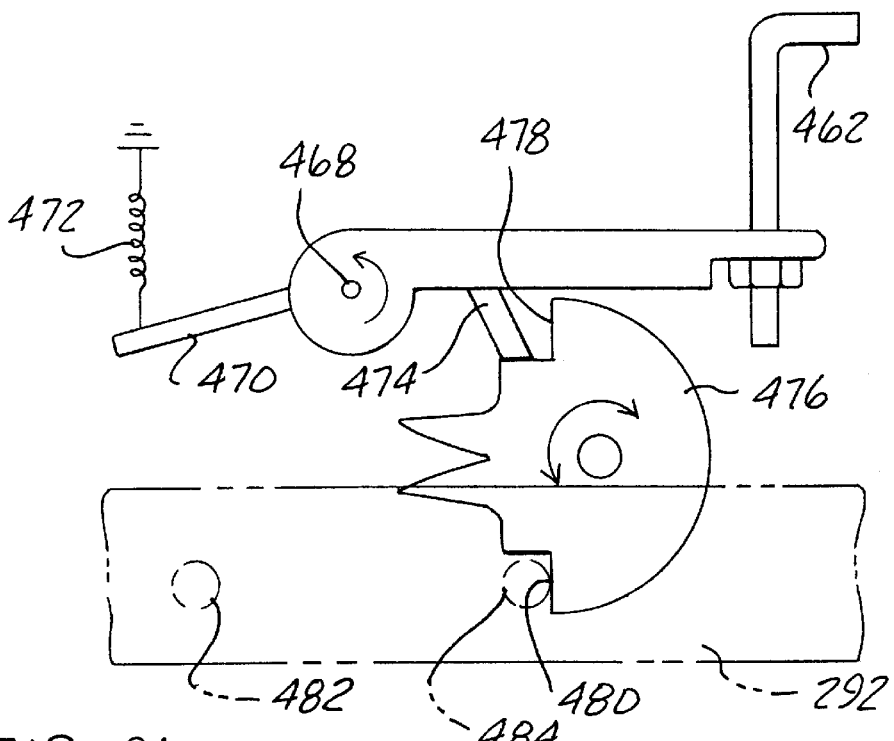

Referring now to FIGS. 30 and 31, there is depicted an optional latch means which may be employed with any of the embodiments of the collapsible seat of the present invention described above and shown in FIGS. 14–29. The latch means preferably comprises a pair of substantial identical latch mechanisms disposed on opposite sides of the seat bottom 204, and operably coupled to the linkage controlling the pivotal movement of the seat bottom. As shown in FIG. 30, a release lever 440 is mounted by means of pivot pin 442 to one of the sides of the seat back frame, typically adjacent a top end of the seat back 202. The release lever 440 is fixably connected to a bar 444 which extends oppositely from the pivot pin 442. A pair of flexible movement transmitting means or cables 446 are fixably mounted on one end of each of the outer ends of the bar 444. Pivotal movement of the bar 442 by opposite rotation of the lever 440 causes downward movement of one of the cables 446 and an upward movement of the opposed cable 446. The other ends of each of the cables 446 slidably extend through a second bar 448 disposed near the bottom of the seat back 202 have an end engagable with the bar 448. In this manner, downward movement of one of the cables 446 enables the opposite end of the downward moving cable 446 to slide freely through one end of the second bar 448. However, the end of the opposite cable 446 pivots the second bar 448 about its center point due to upward movement of the opposed cable 446.

The second bar 448 is fixably connected to a link 452 pivotally mounted on the back plate 242 of the seat back 202. A return biasing spring 454 is connected between one end of the link 452 and the back plate 242 for returning the link 452 to a center position shown in FIG. 30.

A pin 456 projects outwardly from one end of the link 452 and slidably extends through a slot 458 formed in a cable connector 460 pivotally mounted to the back plate 242 for bi-directional rotation about a pivot point through movement of the pin 456 caused by pivotal movement of the link 452 via the cables 446. First and second cables 462 and 464 are connected at one end to the cable connector 460 such that pivotal movement of the cable connector 460 in opposite directions causes simultaneous extension or retraction of the cables 462 and 464.

The cable 462 is routed across the lower portion of the seat back 202, such as through the bottom tubular member 242, to a latch means mounted on the opposite side of the seat bottom 204. The second cable 464 extends to a similar latch mounted on the near side of the seat bottom 204. As the latches are identical, the following description of one of the latches shown in FIG. 31 will understood to apply to both latches.

The cable 462 is fixably connected to a pivot arm 466 which is pivotally connected by a pivot pin 468 to the mounting arm 322 attached of the counterbalance 310 shown in FIG. 20. A return pin 470 extends from the pivot arm 466 and is coupled to a biasing spring 472 for returning the pivot arm 466 to a normal position shown in FIG. 31. A latch pawl 474 projects outwardly from the pivot arm 466 and is positioned to engage a rotatable cam 476. The cam 476 includes opposed, mirror image cam surfaces defining a first latch position 478 and a second latch position 480.

A pair of bosses 482 and 484 are mounted on the control link 292 for engaging the first and second latch positions 478 and 480, respectively, of the cam 476 to forcibly rotate the cam 476 in opposite directions depending upon the direction of linear movement of the control link 292 caused by collapsing or elevating movements of the seat bottom 204 as described above.

In the position shown in FIG. 31, which represents a latched position of the seat 200 in an elevated state, the pawl 474 forcibly engages the first latch position 478 on the cam 476 and prevents rotation of the cam 476 in a counterclockwise direction. When it is desired to lower the seat 200, the lever 440 is rotated in the same direction as a downward movement of the seat back 204 thereby causing the cables 446, the bar 448, link 452 and the cable connector 460 to simultaneously move and retract the first and second cables 462 and 464 to pivot the pivot arm 466 in a counterclockwise direction above the pivot pin 468 and separate the pawl 474 from the first latch position 478 on the cam 476. Movement of the control link 292 to the rear or to the right in the orientation 31, as described above, causes the boss 484 to engage the second latch position 480 on the cam 476 and rotate the cam 476 180° in a counter-clockwise direction until the second latch position 480 faces upward or is at the twelve o'clock position previously occupied by the first latch position 478 on the cam 476. Release of the lever 440 enables the cables 462 and 464 to move in a direction causing the pivot arm 466 to pivot in clockwise direction bringing the pawl 478 into fixed engagement with the second latch position 480 on the cam 476 again locking the cam 476 in a fixed position when the seat 200 is fully lowered.

Movement of the lever 440 in an opposite direction to effect elevating of the seat 200 causes the above described elements to move in an opposite manner to initially release the latch pawl 478 from the second latch position 480 on the cam 476 and then to rotate the cam 476 in a direction to bring the first latch position 478 of the cam 476 into position for re-engagement with the latch pawl 474 when the release lever 440 is released or moved back the center, normal position.

Referring now to FIGS. 32–41, there is depicted yet another embodiment of a collapsible seat 500 according the present invention. The collapsible seat 500, as in the previously described embodiments, includes a seat bottom 502 and seat back 504. The seat back 504 is pivotally mounted on the seat bottom 502 for movement between a first, lowered, collapsed position in close overlying relationship with the seat bottom 502 to a second, elevated or deployed position shown in FIG. 32, wherein the seat back 504 is generally disposed at a perpendicular or slight obtuse angle with respect to the seat bottom 502. The seat bottom 502 is likewise pivotally mounted with respect to an underlying support surface or vehicle floor by means of a pivot linkage similar to that described above and shown in FIG. 23 for movement between a first lowered position in close proximity with the underlying support surface or vehicle floor and a second elevated position spaced from the support surface. The pivotal movement of the seat back 504 relative to the seat bottom 502 is coupled to movement of the seat bottom 502 between the first and second positions.

The seat bottom 502, similar to the seat bottom 204 described above and shown in FIGS. 14–24, includes a pair of rotatable tubular members 508 and 510 which are spaced in parallel and extend laterally across the seat bottom 502. A pair of end members 512 are mounted over opposed ends of the tubular members 508 and 510 by means of cylindrical hubs mounted on and projecting from each end of the end members 512 and rotatably receiving one end of the tubular members 508 or 510. Each of the end members 512 has an enlarged flange 514 at a rear end which projects upwardly from an upper edge of each side member 512.

Figure 32:
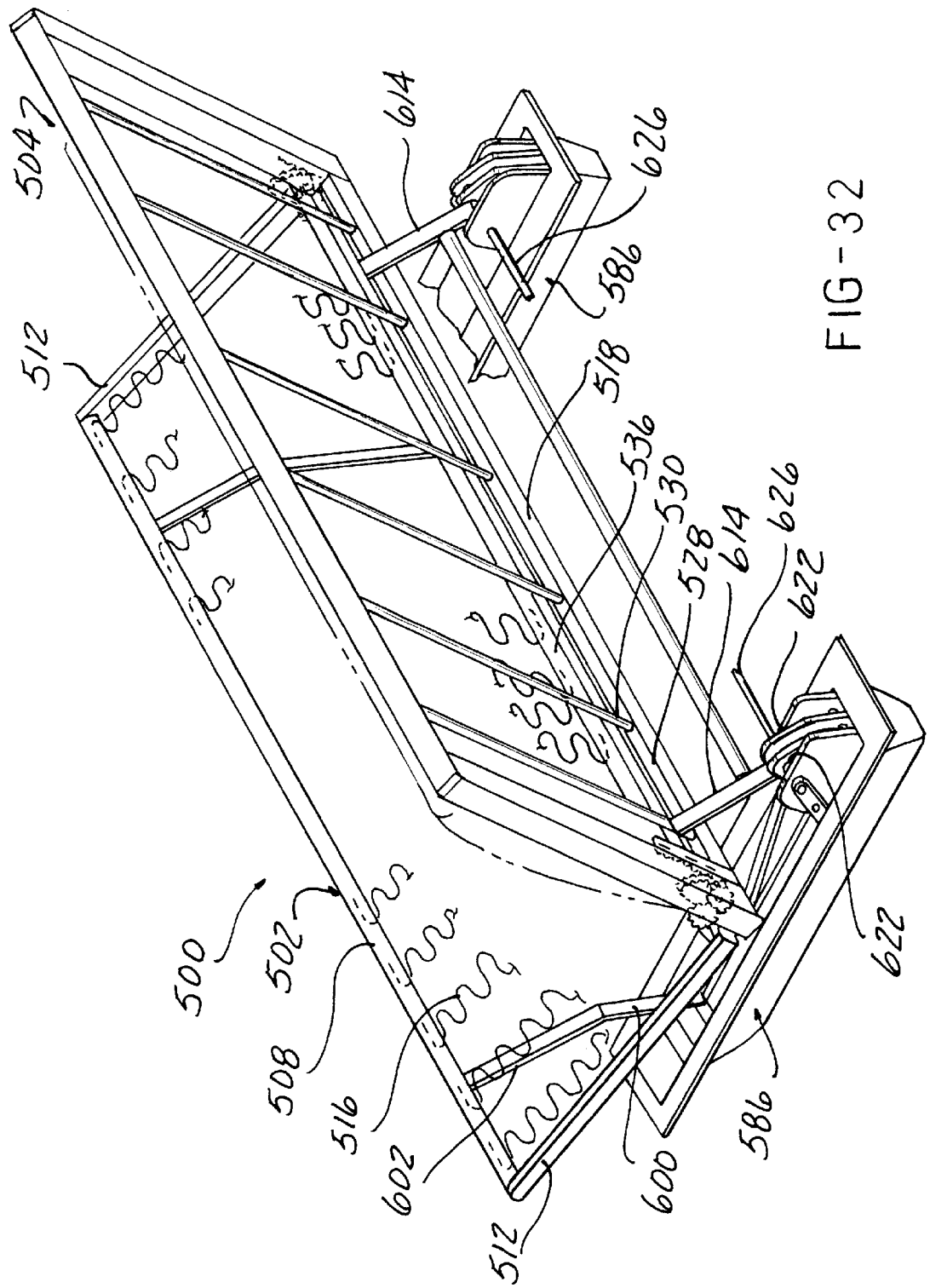
FIG. 32 is a rear perspective view of another embodiment of a collapsible seat according to the present invention.

A plurality of shape changeable or bendable members, such as springs 516 extend between the tubular members 508 and 510 and are pivotally joined to each tubular member 508 and 510 by means of clips, as described in the previous embodiments. Other shape changeable members, such as an elastomeric woven sheet, or combinations thereof may also be employed. The springs 516 preferably have a serpentine shape as shown in FIG. 32 and are positioned for supporting a seat bottom cushion, not shown. The seat bottom cushion may be formed of a suitable resilient cushion or pad, such as a foam pad which is trimmed with an exterior piece of seat material, such as vinyl, leather, cloth, etc.

As shown in FIGS. 32–41, the seat back 504 is formed of a solid back plate 520 having a pair of side frame members 522 extending along opposed sides. A top, support or section 524 is mounted along an upper edge of the seat back plate 520. The seat back plate 520 and the top section 524 have a central notches 526 to provide an enlarged open viewing opening over the center of the seat back 504. Further, the exterior front surface of the top section 524 is covered by a resilient pad and an outer layer of seat material.

On a front surface of the back plate 520, a first laterally extending cross tubular member or rod 528 is disposed and fixedly mounted at opposite ends to a wall mounted on opposite lower ends of back plate 520. A plurality of vertically extending tubular members 530 are fixedly mounted on one end to the first rod 528 and extend therefrom a fixed (i.e., welded) connection at opposite end to the top section 524.

Figure 33:
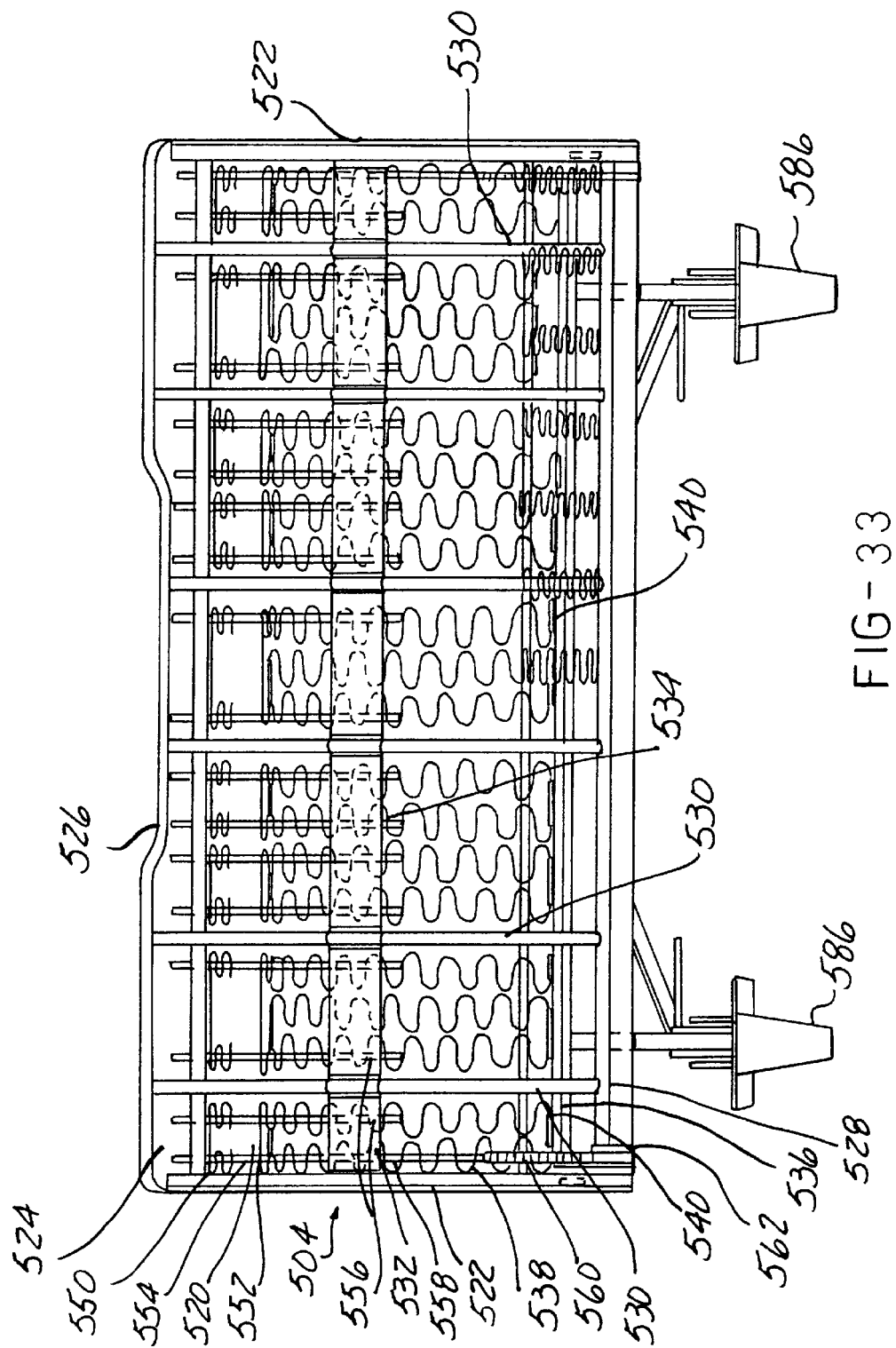
FIG. 33 is a rear elevational view of the seat back of the collapsible seat shown in FIG. 32.

A connector strap 532 is movably disposed on the back plate 520 generally intermediate the top and bottom ends of the back plate 520 as shown in FIG. 33. A series of spaced raised, channel-like projections 534 are formed in the guide strap 532 and slidably engage the vertical tubular members 530 extending therethrough. The vertical tubular members 530 are preferably hollow for receiving posts, not shown, on head rests to extendibly mount the head rests on the seat back 504 in a conventional manner. Apertures are preferably formed in the top edge or surface of the top box section 520 for receiving the head rest post therethrough.

A second laterally extending tubular member or rod 536 is also provided on the seat back 504 generally parallel to and spaced from the first rod 528. The second rod 536 is mounted at opposite ends to a seat back 504 pivot means described hereafter and shown in FIGS. 32, 33, 35–40.

The second rod 536 carries one end of a plurality of serpentine, strip-like springs 538 which have one end movably coupled to the second rod 536 by means of a clip 540 or short hollow tube fixedly mounted or welded on the second rod 536.

Figure 34:
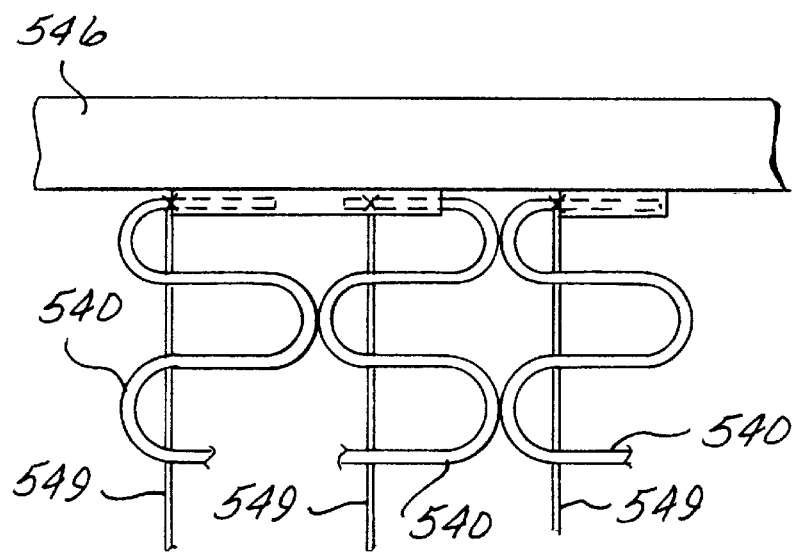
FIG. 34 is a partial, plan view of the connections of the seat back springs and control rods.

A plurality of springs 538 are provided across the lateral extent of the seat back plate 520 as shown in FIGS. 32 and 33 and extend from one end pivotally mounted to the second rod 536 to an opposed end in proximity with a lower edge of a movable top plate 546 on the seat back plate 520. The upper ends of the spring 538 are mounted in a clip, such as a hollow tube, mounted on the top plate 546 as shown in FIG. 34. The springs 538 are arranged in adjacent groups of two, three or more across the lateral extent of the seat back 204.

The springs 538 support a resilient pad or cushion 544. The pad 544 may be formed of any suitable material, such as foam, etc. The pad or cushion 544 may also be covered with an exterior layer of a suitable seat material such as vinyl, leather, cloth, etc. The top plate 546 extends laterally across the upper edge of the seat back cushion 544 and is provided with a pad 548 adjacent to the seat back cushion or pad 544.

Figure 36:
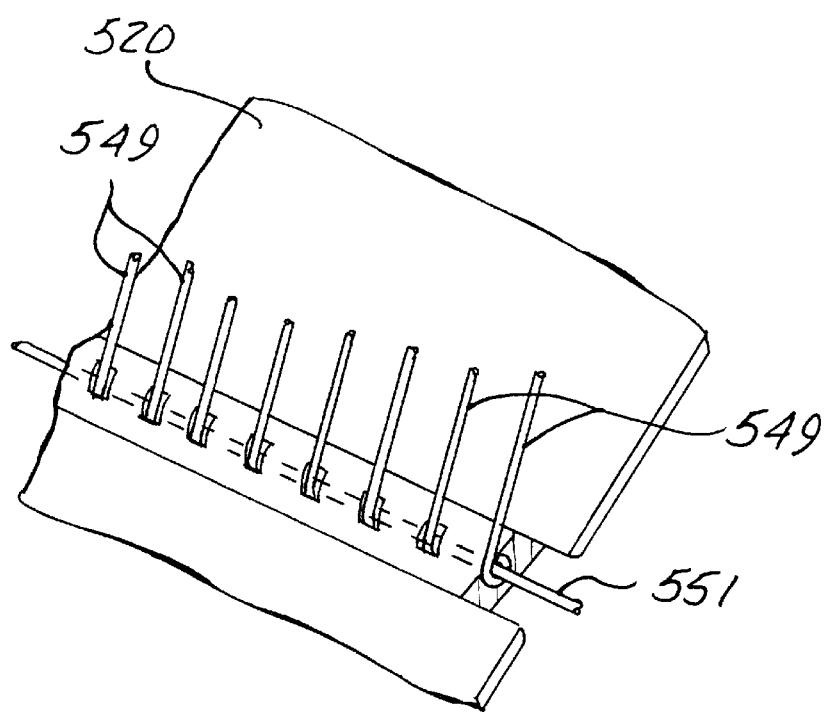
FIG. 36 is a partial perspective view showing the mounting of one end of the control rods.
Figure 35:
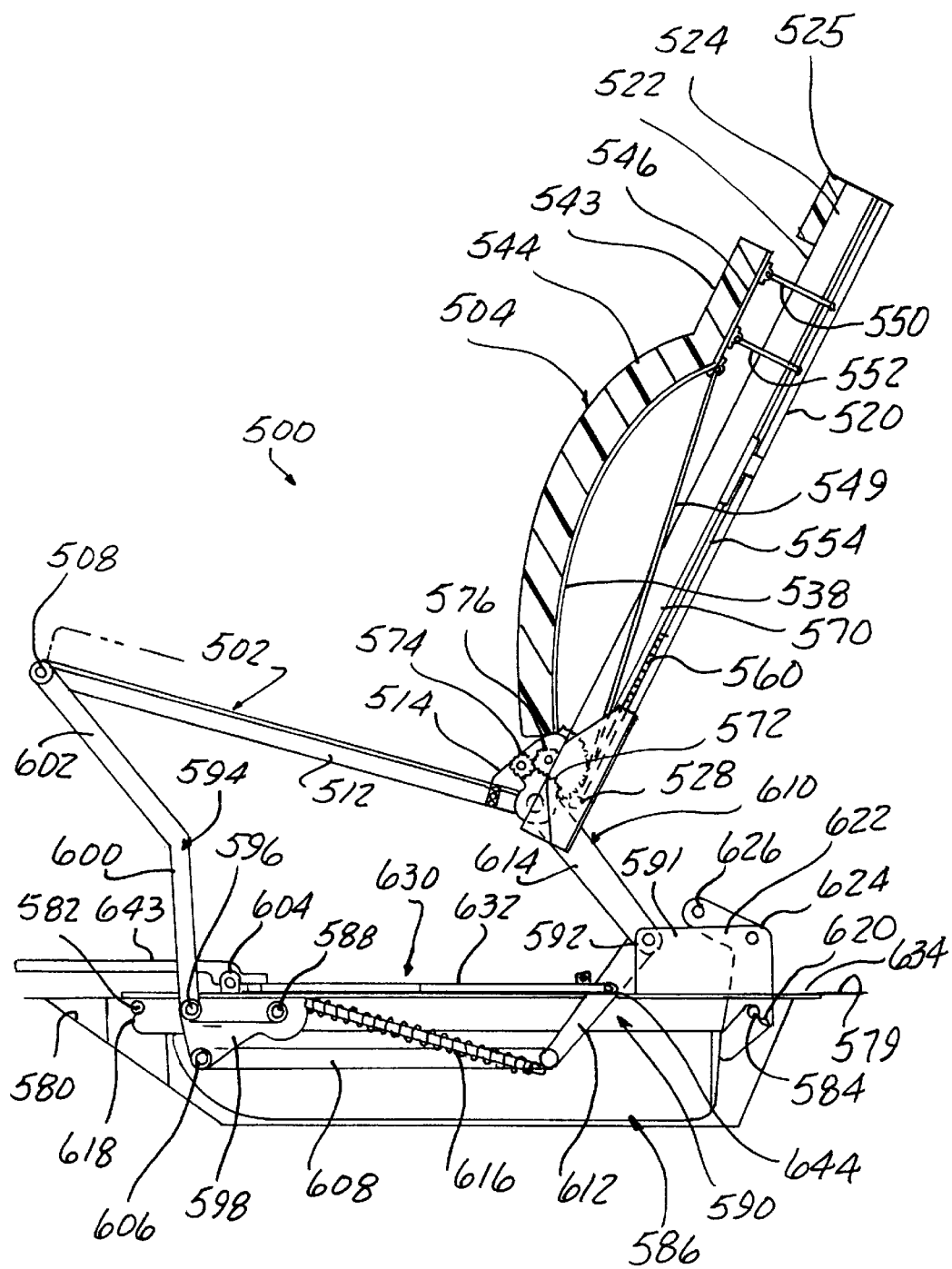
FIG. 35 is a side elevational view of the collapsible seat of the present invention depicted in an elevated, deployed position.

As shown in FIGS. 34–36, a plurality of anchor wires 549 extend between a connection via a hook mount over the upper end of the springs 538 to the lower edge of the top plate 546 to a rotatable connection at an opposite end through an aperture in the back plate 520 to a rod 551 extending between the side frame members 522. The anchor wires 549, during pivotal movement of the seat back 504 relative to the seat bottom 502, control the pivotal movement of the top plate 546 and the upper end of the springs 538 relative to the back plate 520.

Figure 37:
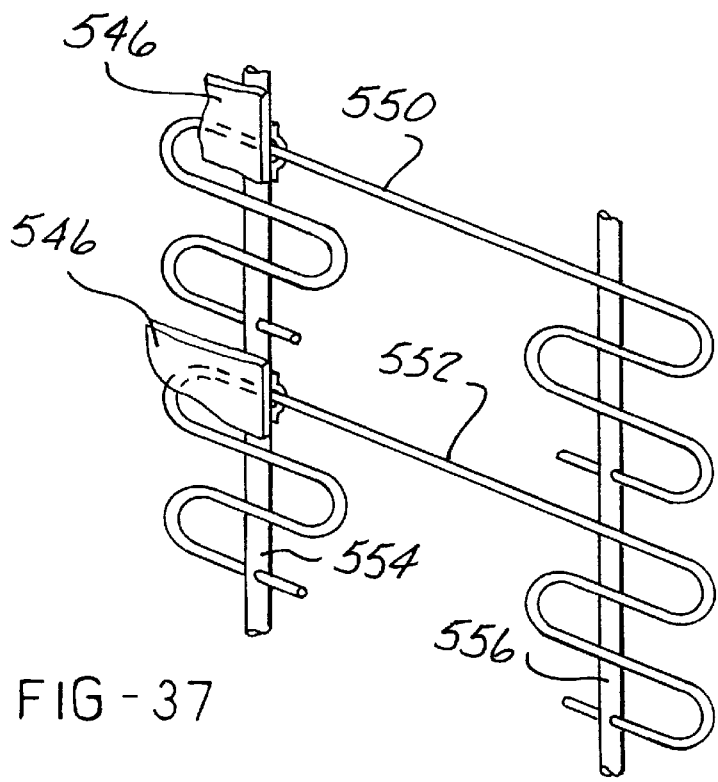
FIG. 37 is a partial, perspective view of the upper pairs of springs.

A plurality of pairs of springs 550 and 552 are also provided across the lateral extent of the seat back plate 520 as shown in FIGS. 33, 35 and 37. Each of the springs 550 and 552 also has a generally serpentine, strip-like shape. One end of each pair of springs 550 and 552 may be joined to the other spring in each pair or formed as a continuous one piece spring with two parallel sections as shown in FIG. 37. The upper ends of each of the springs 550 and 552 are rotatably mounted by means of a suitable U-shaped connector to the top plate 544.

The opposite ends of each of the springs 550 and 552 are rotatably mounted in one of a plurality of vertically extending drive rods 554 and 556. The outermost drive rods 554 project substantially the entire height of the seat back plate 520 as shown in FIGS. 33 and 35. The innermost drive rods 556, which are also referred to as slave drive rods 556, have a shorter length and extend from the upper portion of the seat back plate 520 to a generally intermediate portion of the seat back plate 520. Each of the drive rods 554 and 556 is slidably positioned relative to the seat back plate 520 and welded or fixed to the connector strap 532. A mounting clip 532 is fixed or welded on the back plate 520 and has a raised central projection for slidably guiding and positioning each slave drive rod 556.

The upper ends of each of the drive rods 554 and 556 slidably extend through apertures in the top section 524 on the seat back plate 520 during vertical extension and retraction movements of the drive rods 554 and 556 as described hereafter.

As shown in FIGS. 33, 35, 38 and 39, lower ends of the outer drive rods 554 are formed with a rack 560 having a plurality of linearly spaced gear teeth formed thereon. The rack 560 is slidably disposed in a groove formed in a way 562 fixedly mounted on the lower end portion of the seat back plate 520 adjacent to one of the outer side frame members 522.

Figure 40:
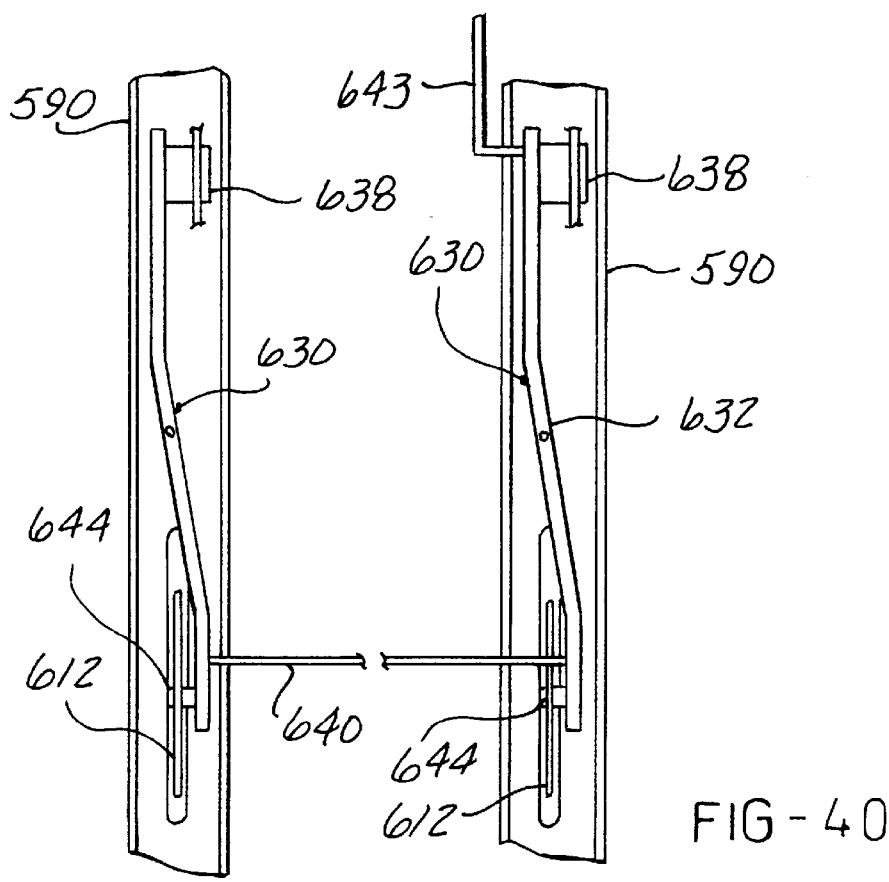
FIG. 40 is a plan view of the front latch and seat back shape changing drive of the present invention.

In operation, the springs 550 and 552 are deployable between a first, generally flat or planar position closely adjacent to the seat back plate 520, as shown in FIG. 40, when the seat back 504 is folded into a closed, overlying relationship with the seat bottom 502, and a second position shown in FIG. 35 when the seat back 504 is in the elevated or deployed position relative to the seat bottom 502. The outer drive rods 554 and the inner slave rods 556 control the position of the springs 550 and 552 as a result of vertical extension or retraction of the outer drive rods 554 and the slave drive rods 556.

Figure 38:
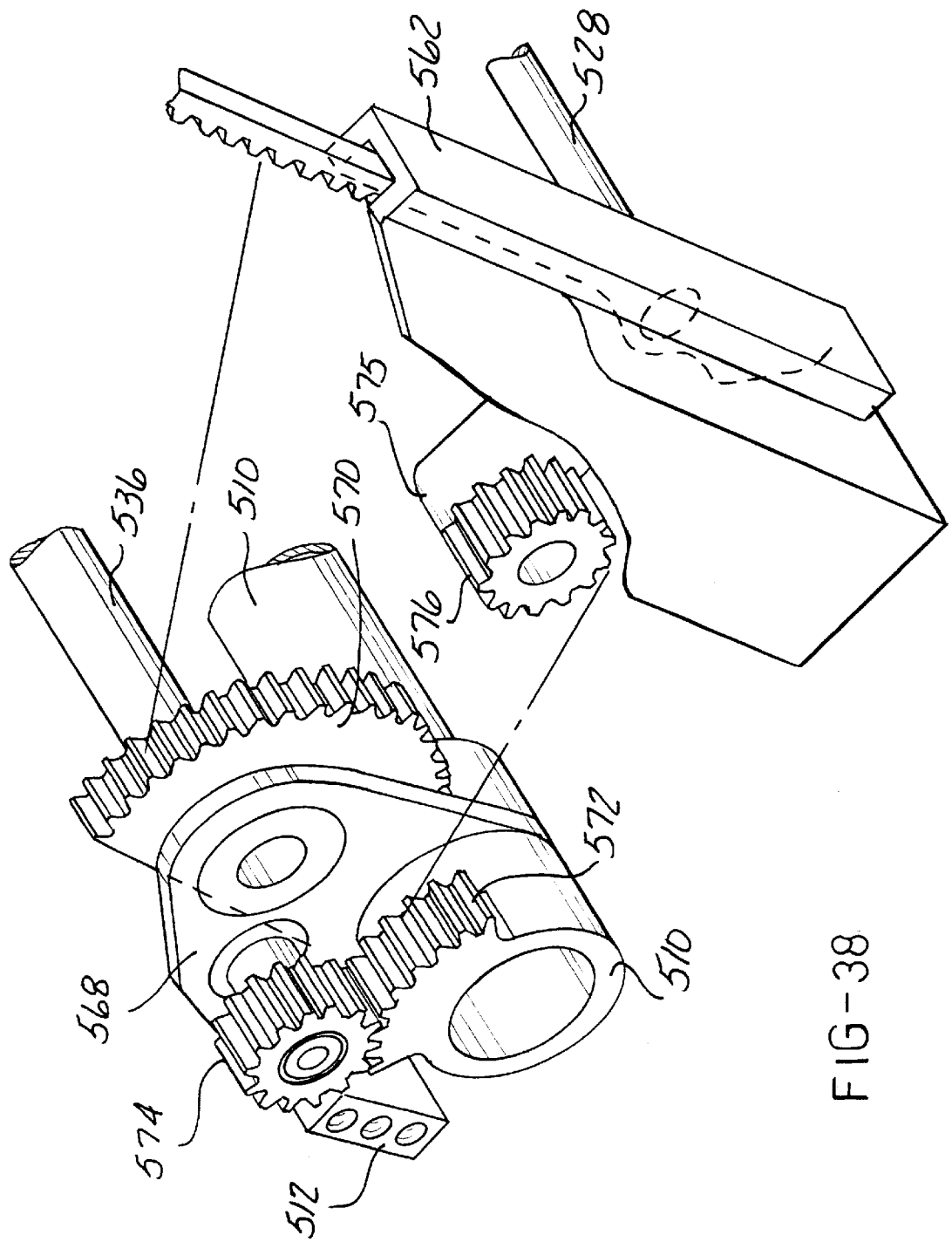
FIG. 38 is a perspective, exploded view of the seat back changing drive.
Figure 39:
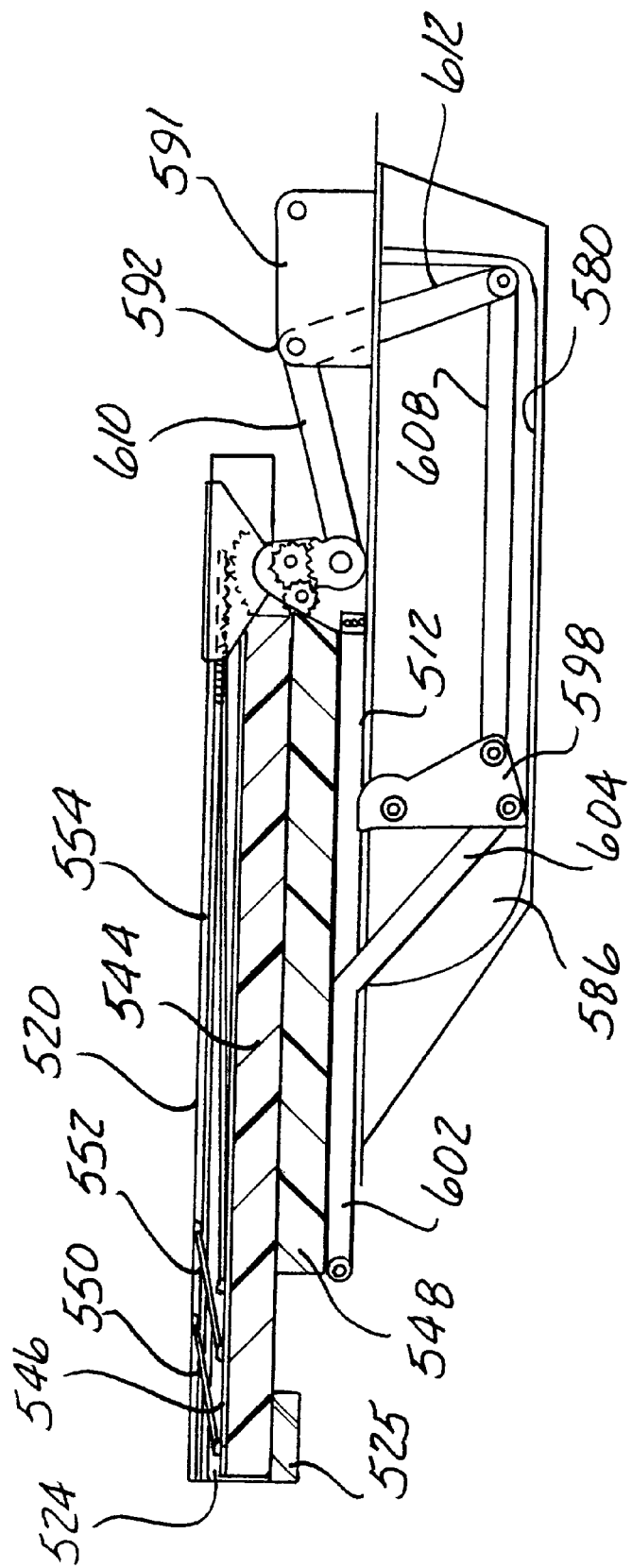
FIG. 39 is a side elevational view of the collapsible seat of the present invention in a lowered position.

As shown in FIGS. 32, 33 and 35, and, in greater detail in FIGS. 38 and 39, a shape changing drive means include a tubular hub 566 which rotatably receives the rear tubular member 510 on the seat bottom 502. An arm 568 is fixedly mounted on and projects from the tubular hub 566 and is, in turn, fixed to the seat back side frame members 512. A sector gear 570 is formed on the arm 568 as shown in FIGS. 38 and 39 and is positioned to engage the gear teeth on the rack 560 on the outer drive rods 551 to control the sliding vertical movement of the outer drive rods 554 during pivotal movement of the seat back 504 relative to seat bottom 502.

A sector arrangement of gear teeth 572 are also formed on the tubular hub 566 and engage a first or idler gear 574 rotatably mounted on the arm 568. The first or idler gear 574 engages a second gear 576 rotatably mounted on a pin extending from arm 575 projecting from the way 562. The second gear 576 rotates oppositely from the direction of rotation of the first, idler gear 574. In this manner, rotation of the seat back 504 relative to the seat bottom 502 causes the rack 560 to walk or move around the sector gear 570 causing extension or retraction of the drive rods 554 and the slave drive rods 556 via the connecting strap 532.

As shown in FIG. 35, as the seat back 504 approaches the full elevated position relative to the seat bottom 502, the anchor wires 549 control the pivoting of the upper end of the seat back cushion 544, the upper end of the springs 538, 550, 552, and the top plate 546 outward from the back plate 520 to the position shown in FIG. 35. During such pivotal movement, the drive rods 554 and slave drive rods 556 extend from each bottom of the back plate 520. As the bottom end of the anchor wire 549 is spaced farther from the bottom of the springs 538 when the seat back 504 is elevated as compared to the lowered position, the anchor wires 549 cause the distance between the ends of the springs to shorten when the seat back 504 is elevated causing the springs 538 to bow outwardly into a smoothly curved arcuate shape shown in FIG. 35 to curve the seat back cushion 544 to comfortably support the back of an occupant of the seat 500. The springs 538 also provide a degree of resiliency enabling the cushion 534 to easily conform to the shape and/or position of the occupant.

When the seat back 504 is pivoted downward about the axis of the second gear 576 relative to the seat bottom, the sector gear 570 causes the rack 560 to slide downwardly toward the bottom of the seat back 520 thereby pulling one end of the springs 550 and 552 in a downward direction causing the springs 550 and 552 to pivot to a generally in line, flat position adjacent to the seat back 520 bringing the top plate 546 and the upper end of the anchor wires 549 into close proximity with the seat back plate 520.

The second gear 576, the first idler gear 574 and the sector gear 572 on a tube welded or fixed to the bottom tube 510 of the seat bottom 502 coordinate pivoting of the seat bottom 502 with pivotal movements of the seat back 504.

In this position, as shown more clearly in FIG. 40, the seat back cushion 544 assumes a generally planar or flat shape within the confines of the seat back frame members 522 and top box section 544 so as to have a reduced overall height relative to the seat back plate 520. This enables the seat back 504 to more closely overlay the seat bottom 502 resulting in a reduced or minimum total height for the entire seat back 504 and seat bottom 502 when in the lowered, collapsed, overlaying position shown in FIG. 40.

A linkage is provided for pivoting the seat bottom 502 between the elevated position shown in FIG. 35 and the lowered position shown in FIG. 40. Although the linkage could be pivotally mounted to the floor 578 of a vehicle, in a preferred embodiment, the linkage is removably insertable into a receptacle 580 formed in a vehicle floor rail. The receptacle 580 is substantially identical to the receptacle described above and shown in FIGS. 26–29 in that it includes opposed side walls, a bottom wall, opposed end walls and an open top, all of which cooperate to define an interior cavity shown in FIG. 35. The receptacle 580 is secured to the vehicle rail by welding or other fasteners on outwardly extending flanges formed on the upper ends of the sidewalls of the receptacle 580. Alternately, the side rail of the vehicle could form the receptacle by providing an opening in the floor pan to expose and allow access to a portion of the interior of the hollow side rail of the vehicle.

A first latch pin 582 extends across an upper portion of both side walls of the receptacle 580 and extends into the interior cavity of the receptacle 580. A second latch pin 584 also extends laterally across an upper portion of the side walls adjacent a rear end of the receptacle 580.

A protective cup 586 is formed with a shape generally complimentary to the interior cavity of the receptacle 580 so as to be releasibly mountable in the receptacle 580. The cup 586 has an open top, a receptacle-like configuration formed of opposed side walls, an integral bottom wall and opposed end walls. The linkage attached to the seat bottom 502 is pivotally mounted to a carrier 590 by a first pivot pin 588 which preferably extends between both side walls of the carrier 590. A flange 591 extends upward from the rear end of each side wall of the carrier 590 and carries a second pivot pin 592 for pivotal interconnection with a rear portion of the linkage. A cover plate 634 is formed on the carrier 590 and has a central slot for movement of the pivot arms and legs of the linkage therethrough.

The linkage in this embodiment is substantially similar to the linkage 366 described above and shown in FIGS. 26–29. A front pivot leg 594 is pivotally mounted at one end on a pivot pin 596 carried by a pivotal transfer link 598. The front pivot arm 594 is formed with first and second angularly disposed portions 600 and 602, with the second portion 602 fixedly connected at one end to seat bottom 502 at the front tubular member 508. The purpose of the angular formation of the first and second portion 600 and 602 of the front pivot leg will become more apparent hereafter.

The transfer link 598 has an upstanding flange 604 with a central aperture. A second pivot pin 606 is carried on the transfer link 598 and interconnects with one end of a control link 608. The opposite end of the control link 608 is pivotally connected to a rear pivot leg 610 formed of a first leg portion 612 pivotally on one end to the control link 608 and a second leg portion 614 fixedly connected on one end to the rear tubular member 510 on the seat bottom 502. The rear pivot legs 610 are pivotally connected by pivot pins 592 to the flanges 591 on the carrier 590.

In operation, the linkage is positionable in a first elevated position shown in FIG. 35. When it is desired to collapse the seat 500, forward pivotal movement of the seat back 504 toward the seat bottom 502 causes the front pivot arm 594 and the rear pivot leg 610 to pivot about their respective pivot connections in a forward and downward manner. The transfer link 598 enables substantial vertical movement of the front pivot arm 594 in a downward direction to bring the second portion 602 of the front pivot arm 594 into close proximity with the vehicle floor as shown in FIG. 40 when the collapsible seat 500 is in the fully lowered or second position.

A biasing spring 616 is pivotally connected to the first leg 612 and to a pin extending between the sidewall of the carrier 590.

With the collapsible seat 500 in the collapsed or lowered position in which the seat back 504 closely overlays the seat bottom 502, the seat 500 may be removed from or inserted into the receptacle 580. Upon insertion, the front end of the cup 586 is slid into the rear end of the receptacle 580 and moved forward until a notch 618 carried on a forward end of the carrier 590 engages the first latch pin 582.

Next, the rear end of the cup 586 may be dropped into the receptacle 580. When the cup 586 is fully seated in the receptacle 580, the second latch pin 584 is fully seated within notches 620 formed in a pivotal latch arm 622 which form part of a rear latch assembly. As shown in FIGS. 32 and 35, a pair of latch arms 622 are disposed adjacent both flanges 591 of the carrier 590 and are pivotally connected thereto by means of pivot pins. Each latch arm 622 carries one notch 620. An opposite end of each latch arm 622 carries a handle 626 extending inward toward the carrier 590 on the opposite side of the seat 500. As the rear end of the carrier 590 is dropped into the receptacle 580, an angled surface on the bottom of each latch arm 622 slides along the second latch pin 584 to pivot the bottom end of each latch arm 622 slightly forward to enable the notch 620 to engage the second latch pin 584. When it is desired to remove the seat 500 from the vehicle, rearward pivotal force exerted on the handle 626 causes each latch arm 622 to pivot in a clockwise direction, as shown in FIGS. 32 and 34 to release the notches 620 from the second latch pins 584 and to enable the rear end of the carrier 590 to be pulled upward from, the receptacle 580.

Figure 41:
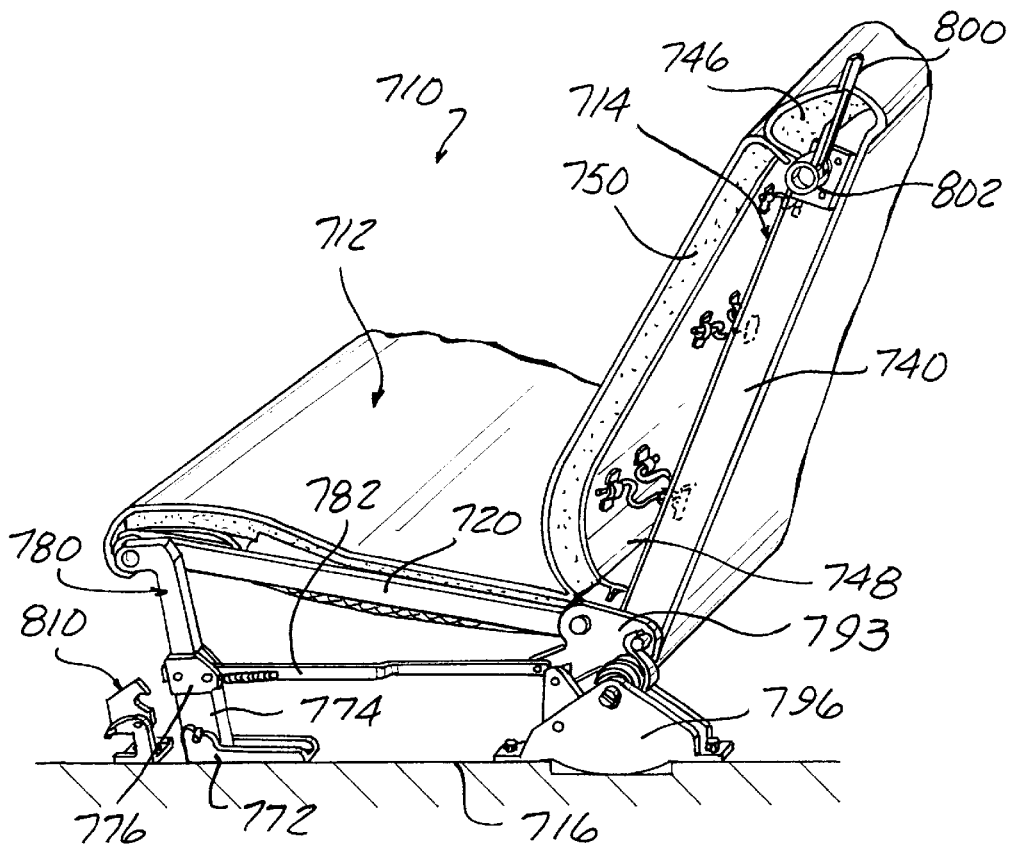
FIG. 41 is a partial perspective view of an alternate embodiment of a collapsible seat according to the present invention in a fully elevated position.
Figure 42:
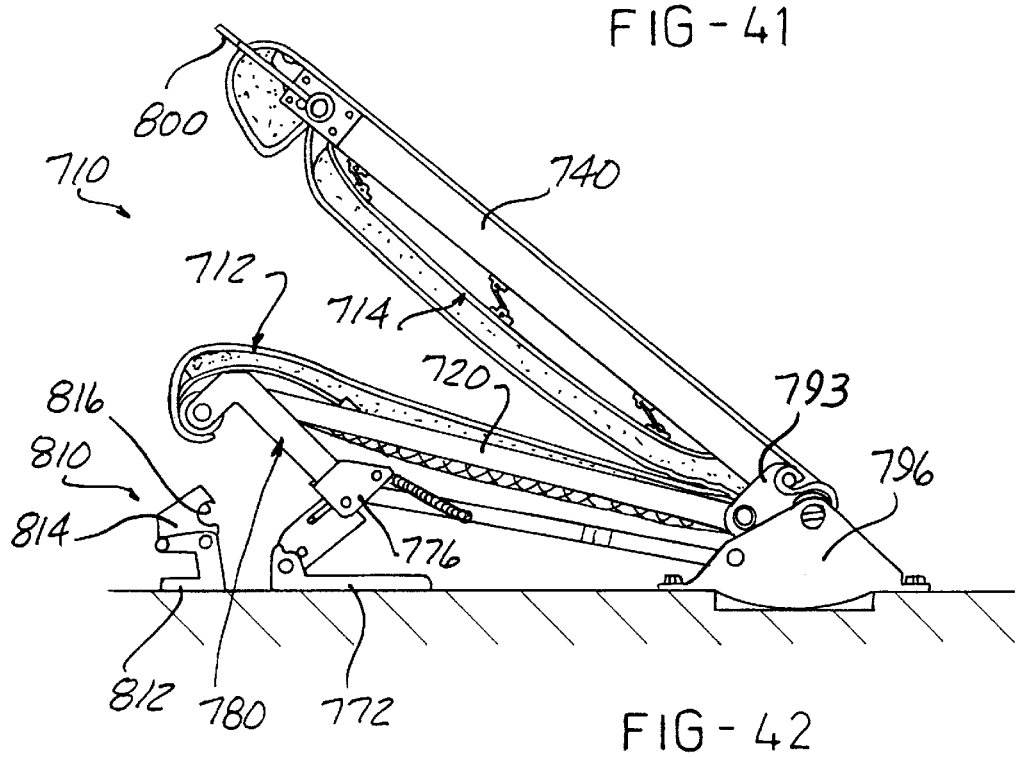
FIGS. 42, 43 and 44 are right side perspective views of the collapsible seat depicted in FIG. 41 shown at various positions between the fully elevated position of FIG. 41 and a fully collapsed position shown in FIG. 44.

As shown in FIGS. 35 and 41, a linkage latch means 630 is provided on each of two carriers 590 described hereafter. Each linkage latch means 630, which is identically constructed and orientated, includes a latch handle 642 which is pivotally mounted by means of a pin 632 to the carrier 590. The latch handle 642 has a first end 636 which carries a latch pin 638 removably insertable into the aperture in a flange 604 on a transfer link 598 in the linkage described hereafter. The opposite or second end of the latch handle 642 is connected to a force transmitting means or cable 640. The cable 640 is connected at an opposite end to a second end of the opposed latch handle 642. As shown in FIG. 35, a single actuator means or handle 643 is fixedly connected to one of the latch handles 642, such as the right side latch handle 642.

In operation, pivotal movement of the outer end of the actuating handle 643 in a counter-clockwise direction or toward the left in the orientation shown in FIG. 41 causes the latch pin 638 in the right side latch handle 642 to disengage from the aperture in the flange 604 in the transfer link 598 thereby releasing the right side latch handle 642 from the right side carrier 590. Such pivotal movement of the right side latch handle 642 pulls the cable 640 to the right thereby moving the latch pin 638 on the left side latch handle 642 out of engagement with the aperture in the corresponding flange 604 releasing the left side latch.

As shown in FIG. 35, the rear or second end of the latch handle 642 also carries a pin 644 which engages an aperture formed in the second leg 612 of the rear pivot leg 610. A similar pin 644 is provided on the right side latch handle 642 which engages the second leg 612 on the right side rear pivot leg 610. When the latch means 630 are in the fully latched position, the transfer link 598 as well as the second leg 612 of the rear pivot leg 610 are engaged by the latch means and prevented from pivotal movement. This locks the linkages in the fully elevated position. However, when the actuating handle 643 is actuated, as described above, releasing the latch pins 638 from the flanges 604 on the transfer link 598 and the pins 644 from the apertures in the second legs 612 of the rear pivot arms 610, the entire linkage can be pivoted to the lowered position.

Referring now to FIGS. 41–49, there is depicted yet another embodiment of a collapsible seat 710 according to the present invention. Although, the outer seat back and seat bottom cushion fabric, which is typically formed of leather, vinyl, fabric, etc., has been depicted as having a simple planar shape, a more contoured shape is also possible. As in the preceding embodiments, the collapsible seat 710 includes a seat bottom 712 which is pivotal with respect to an underlying support surface, such a vehicle floor 716. A seat back 714 is pivotal with respect to the seat bottom 712. The entire collapsible seat 710 is deployable between a first fully elevated position shown in FIG. 41 and a fully collapsed or lowered position shown in FIG. 44.

The seat bottom 712 includes a pair of side frames 720 which are joined at opposite ends by front and rear cross members 722 and 724 respectively.

Figure 46:
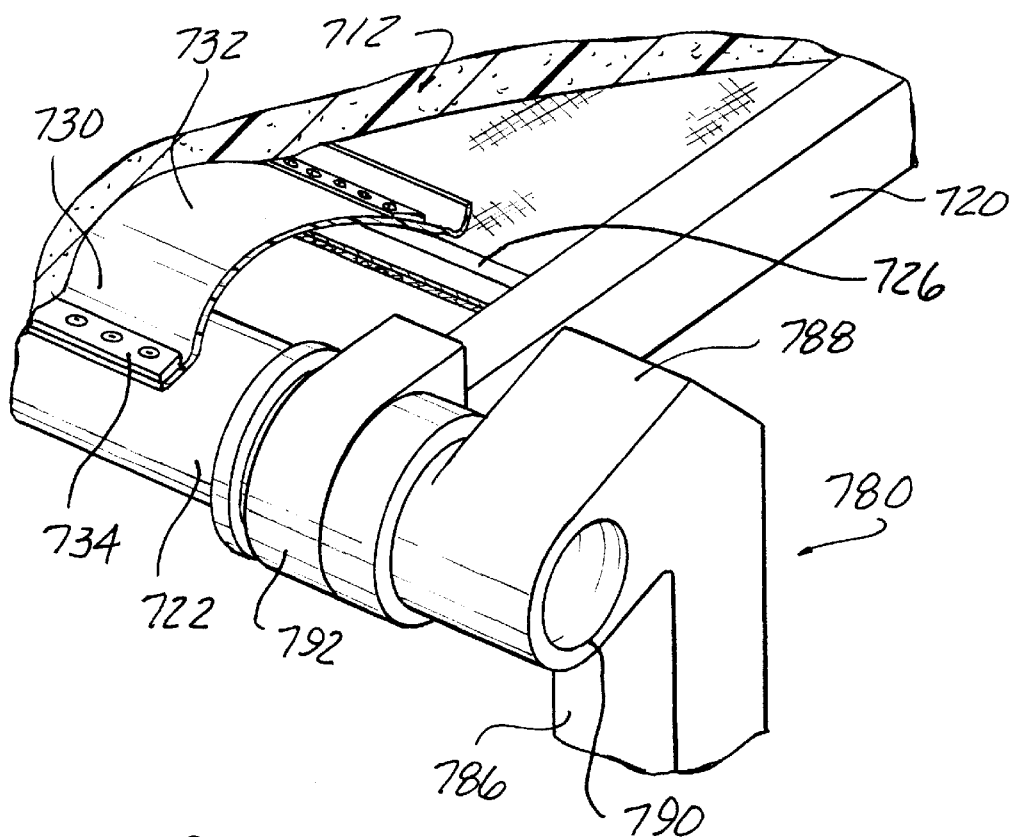
FIG. 46 is a partial, perspective view of the front portion of the pivot linkage, the front crossbar and the seat bottom of the collapsible seat of the present invention.

As shown in FIG. 46, the front cross member or bar 722 has a tubular shape and is welded to a tubular hub pivotally extending through a bore at one end of each side frame 720 so as to be rotatable with respect to the side frames 720. An intermediate support member or bar 726 is fixed or welded at opposite ends to each of the side frames 720 and is disposed intermediately between the front and rear cross members 722 and 724, generally closer to the front cross member 722. A cushion support 728, such as resilient mesh webbing, is connected by fasteners between the intermediate support bar 726 and the rear cross member 724.

A thigh support means 730 is movably coupled between the intermediate support 726 and the front cross member 722. By way of example only, the thigh support means is in the form of a thin, flexible plastic sheet 732, preferably formed of polypropylene.

Clips 734 extend along front and rear edges of the flexible sheet 732 and overlay the front and rear edges of the sheet 732. Fasteners, such as screws or rivets extend through each clip 734 into the front cross member 722 and the intermediate support member 726 to fixedly secure the front and rear ends of the flexible sheet 732 to the front cross member 722 and the intermediate support member 726, respectively.

As shown in FIG. 46, when the collapsible seat 710 is in the fully elevated position, the flexible sheet has a concave curvature between the front and rear ends. Even though the sheet 732 is flexible, it has sufficient rigidity to support the thigh of an occupant of the seat in a comfortable manner. However, during collapsing movement of the collapsible seat 710, as described hereafter, rotation of the front cross member 722 relative to the intermediate support 726 will pull the front end of the flexible sheet 732 away from the intermediate support 726 to bring the flexible sheet 732 into a more flat configuration for compact storage when the collapsible seat 710 is in the fully collapsed position.

Figure 47:
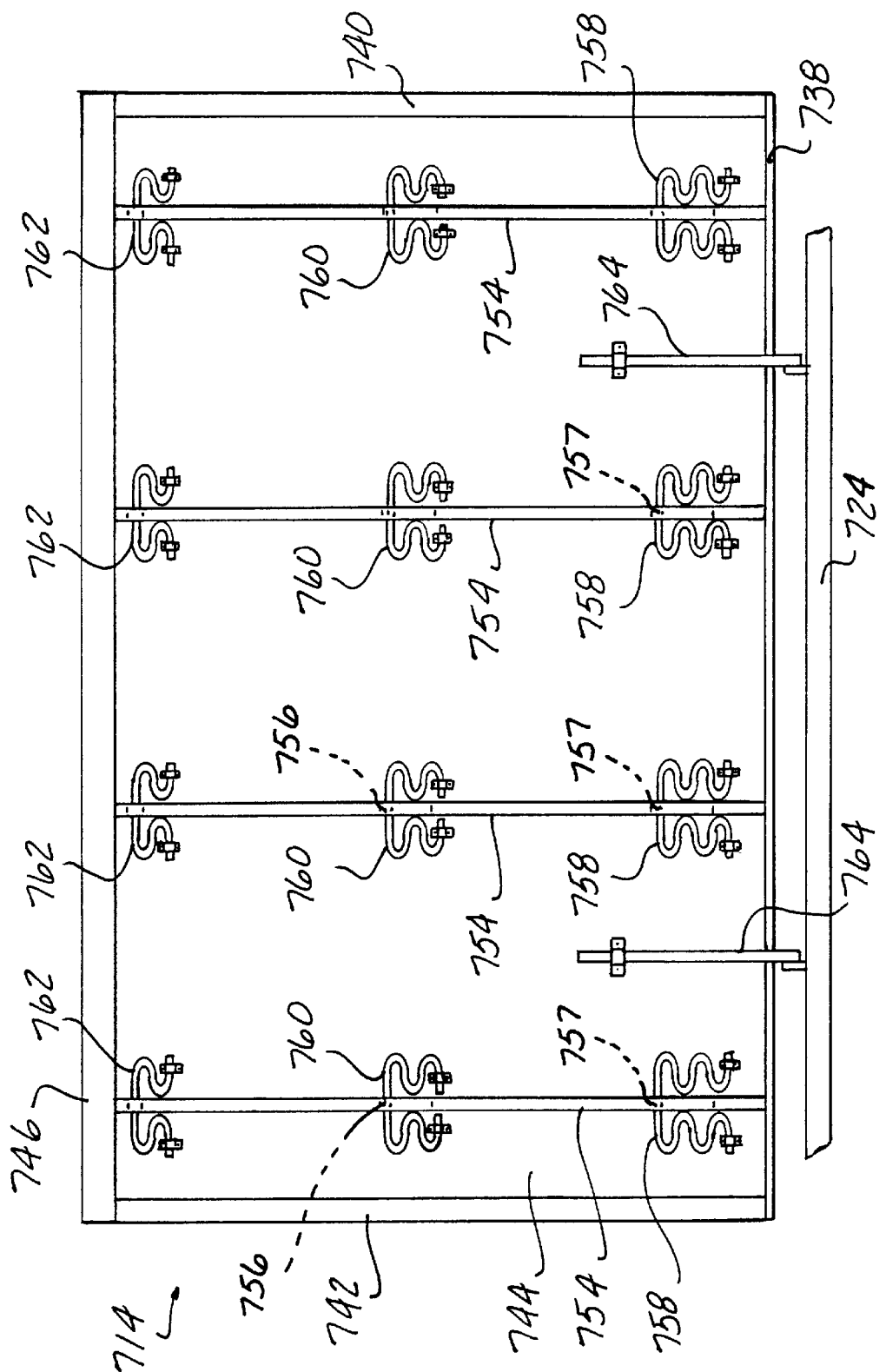
FIG. 47 is a front elevational view of the seat back of FIG. 41 shown in an elevated position with the seat back cu ion removed.

As shown in FIGS. 41 and 47, the seat back 714 is formed of a pair of side, generally rectangular, hollow tubes 740 and 742 which are disposed on and secured to opposite ends of a rigid back plate 744, preferably formed of metal. A top cushion 746 is fixedly secured along an upper edge of the back plate 744.

Figure 47A:
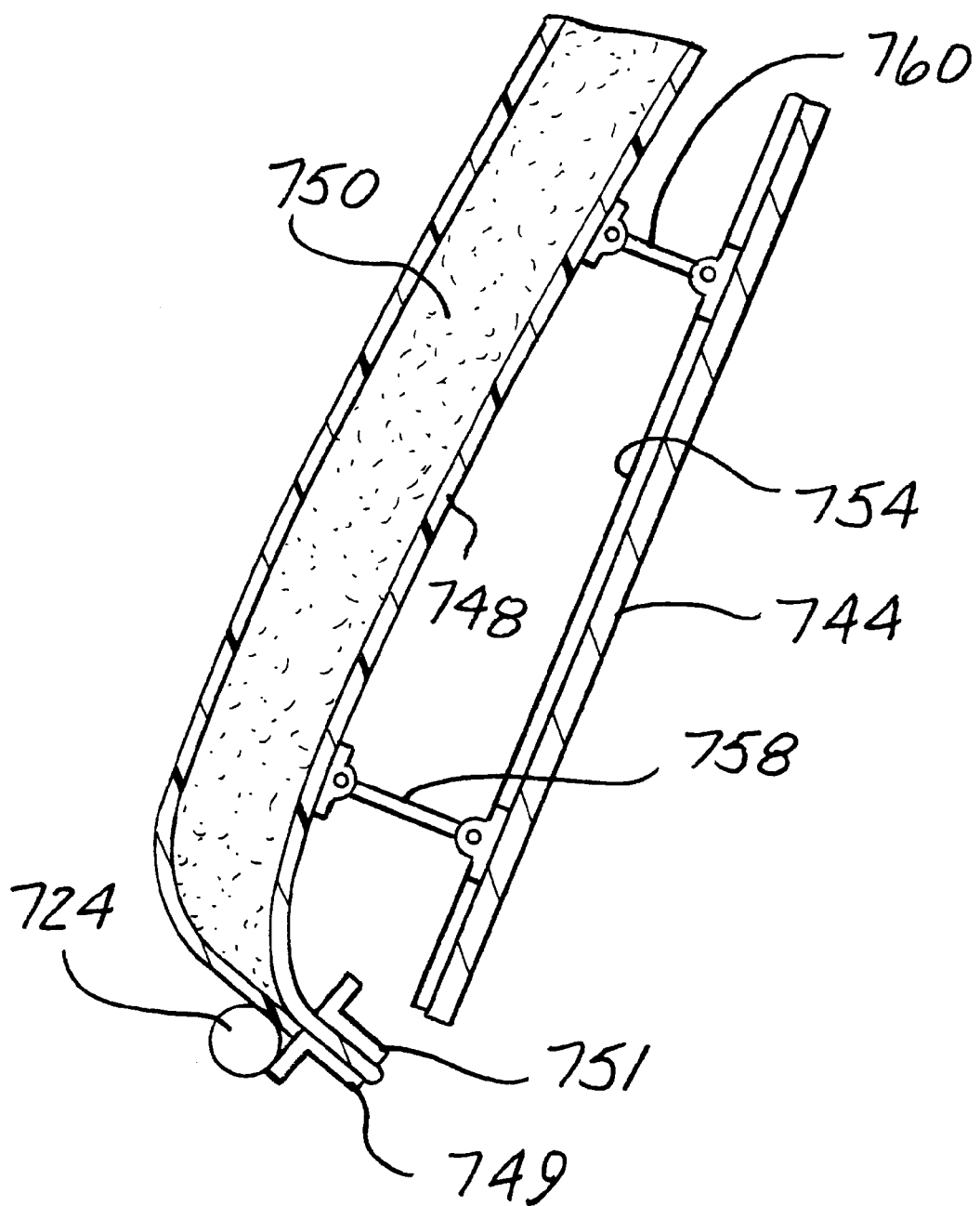
FIG. 47A is a cross-sectional view of the seat back shown in FIG. 47.
Figure 48:
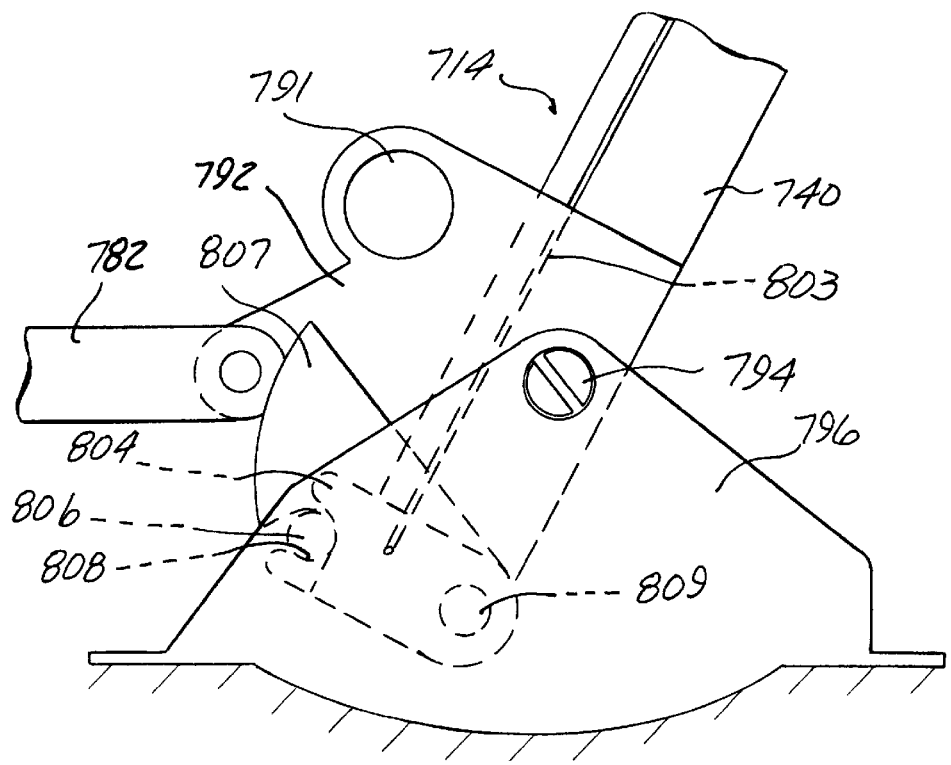
FIG. 48 is a side elevational view of the rear linkage.
Figure 49:
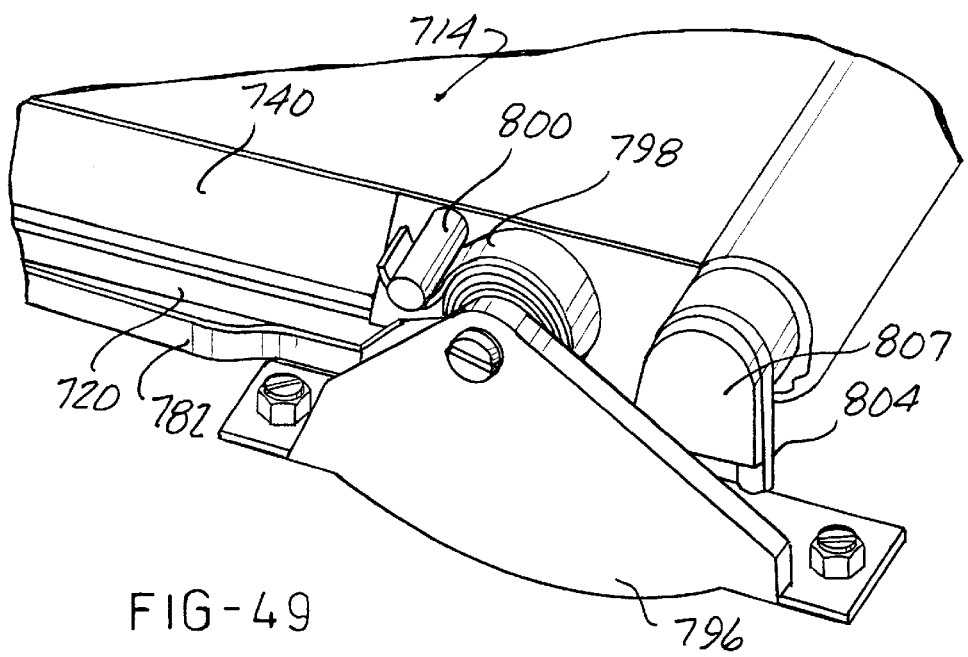
FIG. 49 is a perspective view of the rear linkage in the fully lowered position.

A flexible sheet 748 shown in FIG. 47A, is disposed in front of the back plate 744 and connected at a lower end to the rear cross member 724 of the seat bottom 712. An L-shaped angle member 749 is welded or fixed to the circular rear cross member 724. Another angle member 751 is welded to the L-shaped angle member 749. The two members have overlaying surfaces that trap and secure the lower edge of the flexible sheet 748 therebetween.

Preferably, the flexible sheet 748 is formed of a polypropylene for flexibility while still retaining a measure of rigidity so as to be conformable to the more normal seat back contour shown in FIG. 41 when the seat back 714 is in the fully elevated position. A conventional cushion and seat outer cover assembly 750 are mounted on the flexible sheet 748 by adhesive, for example, to complete the seat back 714.

As shown in FIG. 47, shape changing control means or members are mounted on the back plate 744 to change the height and/or shape of the seat back 714 as the seat back 714 pivots relative to the seat bottom 712. Preferably, the contour as well as the overall height of the outer surface of the seat back 714 relative to the back plate 744 is varied as the seat back 714 pivots from the fully elevated position shown in FIG. 41 to the fully collapsed or lowered position shown in FIG. 44.

The shape changing control means include a plurality, such as four by example, rods 754 which are mounted on the back plate 744 and spaced laterally across the back plate 744 between the opposed side tubes 740 and 742. The rods 754 extend between the top and bottom edges of the seat back plate 744. A plurality of spaced slots 756 are formed along the length of each rod 754 with two slots 756 being depicted by way of example.

A plurality of shape control members are mounted on the seat back plate 744. By way of example only, three different length shape control members 758, 760 and 762 are pivotally and/or movably mounted on each rod 754. Generally, the overall length of each shape control member 758, 760 and 762 on each rod 754 varies from a longer length shape control member 758 located adjacent the lower end of the seat back plate 744 through an intermediate length shape control member 760 to the shortest length shape control member 762 located adjacent to the upper end of the seat back plate 744 next to the top cushion 746. Each shape control member 758, 760 and 762 is in the form of a serpentine, resilient spring with the longer shape control member 758 having additional serpentine bends as compared to the intermediate length shape control member 760 and the shortest shape control member 762.

The shortest shape control members 762 are pivotally mounted in a bore extending through an upper end of each rod 754. The intermediate length shape 1 control member 760 is movably and pivotally disposed within one slot 756 associated with each rod 754. Likewise, the longer length shape control member 758 is movably and pivotally disposed within one slot 757 in each rod 754.

The outer ends of each shape control member 758, 760, and 762 are pivotally connected by means of U-shaped brackets to one side of the flexible sheet 748 so as to conformably couple the flexible sheet 748 to the back plate 744.

At least one and preferably a pair of vertical support rods 764 are pivotally connected at one end to a flange projecting from one of the angle members mounted on the rear cross member 724. Each vertical support rod 764 is pivotally connected to the rear cross member 724 on the seat plate 712. The other end of each vertical support rod 764 is pivotally coupled by U-clips to the back of the flexible sheet 748. The vertical support members 764 ensure that the shape control members 758 move to one end of the slots 756 as the seat back 714 moves to the fully elevated position shown in FIG. 41 by forcing the flexible sheet 748 away from the back plate 744. This ensures that the shape control members 758 are fully extended relative to the seat back 744 to position a lower or lumbar portion of the seat back 714 farther away from the back plate 744 to comfortably support the lumbar portion of an occupant's back.

The intermediate length shape control members 760 slide within the slots 756 and are moved to one end of the slot 756 when the seat back 714 is in the fully elevated position to extend an intermediate portion of the seat back cushion 750 away from the seat back 744 a predetermined distance which is less than the spacing between the lumbar portion of the seat back cushion 750 and the seat back 744. The shorter length shape control members 762 merely pivot within the bore in each rod 754 and move the upper end of the seat back cushion 750 only a short distance away from the seat back plate 744 when the seat back 714 is in the fully elevated position.

As shown in FIGS. 41–45, a pivot linkage is mounted on each side of the seat bottom 712 and is interconnected to the seat bottom 712 and the seat back 714 to cause pivotal elevation and lowering movement of the seat back 712 relative to the vehicle floor 716 whenever the seat back 714 is pivoted relative to the seat bottom 714 in elevating or lowering paths of movement.

As each side linkage 770 is substantially identical, the following description of one linkage 770 will be understood to also apply to the other linkage 770.

A support bracket 772 is fixedly mounted on the vehicle floor 716 and pivotally supports one end of a transfer link 774. The other end of the transfer link 774 is pivotally connected to a hinge bracket 776. The hinge bracket 776 also provides a pivot connection to a control link 782. A front pivot arm 780 is fixed at one end to the hinge bracket 776. A biasing spring 784 extends between an intermediate connection on the control link 782 and a pin extending across opposed side walls of the hinge bracket 776. The spring 784 provides an opening force to break the over center position of the front pivot arm 780 when the front pivot arm 780 is in the fully lowered position shown in FIG. 44.

As shown more clearly in FIG. 46, the front pivot arm 780 has a generally L-shape formed of a long leg 786 and a shorter length upper leg 788. The upper leg 788 is fixedly secured, such as by welding, to a tube 790 extending through one end of a flange 792 coupled to one end of one seat bottom side frame 720 and the tubular member extending from the front cross member 722 to enable pivotal movement of the front cross member 722 relative to the seat bottom side frame 720 during pivotal collapsing and elevation of the linkage 770 and, in particular, the front pivot arm 780.

As shown in FIGS. 41, 42, 45, 48 and 49, a rear pivot link 793 is fixedly connected by welds to a lower end of one seat back side tube 740. A tubular pin 791 extends outwardly from the rear cross member 724 of the seat bottom 712 through the rear pivot link 793 in a rotatable connection which defines the axis of rotation of the seat bottom 712. A finger 792 projects from the rear pivot link 793 and carries a pivot pin connection to one end of the control link 782. The rear pivot link 793 itself is pivotally mounted about a pivot pin 794 supported in a pair of spaced plates 796 fixedly mounted on the vehicle floor 716. The pivot pin 794 extends outward from the seat back side tube 740 and defines the pivot axis of the lower edge of the seat back 714 relative to the rear edge of the seat bottom 712. A biasing means in the form of a coil spring 798 is wound about the pivot pin 794 and coupled at one end to a pin 800 extending outward from the rear pivot link 793 to provide a biasing force to urge the rear pivot link 793 and the seat back 714 toward the fully elevated seat position shown in FIG. 1.

Figure 44:
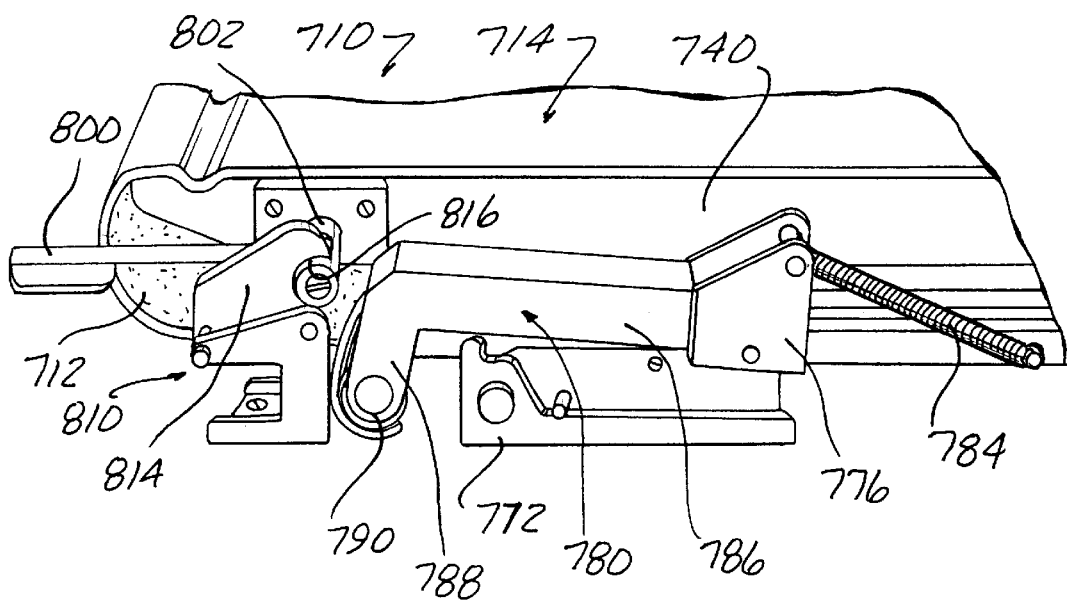
Figure 45:
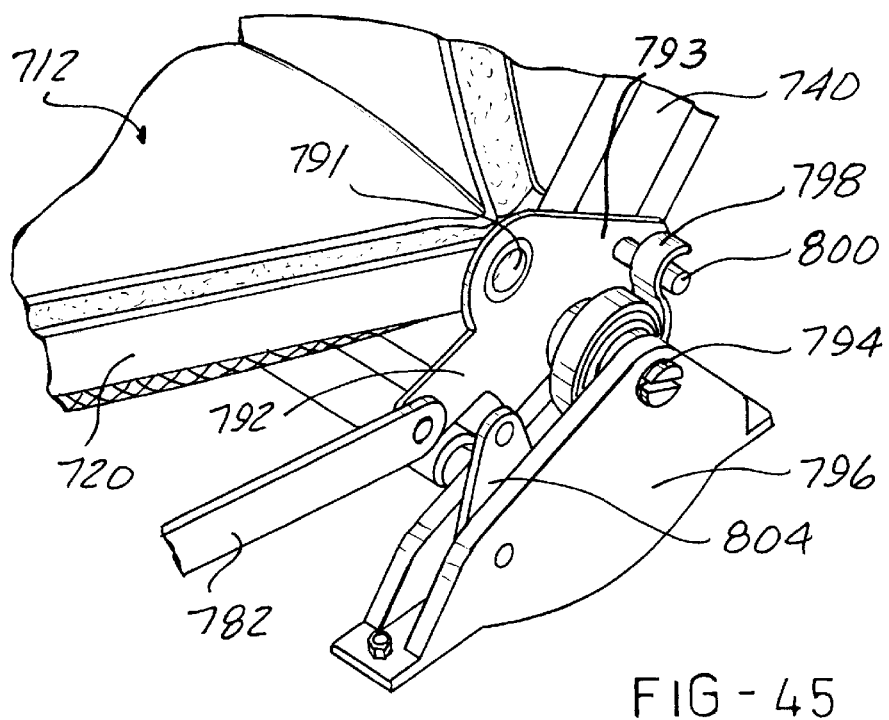
FIG. 45 is a perspective view of a rear portion of the pivot linkage shown in FIG. 41.

A releasable latch mechanism is provided on the seat 710 to latch the seat 710 in both the fully elevated position shown in FIG. 1 and the fully collapsed or lowered position shown in FIG. 44.

A handle 800, shown in FIGS. 41–44, is pivotally mounted on a rotatable tube 802 projecting through an upper end of the side tube 740 of the seat back 714. The tube 802 has a pawl projecting from one end interiorly within the hollow seat back side tube 740 which is connected to a rod 803, FIG. 48, extending through the hollow side tube 740 to one end of a latch member 804 which is pivotally mounted on the rear pivot link 793. The opposite end of the rod 803 is attached to a pawl on the latch member 804. Movement of the handle 800 in one direction causes a like movement of the rod 803 and thereby a pivotal movement of the latch member 804 away from a latch pin 806 seated in a notch 808 in the latch member 804.

A guide 807 is coupled to the latch member 804 by a shaft 809 and urges the latch member 804 around the latch pin 806 during pivotal movement of the latch member 804. A cross rod, not shown, extends between the shaft 809 in the latch members 804 in both linkages to simultaneously pivot both latches 804.

Figure 43:
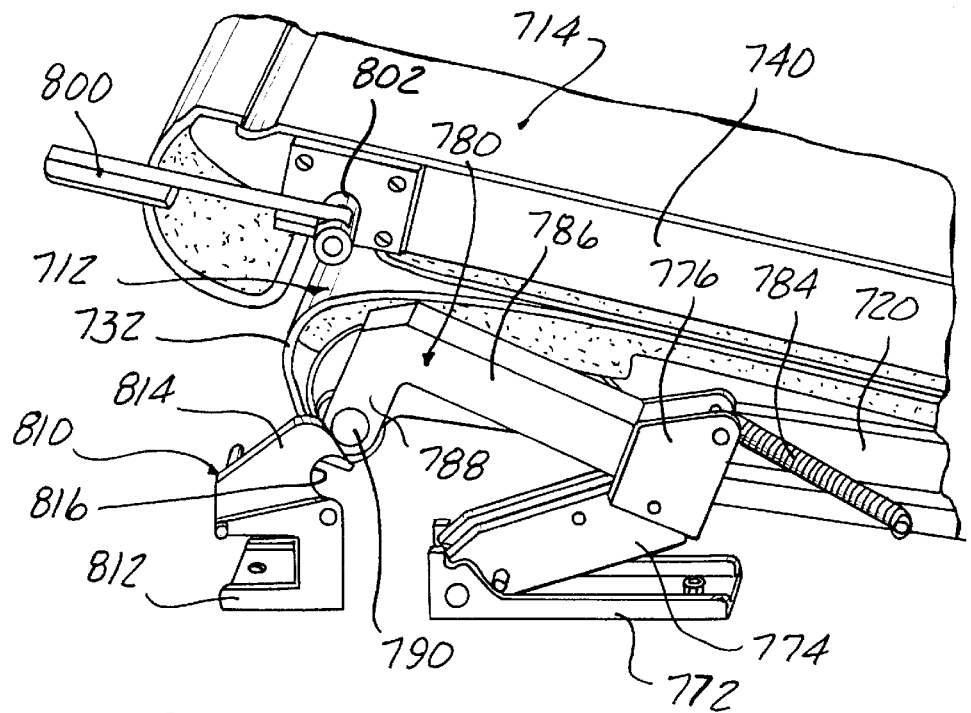

A front latch 810 includes a bracket 812 fixedly mounted on the vehicle floor 716 adjacent the front edge of the seat bottom 712 and spaced from the linkage support bracket 772. The bracket 812 supports a spring biased latch member 814 having a notch 816. As shown in FIG. 44, when the seat back 714 has been fully lowered or collapsed, the tube 802 coupled to the latch release handle 800 engages the notch 816 latching the seat back 714 in the lowered position in the front latch 810. The latch member 814 is biased by means of a spring, not shown, mounting interiorly within the bracket 812 and coupled between the bracket 812 and the latch member 814. In this manner, as the seat back 714 pivots downwardly as shown in the collapsing sequence depicted sequentially in FIGS. 41–44, the tubular member 802 will engage the outer surface of the latch member 814, as shown in FIG. 43, and urge the latch member 44 against the biasing force of the spring to enable the tubular member 802 to seat in the notch 816. The biasing spring provides sufficient force to snap the latch member 814 into the latch position with the notch 816 engaging the tubular member 802.

Rotation of the release handle 800 in a clockwise direction will rotate the latch member 814 away from the bracket 812 to disengage the notch 816 from the tube 802 and to enabling the seat back 714 to be elevated.

Operation of the collapsible seat 710 between the elevated and collapsed positions and back will now be described with reference to FIGS. 41–44. For purposes of this description, the seat 710 is in the fully elevated position as shown in FIG. 41, with the rear latch member 804 engaging the brackets 796.

When it is desired to lower the seat back 714, as well as the entire collapsible seat 710, the release handle 800 is rotated counterclockwise to disengage the latch member 804 from the pin. A forward pivoting force can then be exerted on the seat back 714 to pivot the seat back 714 toward the seat bottom 712.

After the rear latch member 804 has been disengaged, counterclockwise pivot movement of the seat back 714 relative to the seat bottom 712 will cause the rear pivot link 790 to pivot counterclockwise about its pivot axis 794 rotating the control link 782 counterclockwise and to the rear. This pulls the hinge bracket 776 rearward breaking the locked connection between the front pivot arm 790 and the transfer link 774 and causing a counterclockwise rotation of the front pivot arm 780 and a simultaneous clockwise rotation of the transfer link 774 toward the partially collapsed position shown in FIG. 42. During this counterclockwise rotation of the front pivot arm 790, the vertical extent of the upper end of the short leg 788 of the front pivot arm 780 drops with respect to the underlying vehicle floor 716 thereby lowering the front end of the seat bottom side frame 720 and thereby the entire collapsible seat 710. Continued counterclockwise pivotal movement of the seat back 714 toward the seat bottom 712 further collapses the linkage formed by the hinge bracket 776, the front pivot arm 780 and the transfer link 774 to the near collapsed or lowered position shown in FIG. 43. In this position, the seat bottom side frame 720 is disposed closely adjacent to the control link 782.

Further movement of the seat back 714 to the fully lowered position shown in FIG. 44 brings the longer leg 786 of the front pivot arm 780 in substantial co-linear alignment with the control link 782. The seat bottom side frame 720 is now disposed laterally adjacent to the control link 782. Further, as shown in FIG. 44, the forward most end of the seat bottom 712 as defined by the pivot axis 790 through the tube located between the mounting brackets 772 and 812 disposed and closely adjacent to the vehicle floor 716.

In this position, the seat back side tube 740 is in close overlapping arrangement with the seat bottom side frame 720 to define a short height stack of the seat bottom 712 and seat back 714. This presents the smallest vertical height of the collapsible seat 710 when in the fully collapsed or lowered position.

Further, as the tubular member 802 on which the release handle 800 is mounted nears the front latch 810, the tubular member 802 will engage the notch 816 in the latch member 814 to latch the seat back 714 in the fully lowered position shown in FIG. 44.

Thus, pivotal lowering of the seat back 714 simultaneously causes a pivotal lowering of the seat bottom 712.

When it is desired to elevate the collapsible seat 710 from the lowered position, the release handle 800 is moved in a clockwise direction disengaging the tubular member 802 from the notch 816 in the front latch member 814. Clockwise and upward force exerted on the seat back 714 will pivot the bottom edge of the seat back 714 with respect to the rear edge of the seat bottom 712. Such pivotal movement will rotate the rear pivot link 790 in a clockwise direction urging the control link 782 toward the front of the seat 710 and causing an elevation of the seat bottom side frame 720 through an upward clockwise rotation of the front pivot arm 780. Continued upward pivot movement of the seat back 714 will bring the collapsible seat 710 of the present invention to the fully elevated position shown in FIG. 41.

What is claimed is:

1. A seat comprising:
    a seat bottom;
    a seat back pivotally coupled to the seat bottom for movement between a first storage position overlaying the seat bottom and a second, elevated, upright, occupant seating position, angularly deployed with respect to the seat bottom; and
    shape changing means, coupled to at least one of the seat bottom and the seat back, for changing the shape of the at least one of the seat bottom and the seat back substantially continuously as the seat back moves between the first and second positions to minimize the overall height of the seat back and the seat bottom when the seat back is in the first position overlaying the seat bottom.

2. The seat of claim 1 wherein the seat back comprises:
    a back plate;
    a flexible sheet; and
    a cushion mounted on the flexible sheet, the shape changing means connected to the back plate and the flexible sheet.

3. The seat of claim 1 wherein the shape changing means comprises:
   at least one of the seat bottom and the seat back being formed as an inflatable body.

4. The seat of claim 1 further comprising:
   latch means for latching at least one of the seat bottom and the seat back in one of the elevated and lowered positions.

5. The seat of claim 1 further comprising:
   means, coupled to the seat bottom and an underlying seat support surface, for moving the seat bottom between a first lowered position in close proximity to the underlying support surface and an elevated, seating position.

6. The seat of claim 1 wherein the shape changing means comprises:
   a plurality of rigid support members pivotally mounted below the seat bottom;
   means for rotating the support members between a first lowered position and a second extended position; and
   resilient means, extending between outer ends of the support members, for resiliently supporting the seat bottom cushion.

7. The seat of claim 6 further comprising:
   linkage means for pivotally moving the seat bottom between a first lowered position with respect to an underlying support surface and a second elevated, seating position; and
   means, coupled between the moving means and the support members, for simultaneously moving the support members between the first and second positions during movement of the seat bottom between first and second positions.

8. The seat of claim 7 wherein:
   the linkage means comprises a pair of front pivot arms pivotally connected between the underlying support surface and a front edge of the seat bottom and a pair of rear pivot arms pivotally connected between the underlying support surface and a rear edge of a seat bottom; and
   lift assist means, coupled to one of the pair of front pivot arms and the pair of rear pivot arms, for biasing the one of the pair of front pivot arms and rear pivot arms to the elevated, seating position.

9. The seat of claim 8 further comprising:
   latch means, releasably engagable with at least one of the pair of front pivot arms and the rear pivot arms, for latching the one of the pair of front pivot arms and the rear pivot arms in at least one of the lowered and elevated positions.

10. The seat of claim 7 wherein the means for pivotally moving the seat bottom between the lowered and elevated positions comprises:
    a pivotal linkage coupled to the seat bottom frame; and
    a carrier pivotally supporting the linkage.

11. The seat of claim 10 wherein:
    the carrier adapted for releasible locking mounting in a cavity formed in a seat support.

12. The seat of claim 1 wherein the shape changing means comprises:
    a plurality of pivotal, rigid support members mounted on a seat back plate carried within the seat back; and
    one end of each of the rigid members pivotally connected to a flexible sheet supporting a seat back cushion.

13. The seat of claim 12 further comprising:
    a plurality of laterally extending rows of the rigid members pivotally mounted with respect to the seat back plate.

14. The seat of claim 13 wherein the length of the rigid members varies from a bottom edge to an upper edge of the seat back.

15. The seat of claim 13 further comprising:
    each row of rigid members fixedly mounted on a shaft rotatably disposed with respect to the seat back plate;
    resilient means, extending between outer ends of the rigid members, for resiliently supporting a seat bottom cushion;
    a pair of front pivot arms pivotally coupled to an underlying support surface and a front edge of the seat bottom and a pair of rear pivot arms pivotally coupled between the underlying support surface and a rear edge of the seat bottom for moving the seat bottom between a lowered and elevated seating position; and
    cam follower means, coupled between at least one of the rotatable shafts and at least one of the pivot arms of the pair of front pivot arms and the pair of rear pivot arms, for coupling rotation of the pair of front pivot arms and the pair of rear pivot arms to rotation of the rotatable shaft to move the rigid members between the first and second positions.

16. The seat of claim 12 further comprising:
    means, coupled to the seat bottom, for pivotally moving the seat bottom between a first lower position with respect to an underlying support surface and a second elevated seating position; and
    means, coupled between the seat bottom elevating means and the rigid members, for simultaneously pivoting the rigid members between a first overlying position defining a minimum height of the seat back to a second elevated position with respect to the seat back plate defining a seat occupying seat back height as the seat bottom moves between the lowered and elevated positions.

17. The seat of claim 1 further comprising:
    the seat bottom and the seat back each including a frame supporting a cushion;
    the shape changing means including;
       a plurality of shape changeable members coupled between the frame and a flexible sheet supporting the cushion.

18. The seat of claim 17 wherein the shape changeable members comprise:
    a plurality of horizontally extending, spaced rods rotatably mounted on the frame;
    a plurality of rigid members fixedly mounted on each rod at one end and pivotally connected to the flexible sheet at an opposite end; and
    means, coupled between the frames of the seat back and the seat bottom, for rotating at least one of the rods concurrent with pivotal movement of the seat back with respect to the seat bottom.

19. The seat of claim 18 wherein the rotating means comprises:
    a guide slot carried on the frame of the seat bottom; and
    at least one of the horizontal rods on the frame of the seat back engaged with the guide slot for traversing the guide slot during pivotal movement of the seat back with respect to the seat bottom.

20. The seat of claim 17 further comprising:
means for pivotally moving the seat bottom between a first lowered position with respect to an underlying support surface and a second elevated, seating position;
means for pivotally connecting the seat back to the seat bottom about a pivot axis; and
means, for imparting pivotal movement between the seat back and the seat bottom concurrent with movement of the seat bottom between the lowered and elevated positions.

21. The seat of claim 20 further comprising:
power drive means, coupled to the seat bottom moving means, for powering movement of the seat bottom between the first lowered position and the second elevated, seating position.

22. The seat of claim 17 further comprising:
a plurality of resilient members coupled at one end to the flexible sheet and at another end to one of a plurality of vertically extending drive rods;
a plurality of support rods pivotally connected at one end to a transverse rod carried on the seat bottom frame and at a second end to the flexible sheet; and
the mounting axis of the one end of the transverse rod spaced from the pivot axis of the seat back relative to the seat bottom wherein pivotal movement of the seat back relative to the seat bottom causes the support rods to pivot about an axis of the transverse rods to vary the distance between the ends of the resilient members to change the shape of the resilient members between a generally planar shape when the seat back is disposed in close proximity to the seat bottom and an arcuate shape when the seat back is in the fully elevated, seating position.

23. The seat of claim 22 further comprising:
drive means, responsive to pivotal movement of the seat back relative to the seat bottom and coupled to the drive rods, for bidirectionally moving the drive rods as the seat back pivots relative to the seat bottom to pivot the support rods between a lowered position with respect to the frame and an angularly spaced, outwardly extending position.

24. The seat of claim 23 wherein the drive means comprises:
gear means, coupled to the seat bottom and the seat back and the drive means, for linearly moving the drive means upon rotation of the seat back relative to the seat bottom.

25. The seat of claim 22 further comprising:
linkage means for pivotally moving the seat bottom between a first position in close proximity to the underlying support surface and a second elevated seating position; and
means, coupled between the seat bottom moving means and the shape changing means, for concurrently moving the seat bottom between the lowered and elevated positions while the seat back is pivoted relative to the seat bottom.

26. The seat of claim 25 further comprising:
latch means for latching the linkage means in the elevated position.

27. The seat of claim 25 further comprising:
a portable carrier carrying the linkage means.

28. The seat of claim 1 wherein the shape changing means comprises:
a seat back frame in the seat back;
a flexible sheet supporting a seat back cushion;
means for fixedly connecting a lower end of the flexible sheet to a seat bottom frame in the seat bottom;
a plurality of pivotal support members pivotally mounted at one end on the seat back frame and movably coupled at an opposed end to the flexible sheet, the plurality of support members pivoting from a first position generally in close proximity to the seat back frame when the seat back is in the first position overlaying the seat bottom and an outwardly extending position with respect to the seat back frame when the seat back is in the second position with respect to the seat bottom; and
the lower end of the flexible sheet connected to the seat bottom frame spaced from a pivot axis of the seat back with respect to the seat bottom wherein the flexible sheet changes from a generally planar shape when the seat back overlays the seat bottom to an arcuate shape when the seat back is in the elevated position.

29. The seat of claim 28 wherein the support members are arranged in a plurality of rows between the lower and upper ends of the seat back.

30. The seat of claim 29 wherein the support members in each of the plurality of rows of support member vary in length from the lower end to the upper end of the seat back.

31. The seat of claim 29 further comprising:
linkage means, coupled to the seat bottom frame, for pivotally moving the seat bottom between a first lowered position overlaying an underlying support surface and a second elevated, seating position; and
means for coupling the linkage means with the seat back such that pivotal movement of the seat back relative to the seat bottom operates the seat bottom moving means to concurrently move the seat bottom between the lowered and elevated positions.

32. The seat of claim 31 further comprising:
the seat bottom having a pair of side frame members and front and rear crossbars extending between opposite ends of the side frame members;
the front crossbar rotatably connected to the side frame members;
an intermediate crossbar spaced from the front crossbar and fixedly connected to the side frame members; and
a flexible member fixedly connected at opposite ends to the front crossbar and the intermediate crossbar, the flexible member having an upwardly extending curvature when the seat back is in the elevated position relative to the seat bottom to support a thigh of a seat occupant, the flexible member moving to a generally planar shape through rotation of the front crossbar during pivotal movement of the seat back to a lowered position overlaying the seat bottom.

33. The seat of claim 31 further comprising:
latch means, adapted to be mounted on a support surface underlying the seat bottom and connected to the seat bottom, for latching the seat in at least one of the elevated and lowered positions.

34. The seat of claim 33 wherein the latch means comprises:
the linkage means including a front linkage and a rear linkage respectively coupled to a front edge and a rear edge of the seat bottom;
a support bracket adapted to be mounted on the support surface and rotatably receiving the rear linkage;
a latch pin carried on the bracket;
a latch carried by the rear linkage for fixedly engaging the latch pin when the seat back is in the elevated, seating position; and release means, carried on the seat, and coupled to the latch, for disengaging the latch from the latch pin.

35. The seat of claim 34 wherein the latch means further comprises:
a front bracket disposed adjacent the front linkage;
a front latch carried on the front bracket;
the latch pin carried on the seat back and positioned to engage the latch when the seat back is in the fully lowered position relative to the seat bottom and the seat bottom is in the first lowered position to latch the seat back and the seat bottom.

36. The seat of claim 33 further comprising:
a pivotal handle carried on the seat back;
a connector member, coupled to the handle at one end and to a rear latch at another end for disengaging the rear latch from the latch pin upon rotation of the handle.

37. The seat of claim 31 wherein the coupling means comprises:
the linkage means including a link member fixedly mounted on the seat back; and wherein
rotation of the seat back relative to the seat bottom rotates the link member to operate the linkage means to concurrently move the seat bottom between the lowered and elevated positions.

38. The seat of claim 28 further comprising:
linkage means for pivotally moving the seat bottom between a first lowered position with respect to an underlying support surface and a second, elevated, seating position; and
means, coupled between the linkage means and the shape changing means, for simultaneously operating the shape changing means for changing the shape of at least one of the seat bottom and the seat back during movement of the seat bottom between first and second positions.

39. The seat of claim 38 wherein the means for pivotally moving the seat bottom between the lowered and elevated positions comprises:
a pivotal linkage coupled to the seat bottom frame; and
a carrier pivotally supporting the linkage.

40. The seat of claim 39 further comprising:
the carrier adapted for releasible locking mounting in a cavity formed in a seat support surface.

41. The seat of claim 1 further comprising:
means for pivotally moving the seat bottom between the lowered and elevated positions; and
a carrier pivotally supporting the linkage.

42. The seat of claim 41 wherein:
the carrier adapted for releasible locking mounting in a cavity formed in a seat support.

43. The seat of claim 1 further comprising:
linkage means, coupled to a seat bottom frame supporting a seat bottom cushion, for pivotally moving the seat bottom between a first lowered position overlaying an underlying support surface and a second elevated, seating position; and
means for coupling the linkage means with the seat back such that pivotal movement of the seat back relative to the seat bottom operates the seat bottom moving means to concurrently move the seat bottom between the lowered and elevated positions.

44. A seat comprising:
a seat bottom;
a seat back pivotally coupled to the seat bottom for movement between a first position overlaying the seat bottom and a second, elevated, stationary position angularly deployed upright with respect to the seat bottom; and
shape changing means, coupled to at least one of the seat bottom and the seat back, for changing the shape of the at least one of the seat bottom and the seat back as the seat back moves between the first and second positions to minimize the overall height of the seat back and the seat bottom when the seat back is in the second position overlaying the seat bottom;
the seat bottom including:
a pair of side frame members and front and rear crossbars extending between opposite ends of the side frame members;
the front crossbar rotatably connected to the side frame members;
an intermediate crossbar spaced from the front crossbar and fixedly connected to the side frame members; and
a flexible member fixedly connected at opposite ends to the front crossbar and the intermediate crossbar, the flexible member having an upwardly extending curvature when the seat back is in the elevated position relative to the seat bottom to support a thigh of a seat occupant, the flexible member moving to a generally planar shape through rotation of the front crossbar during pivotal movement of the seat back to a lowered position overlaying the seat bottom.

45. A seat comprising:
a seat bottom;
a seat back pivotally coupled to the seat bottom for movement between a first storage position overlaying the seat bottom and a second, elevated, upright, occupant seating position angularly deployed with respect to the seat bottom;
linkage means, coupled to the seat bottom, for pivotally moving the seat bottom between a first position in close proximity to an underlying seat support surface and a second, upright seating position with respect to the underlying support surface;
shape changing means, coupled to at least one of the seat bottom and the seat back and to the linkage means, for changing the shape of the at least one of the seat bottom and the seat back substantially continuously as the seat back moves between the first and second positions to minimize the overall height of the seat back and the seat bottom when the seat back is in the second position overlaying the seat bottom; and
the seat back and the linkage means operably coupled wherein pivotal movement of the seat back with respect to the seat bottom operates the seat bottom moving means to concurrently move the seat bottom between the first and second positions.

46. The seat of claim 45 wherein the shape changing means comprises:
a plurality of rigid support members pivotally mounted below the a seat bottom cushion;
means for rotating the support members between a first lowered position and a second extended position; and
resilient means, extending between outer ends of the support members, for resiliently supporting the seat bottom cushion.

47. The seat of claim 46 further comprising:
means, coupled between the moving means and the support members, for simultaneously moving the support members between the first and second positions during movement of the seat bottom between first and second positions.

48. The seat of claim 45 further comprising:
a plurality of vertically spaced rows of the rigid members pivotally mounted on the seat back plate.

49. The seat of claim 48 wherein the length of the rigid members varies from a bottom edge to an upper edge of the seat back.

50. The seat of claim 45 further comprising:
each row of rigid members are fixedly mounted on a shaft rotatably disposed with respect to the seat back plate;
resilient means, extending between outer ends of the rigid members, for resiliently supporting a seat bottom cushion;
a pair of front pivot arms pivotally coupled to an underlying support surface and a front edge of the seat bottom and a pair of rear pivot arms pivotally coupled between the underlying support surface and a rear edge of the seat bottom for moving the seat bottom between a lowered and elevated seating position; and
cam follower means, coupled between at least one of the rotatable shafts and at least one of the pivot arms of the pair of front pivot arms and the pair of rear pivot arms, for coupling rotation of the pair of front pivot arms and the pair of rear pivot arms to rotation of the shaft to move the rigid members between the first and second positions.

51. The seat of claim 45 wherein the shape changing means comprises:
a seat back frame;
a flexible sheet supporting a seat back cushion;
means for connecting a lower end of the flexible sheet to a seat bottom frame;
a plurality of pivotal support members each pivotally mounted at one end on the seat back frame and movably coupled at an opposed end to the flexible sheet, the plurality of support members pivoting from a first position generally in close proximity to the seat back frame when the seat back is in the first position overlaying the seat bottom and a second outwardly extending, angular position with respect to the seat back frame when the seat back is in the second position with respect to the seat bottom; and
the lower end of the flexible sheet connected to the seat bottom frame spaced from a pivot axis of the seat back with respect to the seat bottom wherein the flexible sheet changes from a generally planar shape when the seat back overlays the seat bottom to an arcuate shape when the seat back is in the elevated position.

52. The seat of claim 45 further comprising:
pivoting means, adapted to be movably connected to an underlying seat support surface, for pivoting the seat bottom between an elevated seating position spaced to an underlying seat support surface and a lowered position in proximity with the underlying seat support surface; and
means, connected to the pivoting means and the seat back, for operating the pivoting means concurrently with pivoting movement of the seat back with respect to the seat bottom wherein the seat bottom is in the lowered position when the seat back is disposed in a close overlaying position with respect to the seat bottom, and the seat bottom is in the elevated position when the seat back is pivoted to an elevated, angularly upright position with respect to the seat bottom.

53. The seat of claim 52 wherein the pivoting means comprises:
first and second linkages each having front and rear pivot arms pivotally connected to front and rear edges, respectively, of the seat bottom frame; and
a control link pivotally connected to the front and rear pivot arms of each of the first and second linkages.

54. The seat of claim 53 further comprising:
a receptacle having a pair of open ended extensions extending from one end;
the first and second linkages mounted substantially completely within the receptacle and the extensions when the seat bottom is in the lowered position.

55. The seat of claim 53 further comprising:
counterbalance means connected to the front and rear pivot arms of each of the first and second linkages.

56. The seat of claim 55 further comprising:
means for powering the pivotal movement of the first and second linkages between the lowered and elevated positions.

57. The seat of claim 53 further comprising:
first and second carriers, each of the second linkages pivotally mounted in the first and second carriers, the carriers adapted for releasible latching in cavities in a vehicle.

58. The seat of claim 57 further comprising:
a first latch pin adapted to be mounted on a vehicle body;
a second latch pin mounted on the carrier;
means, formed on each of the first and second carriers, for releasible engagement with the first latch pin to releasably mount each of the first and second carriers in the receptacle;
a latch member, carried by each of the first and second linkages, for releasible engagement with the second latch pin to latch the first and second linkages in the first and second carriers.

59. The seat of claim 52 further comprising:
a shaft rotatably carried on the seat back plate;
a pair of front pivot arms pivotally coupled to an underlying support surface and a front edge of the seat bottom and a pair of rear pivot arms pivotally coupled between the underlying support surface and a rear edge of the seat bottom for moving the seat bottom between a lowered and elevated seating position; and
cam follower means, coupled between the rotatable shaft and at least one of the pivot arms of the pair of front pivot arms and the pair of rear pivot arms, for coupling rotation of the pair of front pivot arms and the pair of rear pivot arms to rotation of the rotatable shaft to operate concurrently, pivot the seat back relative to the seat bottom with movement of the seat bottom between the lowered and elevated positions.

60. The seat of claim 59 further comprising:
at least one horizontally extending rod rotatably mounted on a frame of the seat back; and
means, coupled between the seat back and the seat bottom, for rotating at least the rod concurrent with pivotal movement of the seat back with respect to the seat bottom.

61. The seat of claim 60 wherein the rotating means comprises:
a guide slot carried on a frame of the seat bottom; and
the horizontal rod on the frame of the seat back engaged with the guide slot for traversing the guide slot during pivotal movement of the seat back with respect to the seat bottom.

62. The seat of claim 52 wherein the operating means comprises:
- linkage means including a link member mounted on the seat back; and wherein
- rotation of the seat back relative to the seat bottom rotates the link member to operate the linkage means to concurrently move the seat bottom between the lowered and elevated positions.

63. A seat comprising:
- a seat bottom;
- a seat back pivotally coupled to the seat bottom between a first storage position overlaying the seat bottom and a second elevated, upright, occupant seating position angularly deployed with respect to the seat bottom; and
- means, connected between the seat back and the seat bottom, for changing the thickness of at least one of the seat back and the seat bottom substantially continuously as the seat back moves between the first and second positions to reduce the total thickness of the seat back and the seat bottom when the seat back is in the second position overlaying the seat bottom.

64. A seat comprising:
- a seat bottom;
- a seat back pivotally coupled to the seat bottom for movement between a first storage position overlaying the seat bottom and a second elevated, occupant seating stationary position, angularly disposed upright with respect to the seat bottom;
- a flexible sheet supporting a seat back cushion, the flexible sheet mounted in the seat back;
- a plurality of shape changing members movably connected to the flexible sheet and the seat back for changing the shape of the flexible sheet relative to the seat back as the seat back pivots relative to the seat bottom to reduce the overall thickness of the seat back when the seat back is in the first position overlaying the seat bottom; and
- a lower end of the flexible sheet connected to the seat bottom at a position spaced from a pivot axis of the seat back with respect to the seat bottom wherein the shape changing members change the shape of the flexible sheet from a generally planar shape relative to the seat back when the seat back overlays the seat bottom in the first position to an arcuate shape relative to the seat back when the seat back is in the second position.

65. A seat comprising:
- a seat bottom;
- a seat back having a flexible sheet and a seat back frame, the seat back frame pivotally coupled to the seat bottom for movement between a first storage position overlaying the seat bottom and a second elevated, upright, occupant seating position angularly disposed with respect to the seat bottom;
- the flexible sheet supporting a seat back cushion, the seat back cushion having a first exterior surface spaced from the flexible sheet, the first exterior surface of the seat back cushion having a nominal, occupant seating profile when the seat back is in the second position;
- a plurality of shape changing members movably connected to the flexible sheet and the seat back frame for changing the shape of the flexible sheet relative to the seat back as the seat back pivots relative to the seat bottom; and
- a lower end of the flexible sheet connected to the seat bottom at a position spaced from a pivot axis of the seat back with respect to the seat bottom wherein the shape changing members change the shape of the flexible sheet substantially continuously from the nominal profile shape when the seat back is in the second position to a generally planar shape adjacent to the seat back frame when the seat back is in the first position to modify the nominal profile of the seat back cushion to a second profile of reduced thickness relative to the seat back frame.

66. The seat of claim 65 wherein:
- the shape changing means comprise a plurality of fingers arranged in a plurality of laterally extending rows on the seat back frame; and
- the fingers in each row of fingers varying in length from a top row to a bottom row to form the flexible sheet and the first exterior surface of the seat back cushion into the nominal profile when the seat back is in the second position.

67. The seat of claim 66 wherein the fingers in the rows of fingers vary in length from shorter length fingers in a row adjacent the top of the seat back to longer length fingers in a row spaced from the bottom of the seat back frame.

* * * * *